United States Patent [19]
Scheidler et al.

[11] 3,858,206
[45] Dec. 31, 1974

[54] METHOD AND MEANS FOR OPERATING AN AIRBORNE SWITCHED ARRAY RADAR SYSTEM

[75] Inventors: Stuart P. Scheidler, Anaheim; Gerald M. Goldberg, Chatsworth; Richard Sidlo, Placentia; Donald L. King, La Mirada; Richard A. Gebhardt, Orange, all of Calif.

[73] Assignee: Hughes Aircraft Company, Culver City, Calif.

[22] Filed: Feb. 5, 1973

[21] Appl. No.: 329,765

[52] U.S. Cl. ............................. 343/7 A, 343/5 DP
[51] Int. Cl. ................................................. G01s 9/02
[58] Field of Search........................... 343/5 DP, 7 A

[56] References Cited
UNITED STATES PATENTS

| | | | |
|---|---|---|---|
| 3,460,137 | 8/1969 | Ralston | 343/7 A X |
| 3,699,573 | 10/1972 | Andrews et al. | 343/7 A X |
| 3,757,326 | 9/1973 | White | 343/7 A |

*Primary Examiner*—T. H. Tubbesing
*Attorney, Agent, or Firm*—W. H. MacAllister; Walter J. Adam

[57] ABSTRACT

An airborne radar system is disclosed utilizing multiple fixed antenna arrays mounted within the periphery of the aircraft to avoid aerodynamic modifications and optimumly placed to achieve 360° surveillance coverage. The arrays preferably include a fore mounted array, an aft mounted array, a port mounted array and a starboard mounted array for respectively firing beams in different azimuth sectors relative to the aircraft. Each array is comprised of dipole elements having phase shifters coupled thereto for steering a beam within the corresponding sector. The primary radar antennas time share an exciter, transmitter, receiver and signal processor through switching devices. Time allocation between antennas and between operational modes such as "search" or "track" is based on various factors such as mission objectives, current target characteristics and radar purpose. Time allocation is preferably determined by an "on line" stored program digital computer which generates a radar control command to define the parameters for each beam to be fired. This procedure involves calculating the priority value of each track and search beam to be fired in accordance with predetermined criteria contained in the stored program. The priority value of each track beam to be fired involves determining the update rate for that target which is calculated based on the characteristics of the target. Priority values are then determined based on a comparison between the elapsed time since the last update and the calculated update rate.

12 Claims, 24 Drawing Figures

AIRBORNE EARLY WARNING SYSTEM

φ = Phase shifter

PRIMARY RADAR SUBSYSTEM

SIGNAL PROCESOR AND RADAR CONTROL UNIT

COHERENT INTEGRATOR AND NON-COHERENT INTEGRATOR

RADAR DATA BUFFER

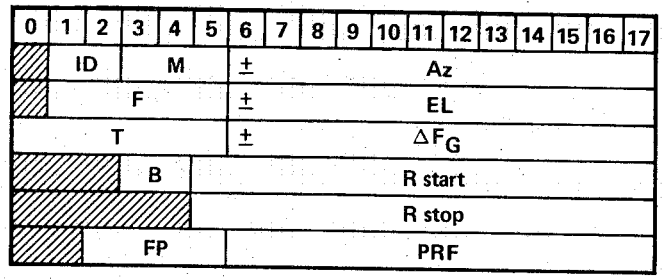

| | | Bits |
|---|---|---|
| ID (array ID) | 00 = Fore  10 = Aft  01 = Strbd  11 = Port | 2 |
| M (mode) | 0 = Search  4 = Test  1 = Verify  5 = Sea State  2 = Track  3, 6 and 7 not defined | 3 |
| Az (sine of Az angle) | sin .088°  ± sin 55° | 12 |
| EL (sine of EL angle) | sin .088°  ± sin 9.8° | 12 |
| T (threshold) | .5 db  7 - 20 db | 6 |
| F (frequency) |   0 - 31 | 5 |
| $\Delta F_G$ (gnd doppler offset) | 3 Hz  ± 4000 Hz | 12 |
| PRF (pulse repetition freq) | IPPS  1562-3125 | 12 |
| FP (fill pulses) | 1 pulse  8 - 13 | 4 |
| B (no. of bursts) | 1 burst  0 - 3 (N-1) | 2 |
| R start (range cell start) | 1 RC  0 - 5000 | 13 |
| R stop (range cell stop) | 1 RC  0 - 5000 | 13 |

Fig. 7b.
RADAR CONTROL COMMAND FORMAT

|   | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|----|----|----|----|----|----|----|----|
| 0 | ▨ | F | | | | | ± | | | | Az | | | | | | | |
| 1 | ▨ | CL | | | | | ± | | | | EL | | | | | | | |
| 2 | ▨ | ▨ | ▨ | ▨ | ▨ | ▨ | ▨ | ID | | $S_{RCT}$ | | | | | M | | | |
| 3 | $J_{F0}$ | | | $J_{F1}$ | | | . | | | . | | | . | | | . | | |
| 4 | . | | | . | | | . | | | . | | | . | | | . | | |
| 5 | . | | | . | | | . | | | . | | | . | | | . | | |
| 6 | . | | | . | | | . | | | . | | | . | | | . | | |
| 7 | . | | | . | | | . | | | . | | | . | | | . | | |
| 8 | $J_{F30}$ | | | $J_{F31}$ | | | PRF | | | | | | | | | | | |
| 0 | ▨ | ▨ | ▨ | ▨ | ▨ | ▨ | R | | | | | | | | | | | |
| 1 | ▨ | S | | | | | A | | | | | | | | | $F_L$ | | |

Rows 0–8: Header (one per dwell). Rows 0–1 (below): Report.

Header (one per dwell)

| | | | | |
|---|---|---|---|---|
| F | (frequency) | | 0 - 31 | 5 |
| Az | (sine of Az angle) | sin .088° | ± sin 55° | 12 |
| EL | (sine of EL angle) | sin .088° | ± sin 9.8° | 12 |
| CL | (clutter level) | | 0 - 31 | 5 |
| ID | (array ID)   00 = Fore   10 = Aft
01 = Strbd   11 = Port | | | 2 |
| SRCT | (sub-report count) | | 0 - 63 | 6 |
| M | (mode)   0 = Search   4 = Test
1 = Verify   5 = Sea State
2 = Track    3, 6 and 7 not defined | | | 3 |
| $J_{F0-31}$ | (jam level/frequency) | | 0 - 7 | 3 |
| PRF | (pulse repetition frequency) | IPPS | 1562-3125 | 12 |

Report ("N" per dwell)

| | | | | |
|---|---|---|---|---|
| R | (ambiguous range) | IRC | 0 - 5000 | 13 |
| S | (signal/clutter + noise) | 2 db | 8 - 40 db | 4 |
| A | (amplitude) | 3/8 db | 0 -   db | 9 |
| $F_L$ | (filter number) | | 0 - 15 | 4 |

Fig. 7c.
BEAM RETURN REPORT FORMAT

Energy Management

METHOD AND MEANS FOR OPERATING AN AIRBORNE SWITCHED ARRAY RADAR SYSTEM

CROSS REFERENCES TO RELATED APPLICATIONS

This application is related to applications Ser. No. 329,762 and Ser. No. 329,763 both filed Feb. 5, 1973.

BACKGROUND OF THE INVENTION

This invention relates generally to radar systems suitable for use in airborne early warning applications.

DESCRIPTION OF PRIOR ART

Airborne radar systems useful for early warning applications are well known in the art. Generally, such systems utilize mechanically rotating antennas installed in dishes attached to the outside of the airborne platform. Such arrangements adversely effect the aerodynamic characteristics of the platform. Even more significantly, however, as a consequence of the continuous rotation, such antennas must necessarily define identical search and track data rates which are multiples of the antenna scan rate. A compromise between optimum search and track data rates therefore must be made resulting in degraded system performance. The continuous antenna rotation also limits the time of dwell on a particular azimuth and, hence, directly the systems ability to see through clutter. Moreover, the rotating antenna is normally masked to some degree in one or more azimuth angles so that full 360° coverage is not possible. In addition, separate radar subsystems require separate antennas in current applications.

SUMMARY OF THE INVENTION

In view of the foregoing, an object of the present invention is to provide an improved radar system suitable for airborne early warning applications which avoids the aforementioned deficiencies of prior art systems.

In accordance with one aspect of the invention, a radar system is disclosed exhibiting independent and optimized search and track rates. The system includes multiple array antennas comprising a fore mounted array, an aft mounted array, a port mounted array, and a starboard mounted array, all mounted within the skin or periphery of the aircraft so as to avoid aerodynamic modifications thereto. The arrays are placed to yield full 360° coverage in azimuth and to almost completely elimminate antenna aperture blockage.

In accordance with a further aspect of the invention, a radar system is provided including multiple arrays and a digital logic means, preferably a general purpose digital computer, for defining the parameters of each beam to be fired.

In accordance with a still further aspect of the invention, the multiple arrays time share various functional circuits including an exciter, transmitter, receiver, and signal processor through switching devices.

In accordance with another significant aspect of the invention, time allocation between the multipath arrays and between operational modes such as "search" or "track" is optimized by the digital computer based on various factors such as mission objectives, current target characteristics and radar purpose.

In a preferred embodiment of the invention, a digital computer is employed to generate a radar control command to define the parameters for each beam to be fired for each of the radars subsystems since control of both radar subsystems can be performed in a nearly identical fashion, only the primary radar subsystem is described in detail herein. Typically, the control command specifies (1) array (2) beam elevation (3) beam azimuth (4) total number of fill and data pulses (5) number of fill pulses (6) frequency and (7) pulse repetition frequency. This control command is interpreted by a radar control unit which responds by controlling various system elements including the exciter, transmitter, switches, and phase shifters to cause the defined beam to be fired. Each control command also preferably specifies parameters utilized to interpret the return beam including (8) doppler offset (9) threshold (10) range start time (11) range end time and (12) mode. This latter information is employed by the radar control unit to enable primarily the receiver and signal processor to generate a beam return report which is then communicated by the radar control unit to the digital computer. The beam return report typically includes a header portion specifying the (1) clutter level and (2) jam level for each different frequency. The report also includes a subreport for each return beam which specifies (3) range (4) amplitude (5) doppler filter number and (6) ratio of signal to clutter plus noise. The digital computer then utilizes the beam return report to determine subsequent control commands. The computer is programmed to efficiently allocate time between various operational modes, such as "search," "track" and "verify" modes in accordance with some predetermined priority criteria. Additionally, the computer can differently allocate search time between different azimuth sectors and track time between different target tracks depending on the characteristics of the target.

BRIEF DESCRIPTION OF THE DRAWINGS

In the following descriptions of the figures, figure titles which may be referred to later in the text are underlined.

FIG. 4 is a block diagram of the signal processor and radar control unit utilized in the primary radar system of FIG. 3a;

FIG. 7b illustrates the format of a typical radar control command showing the field assignments of the information items listed in FIG. 7a;

FIG. 7c illustrates the format of a typical beam return report showing the field assignments of the information items listed in FIG. 7a;

OVERVIEW

The present invention is directed to an airborne early warning system and more particularly to a radar system for use therein. Although the preferred embodiment of the invention will be disclosed with reference to particularly identified equipment, such as the Japanese built Kawasaki C-1 aircraft, and the Hughes Aircraft Company general purpose digital computer, Model HM-4118, it will be recognized that the specific equipments are exemplary only and that most of what will be said herein is applicable to other alternative equipments.

The C-1 aircraft, disclosed herein as the airborne platform in the preferred embodiment of the invention, is a turbojet cargo type aircraft of high wing, high tail design, capable of crusing at 430 knots at an altitude of 30,000. Significantly, the C-1 contains a large space volume inside the aircraft suitable for comfortably housing the equipment utilized in the radar system in accordance with the present invention.

Basically, the objective of an airborne early warning system is to extend surveillance coverage beyond that available from a land based radar system and more specifically to extend the capability of detecting low altitude targets. In accordance with the present invention, a system is provided which yields radar surveillance coverage of 360° in azimuth and a detection range greater than 180 nautical miles with respect to a five square meter target. Moreover, a system in accordance with the present invention has the ability of recognizing a target even in the presence of relatively high land and sea clutter.

Figure 1A:
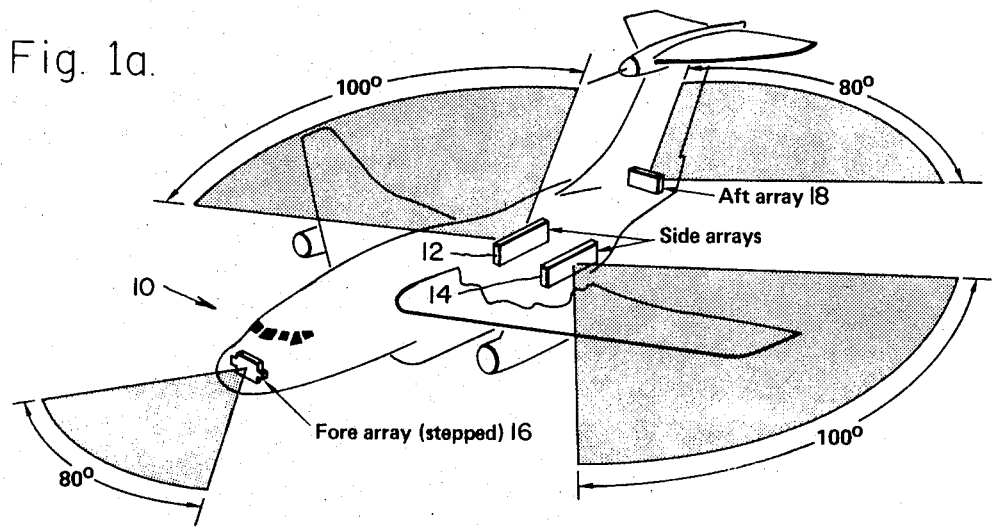
FIG. 1a is a perspective view illustrating the preferred antenna layout in the C-1 aircraft in accordance with the present invention.

FIG. 1a - Antenna Layout in the C-1 Aircraft

Figure 11A:
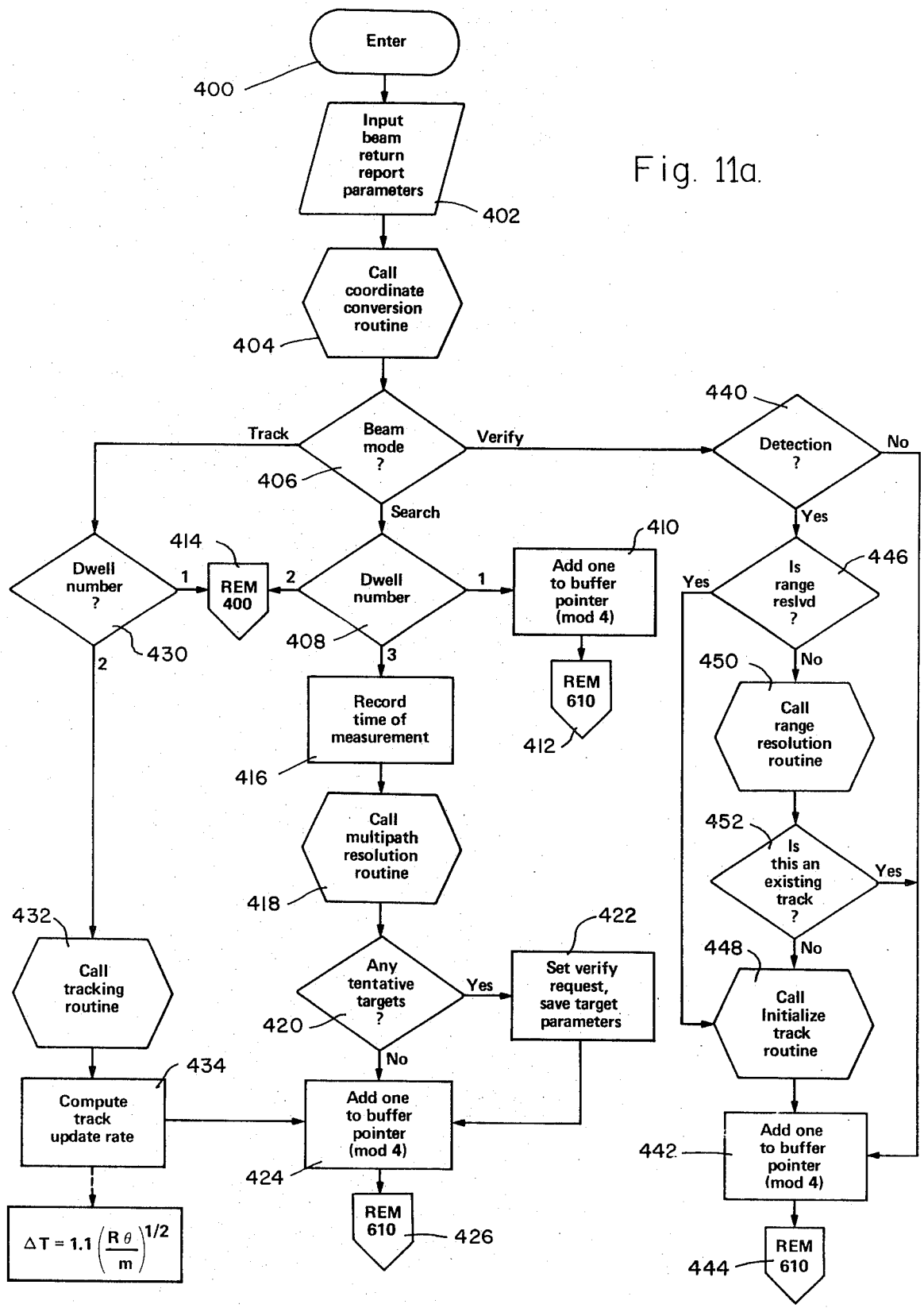
FIGS. 11a, 11b, and 11c (1, 2) comprise a computer flow chart describing the operation of the digital computer of FIG. 4 in accordance with the invention.
Figure 11B:
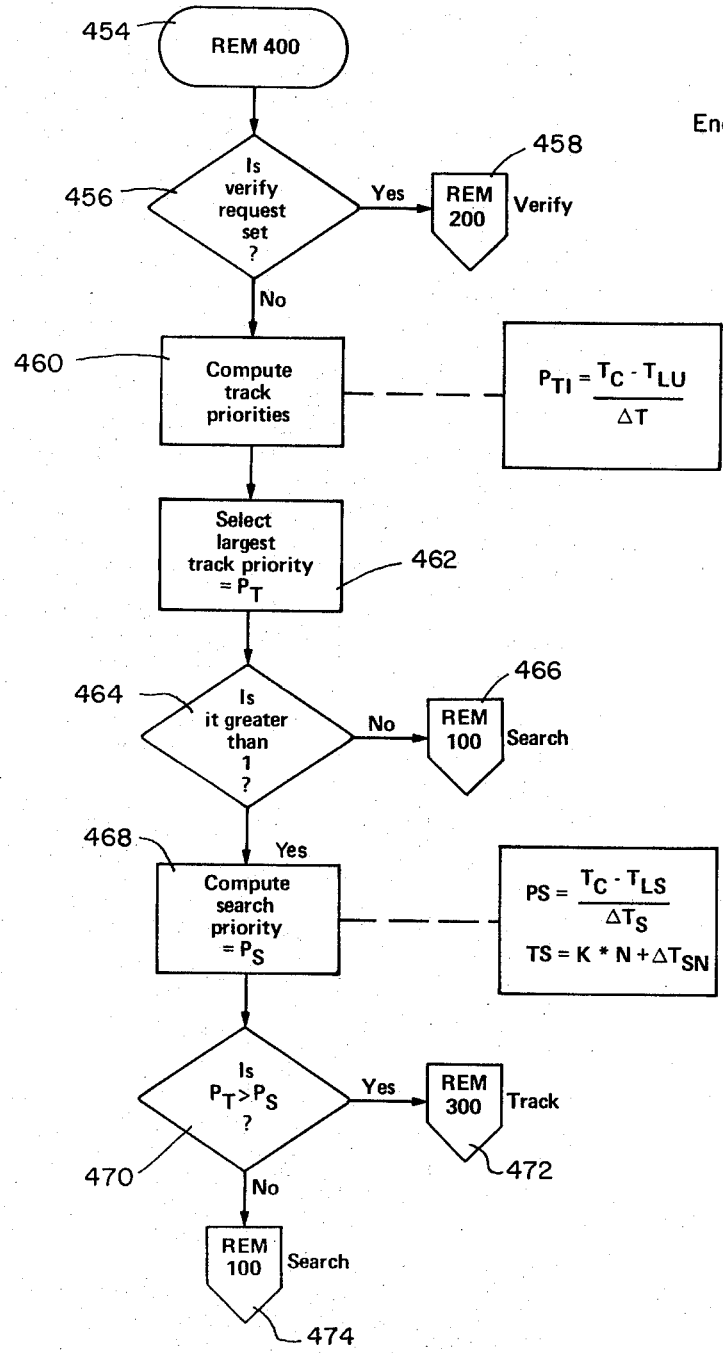
Figures 1, 11C:
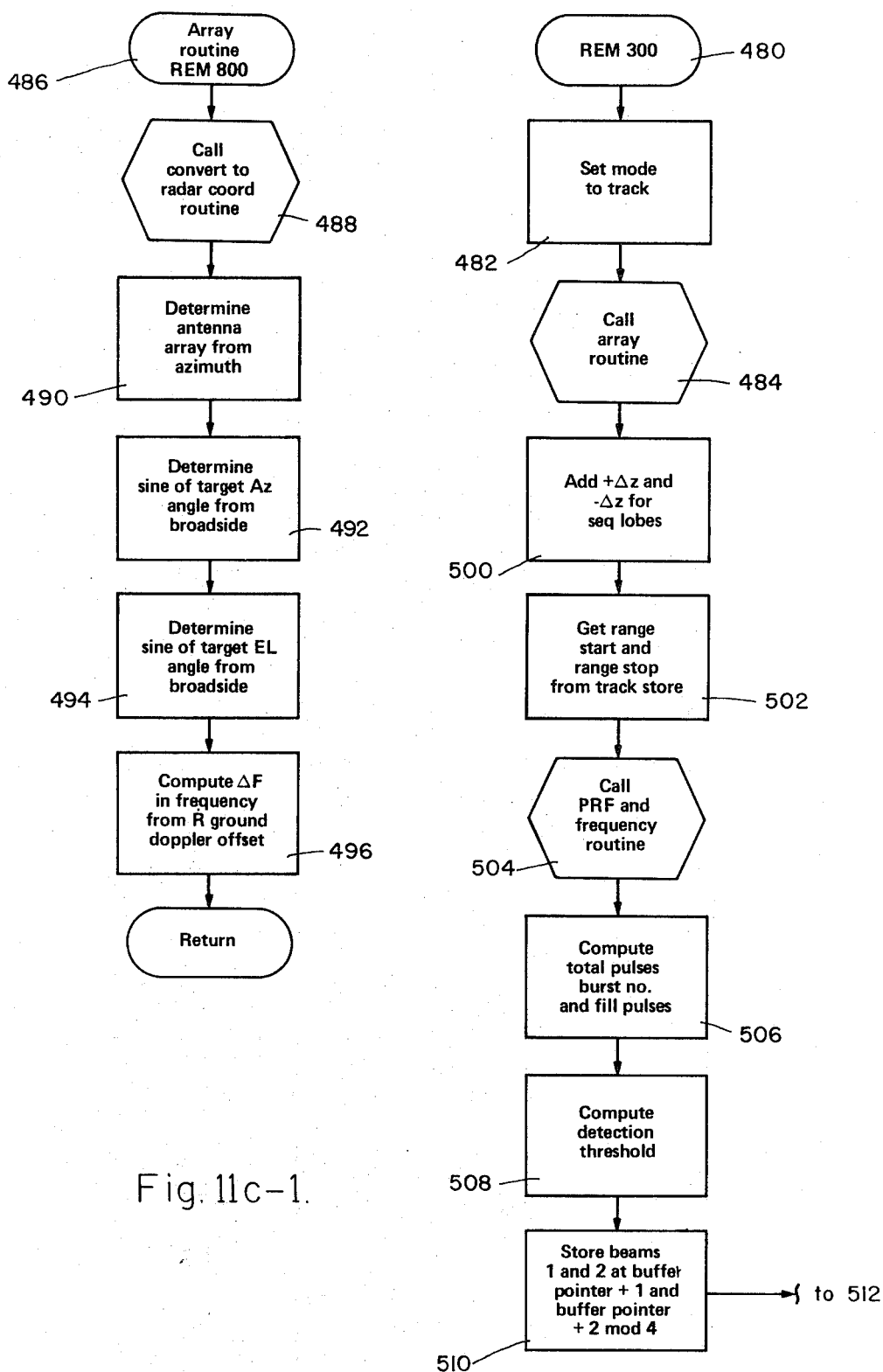
Figures 2, 11C:
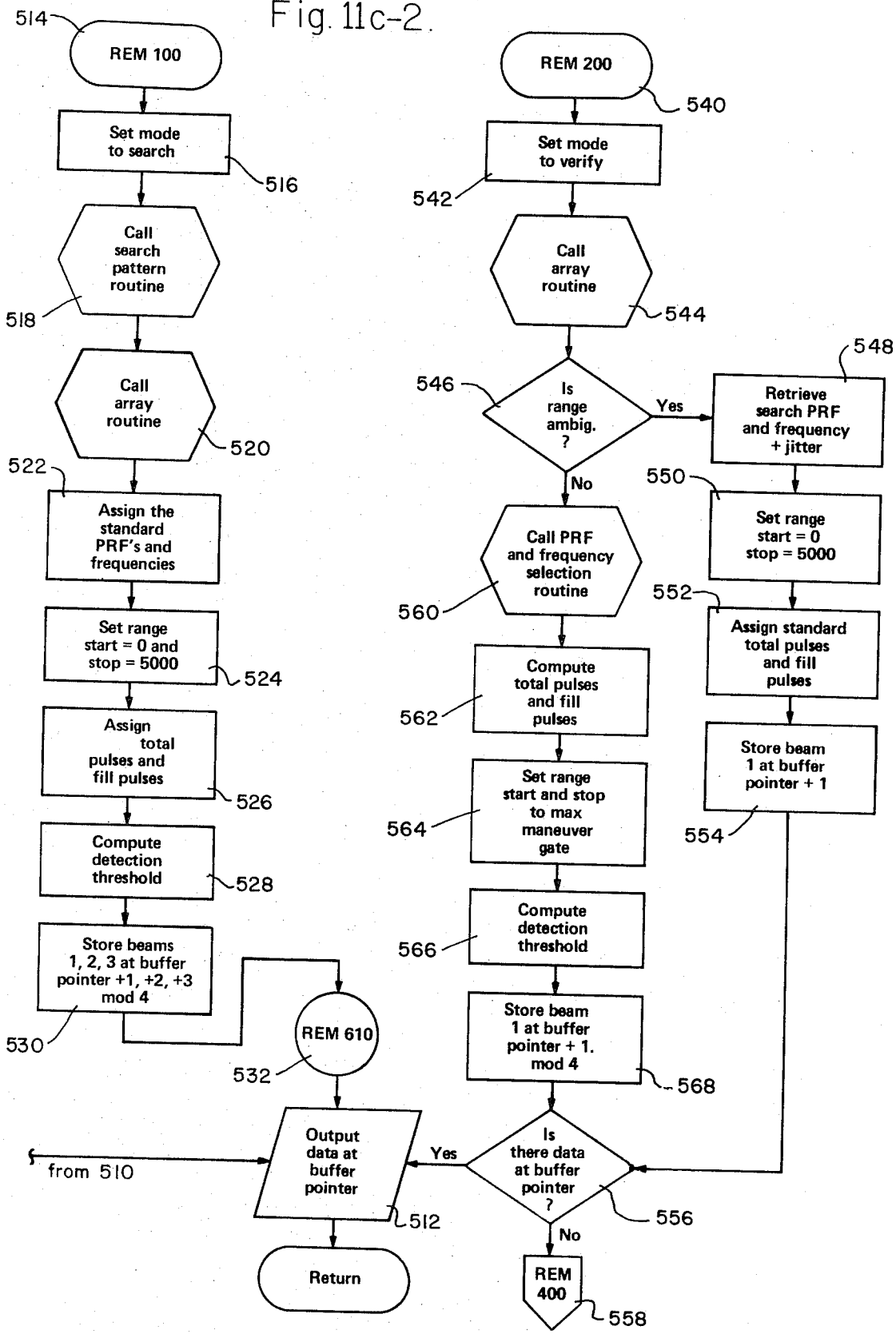

Attention is now called to FIG. 1 which depicts the Kawasaki C-1 aircraft 10 and illustrates, in accordance with a preferred embodiment of the invention, the preferred installation of radar antennas within the aircraft. In accordance with a significant aspect of the invention, in order to (1) provide 360° surveillance coverage, (2) maintain optimum track and search rates and (3) avoid aerodynamic modification of the aircraft, multiple radar array antennas are utilized and placed at different locations on the aircraft and within profile defined by the aircraft skin.

More particularly, the antenna arrays include a pair of side arrays, respectively identified as the starboard array 12 and the port array 14, a fore array 16, and an aft array 18. the structure of these various arrays and their placement with respect to the aircraft will be considered in greater detail hereinafter in connection with FIGS. 1b and 2b. Suffice it to say at this point that the arrays 12 and 14 are preferably identically dimensioned, each having a height of about three feet and a width of about twelve feet. The fore end aft arrays 16 and 18 typically measure approximately 3 feet in height and 3 feet in width.

All of the arrays are mounted within the aircraft fuselage. The fore array 16 and the aft array 18 are respectively mounted in the extreme fore (nose) and aft (tail) sections of the aircraft. The side arrays 12 and 14 are preferably mounted just to the rear of the wing trailing edges.

It is pointed out that a radar system in accordance with the preferred embodiment of the invention includes both a primary radar subsystem, i.e., a system to locate and track targets, and a secondary or IFF/SIF radar subsystem, i.e., a system to interrogate, and identify by a return transponder signal, friendly or cooperative targets).

As depicted in FIG. 1a, each of the arrays is intended to operate within a specific azimuth section relative to the aircraft. Each of the side arrays 12, 14 is illustrated as operating within a 100° sector and each of the fore and aft arrays 16, 18 within an 80° sector to achieve 360° surveillance coverage. Actually, each array should be constructed to operate in at least a 5° wider sector than depicted in FIG. 1a in order that the array sectors overlap slightly.

As will be seen hereinafter, each array is able to fire a beam at any azimuth angle within its sector of operation. The firing angle from broadside of a beam can be controlled by appropriately selecting the relative phase of signals fed to the dipole elements of the array. This is referred to as beam steering and has been widely discussed in the literature; see, for example, "Introduction to Radar Systems," Skolnik, McGraw Hill, 1962, p. 298. In the preferred embodiment of the invention, the primary radar antennas will fire successive search beams at different azimuth angels to cover a full 360°. These beams will be compensated for the platform pitch, yaw, and roll movement, and to achieve optimum beam stack factors. By way of example, it will be assumed herein that for a full 360° search, beams will be fired at 92 different substantially uniformly spaced azimuth positions. The search beam fired at each of these azimuth positions is preferably comprised of multiple "dwells" with each dwell including multiple pulses. The term "dwell" shall be used herein to refer to a sequence of pulses fired at a common azimuth and elevation and characterized by a common frequency and pulse repetition frequence. A typical search beam in accordance with the preferred embodiment of the invention to be discussed in connection with FIG. 8b is comprised of three dwells, differing only in pulse repetition frequency and the total number of pulses in the dwell. Multiple pulse repetition frequencies are advantageously employed to eliminate target speeds and range zones at which the systems would otherwise be blind; see, for example, "Introduction to Radar Systems," p. 129.

In addition to firing search beams, the radar system can operate in other modes to, for example, fire "track" or "verify" beams. Although the firing of these various beams can be interleaved in time in accordance with a fixed pattern, it is far preferable to adapt the pattern based on various factors such as the nature of the mission and the number and characteristics of the targets. The digital computer employed in the preferred embodiment of the invention functions to determine the optimum pattern based on stored criteria and to develop control commands to cause the appropriate beams to be fired. As will be seen hereinafter in connection with FIG. 8b, a typical track beam differs from a typical search beam in several characteristics including, for example, number of dwells and relationship between dwells, since the format of each beam is selected to optimumly perform a specific function.

As will be discussed in connection with FIG. 2b the antenna arrays 12, 14, 16, 18 depict both primary and secondary radar antennas which are structurally integrated and interleaved to minimize volume and weight. Beams fired from either the primary or secondary radar antennas are preferably defined and controlled by a digital computer. The arrays depicted in FIG. 1a also preferably incorporate sidelobe blanking antennas to be discussed hereinafter. For the sake of brevity, henceforth, whenever an array or antenna is mentioned, it should be understood that reference is being made to the primary radar antenna unless a secondary or sidelobe antenna is specified.

Figure 1B:
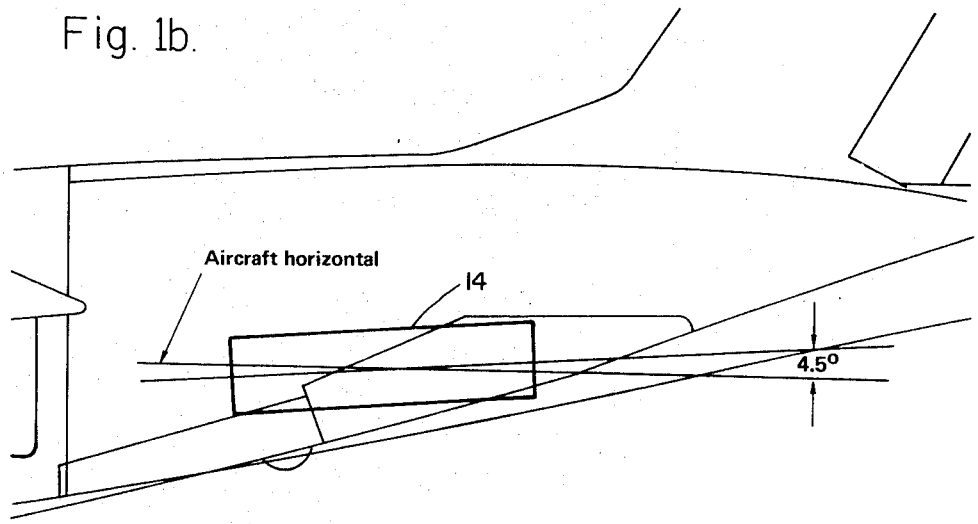
FIG. 1b is a diagramatic side elevation view showing the preferred side array positioning in the C-1 aircraft.

FIG. 1b -Preferred Side Array Positioning

Attention is now directed to FIG. 1b which illustrates the preferred positioning of the port array 14 in the C-1 aircraft. The starboard array 12 is similarly positioned on the opposite side of the aircraft. Prime objectives in selecting an antenna configuration for an airborne early warning system including the selection of a configuration which yields optimum clutter performance, maximum detection range and minimum antenna aperture blockage.

Antenna aperture blockage has been a constant problem in prior Airborne Early Warning Systems requiring 360° azimuth surveillance coverage whether they use mechanically-scanned rotating antennas or electronically-scanned fixed arrays. Mechanically rotating antennas as a rule are mounted atop the aircraft with the result that low-angle shadowing by the wing surfaces and blockage by the tail section seriously degrade coverage performance. Fixed array systems too are limited in achieving useful scan angles because of blockage by the wings, engine nacelles and horizontal stabilizers. However, the high-wing and high horizontal stabilizer design of the C-1 aircraft, when coupled with fixed array antennas, in accordance with the invention, almost completely eliminates antenna aperture blockage and resultant sidelobe degradation effects.

The clutter performance of a scanning radar operating from a moving platform is most critical at scan angles perpendicular to the direction of flight since clutter doppler spread resulting from the finite antenna beamwidth is largest at these angles. The clutter spread is most effectively reduced by using an antenna whose horizontal aperture dimension is as large as possible at these scan angles. Detection range too is strongly influenced by antenna size since long range performance is most easily achieved with large antenna gain, hence large antenna aperture. Both conditions can be satisfied by using the largest antenna possible and mounting it such that the antenna broadside points perpendicularly to the direction of flight. This is achieved in the present system by mounting two large rectangular arrays on either side of the aircraft just to the rear of the wings. Two slightly smaller arrays in the nose and tail of the aircraft complete the 360° coverage requirement. The side arrays are substantially rectangular 3-feet by 12-feet, each scanning a 100° sector on either side of the aircraft. The remaining 80° sectors one in front and one behind the aircraft are covered by the substantially rectangular 3-feet by 8-feet fore and aft arrays. The side arrays are preferably mounted in a forwardly tilted position to compensate for the pitch angle of the aircraft during flight.

The foregoing configuration eliminates aperture blockage of the fore and aft arrays. Side array aperture blockage can be minimized by positioning the arrays as shown in FIG. 1b, behind the wing, as far forward as possible, and as low as possible on the fuselage profile. A 4.5° downward tilt is provided to compensate for the positive flight pitch angle which ranges from 3.5° to 5.5° during normal flight. At this tilt angle the antenna fan beam would be as near vertical as possible throughout the mission. The beam elevation angle is −2° relative to aircraft local horizontal.

With the antenna located in the preferred position aperture blockage occurred only at scan angles near 20°. The blockage at this angle showed a loss in available aperture area of less than 2 percent, which corresponds to a range loss of approximately one nautical mile.

Figure 2A:
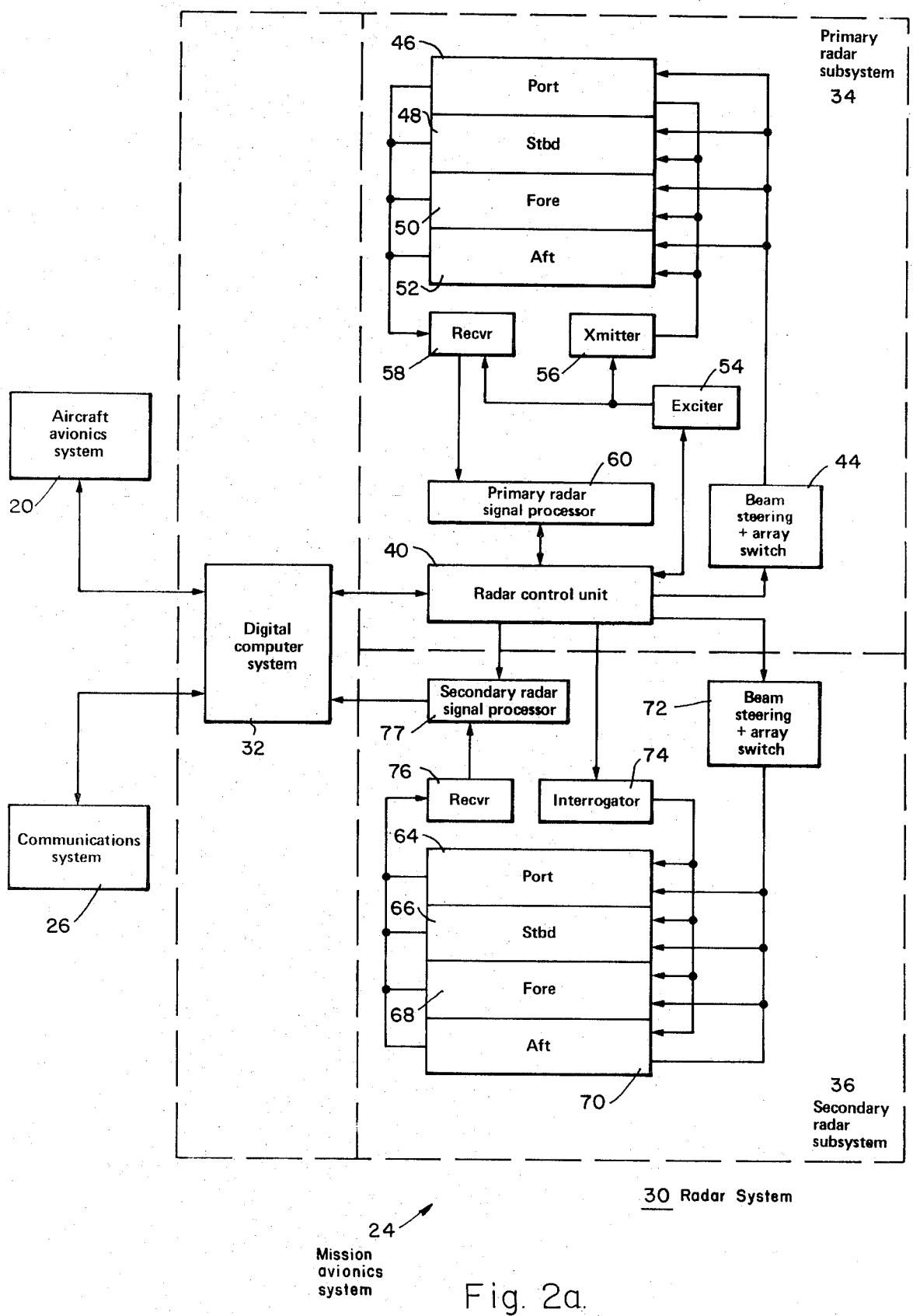
FIG. 2a is a block diagram of an airborne early warning system incorporating a radar system in accordance with the present invention containing a primary radar subsystem and a secondary IFF/SIF radar subsystem.

FIG. 2a -Airbone Early Warning System

Attention is now called to FIG. 2a which illustrates a block diagram of an airborne early warning system in accordance with the present invention. Briefly, the early warning system can be considered as being comprised of the following major system components:
 (1) Aircraft system (not represented in FIG. 2a);
 (2) Aircraft avionics system 20;
 (3) Mission avionics system 24;
 (4) Communication system 26.

As previously pointed out, the aircraft system (not illustrated in FIG. 2a) in accordance with the preferred embodiment of the invention comprises the Kawasaki C-1 aircraft, a medium sized cargo turbo-jet aircraft.

The aircraft avionics system 20 includes the equipments well known to those skilled in the art, which are generally essential for an aircraft to operate in a military environment. These equipments perform vrious functions related to navigation, identification, communication, etc. In addition to performing these generally military functions, portions of the aircraft avionics equipment interact with the mission avionics system 24 to assist with radar associated coordinate transformations and aircrafts position predictions.

The mission avionics system 24 is comprised of several system components including the radar system 30 and preferably, a digital computer system 32. The mission avionics system includes other systems not shown which function to distribute electrical power and cool the equipment. The present invention is directed primarily to the radar system 30 and its interrelationship with the digital computer system 32.

The communications system 26 generally depicts the airborne equipment used to communicate with ground based and other airborne systems.

The radar system 30 illustrated in FIG. 2a is comprised of a primary radar subsystem 34 and a secondary radar subsystem 36. The function of the primary radar subsystem is to fire search beams throughout a surveillance volume extending up to 360° in azimuth around the aircraft and to locate, verify and acquire targets therein. Subsequently, track beams are fired from the aircraft toward those targets to continually update target data stored in the memory of the digital computer system 32.

The digital computer system 32 operates in conjunction with the primary radar subsystem 34 to optimumly allocate operating time between different operational modes such as search and track and between different targets. In accordance with the present invention, radar control commands are developed by the computer system 32 which define beam parameters and which are supplied to the primary radar subsystem 34 to control the characteristics of the beams fired thereby. the digital commputer subsystem 32 develops the radar control commands in response to beam return reports supplied thereto from the radar subsystem 34.

Whereas the subsystem 34 functions primarily to locate passive targets within a 360° surveillance volume, the secondary radar subsystem 36 typically functions to interrogate and identity cooperative active targets. That is, the secondary radar subsystem 36 transmits beams which are sensed by transponders carried by cooperative targets. The transponders respond by firing an identification beam which is received and interpreted by the subsystem 36. The digital computer system 32 operates in conjunction with the secondary radar subsystem 36 to define the parameters of the beams fired therefrom in a manner similar to that by which it defines the parameters of the beams fired by the primary radar.

Considering the primary radar subsystem 34 of FIG. 2a in greater detail, it can be seen to comprise a radar control unit 40 which bilaterally communicates with the digital computer system 32. That is, the digital computer system 32 provides radar control commands to the radar control unit to define the parameters of beams to be fired and the radar control unit in turn supplies beam return reports to the digital computer system 32.

In response to a radar control command, the radar control unit 40 controls beam steering and array switching equipment 44. The beam steering and array switching equipment 44 in turn selects which of the primary arrays 46, 48, 50 or 52 is to be fired and further controls the angle at which the beam is steered or fired therefrom.

The radar control unit 40 additionally controls an exciter 54 which provides coded drive waveforms to a transmitter 56 and local oscillator signals to a receiver 58. The transmitter 56 in turn supplies signal energy of appropriate frequency, number of pulses, and pulse repetition rate to the arrays 46, 48, 50 and 52 to cause a beam to be fired at the angle and from the array controlled by means 44. The return beam from the target is thereafter supplied to by firing array to the receiver 58 which in turn supplies the information, in analog form, to the primary radar signal processor 60. The signal processor 60 converts the applied analog information to digital form and then operates upon it to select the desired signal information out of the noise and clutter. The operation of the signal processor is in part determined by control signals provided thereto from the radar control unit 40 in response to the radar control command supplied by the digital computer system. The signal processor 60 develops information which enables the radar control unit 40 to assemble a beam return report which is subsequently supplied to the digital computer system 32.

The secondary radar subsystem 36 includes secondary radar antennas 64, 66, 68 and 70, which, as will be seen hereinafter, in the preferred embodiment of the invention, are physically integrated with the elements of the primary radar arrays. The radar control unit 40 controls a beam steering and array switch means 72 which determines the particular secondary radar array to be fired and the angle at which a beam is to be fired therefrom. In addition, the radar control unit 40 controls an interrogator 74 which supplies the coded information to the secondary radar arrays for firing from the particular arrays selected by the means 72. The returned transponder signals received from the firing array are coupled through a receiver 76 to a signal processor 77 which supplies the identification codes target azimuth data and target range data to the digital computer system 32.

Figure 2C:
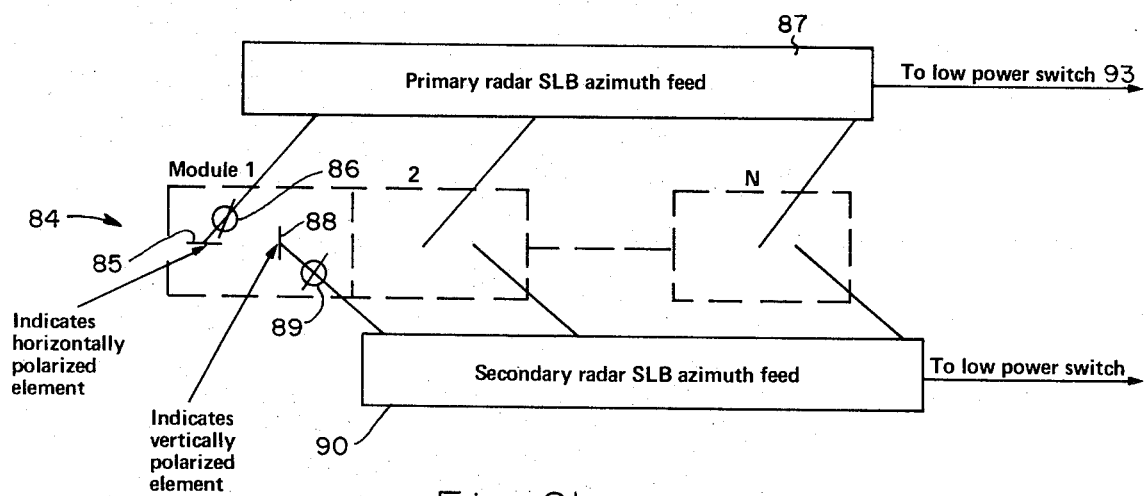
FIGS. 2b and 2c are a schematic diagram of a typical array structure in accordance with the invention showing the manner in which dipole elements of primary and secondary radar antennas are interleaved.
Figure 2B:
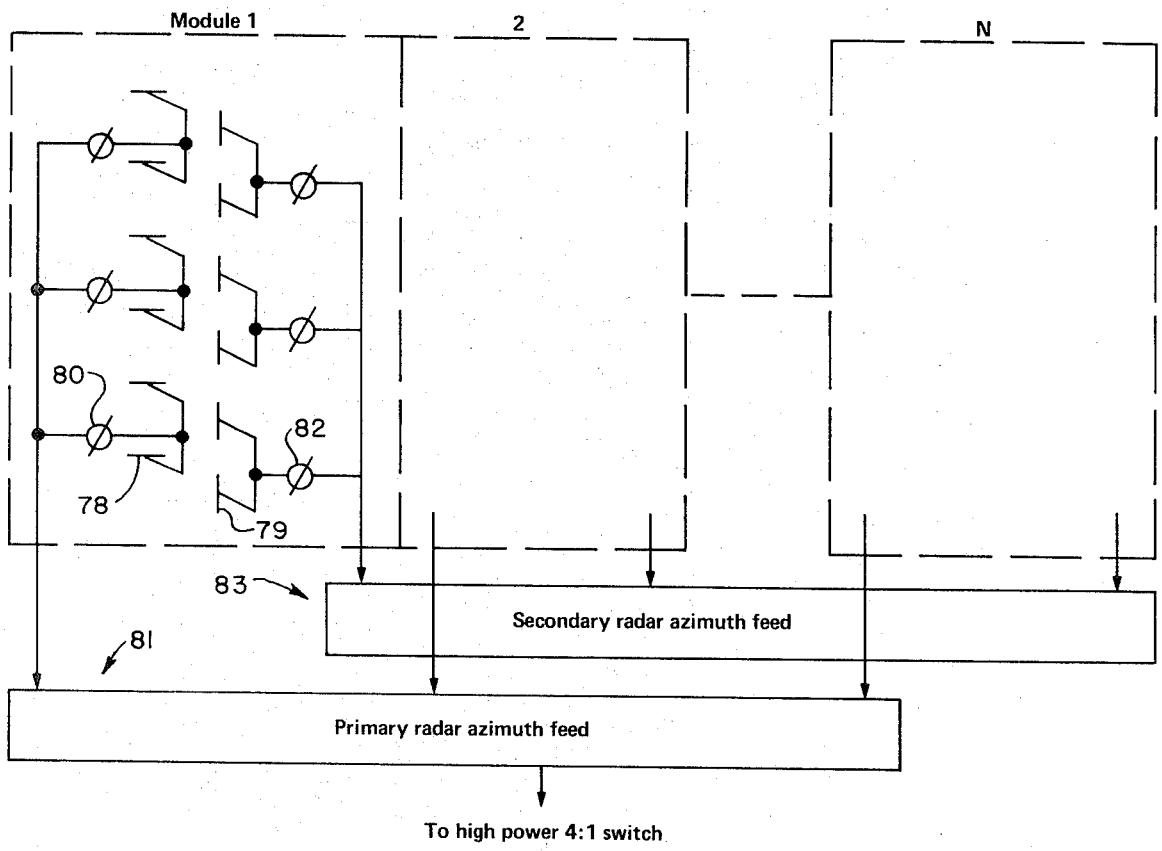

FIGS. 2b and 2c Array Structure

Attention is now directed to FIG. 2b which illustrates the configuration of any one of the arrays 12, 14, 16, 18 showing the manner in which the radiators (dipole elements) of the primary and secondary radar antennas are physically interleaved within a common array structure. The primary radar antenna is defined by $N$ modules or columns of horizontally polarized radiating elements 78, each module including $M$ elements. Each side array may, for example, be comprised of thirty three modules ($N = 33$), each containing eight elements ($m = 8$). The secondary radar antenna consists of vertically polarized elements 79 arranged similarly and interleaved with the elements 78 as shown in FIG. 2b. The various radiating elements of each array are arranged to define a common substantially planar radiating face.

The elements 78 of each of the $N$ modules are connected through 5-bit diode phase shifters 80 to an appropriate feed structure 81 (see Radar Handbook, McGraw Hill, Skolnik, p. 11–50). During transmit, the feed structure 81 couples a transmit signal to the elements 78 providing uniform amplitude distribution in azimuth. During receive, the signal flow is reversed with the signal from the elements 78 being applied to the feed structure 81. The phase shifters 80 are controlled by the output of an antenna phase computer to be discussed in connection with FIG. 9 for steering a beam in azimuth and elevation. The secondary radar antenna elements 79 are similarly connected through phase shifters 82 to a feed structure 83.

As can be seen in FIG. 2c, a sidelobe blanking antenna structure 84, including both a primary and a secondary side lobe blanking antenna, is located adjacent to the integrated primary and secondary radar array. The primary sidelobe blanking antenna elements 85 are horizontally polarized and connected through phase shifters 86 to a feed structure 87. The secondary side lobe blanking antenna elements 88 are vertically polarized and connected through phase shifters 89 to feed structure 90. The function of the sidelobe blanking antenna will be considered in connection with FIGS. 3a and 4.

Figure 3A:
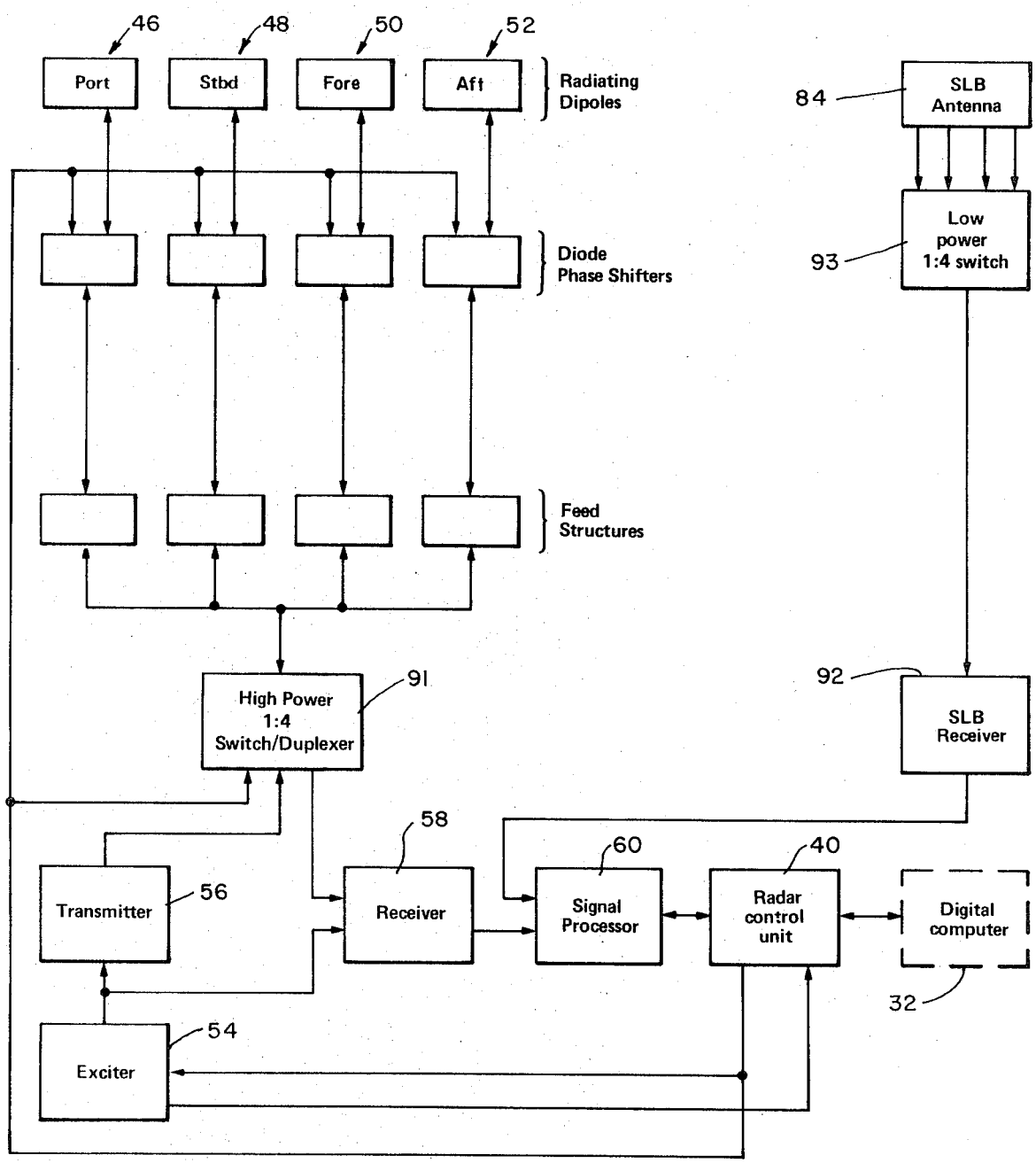
FIG. 3a is a block diagram illustrating the primary radar subsystem of FIG. 2a in greater detail.

FIG. 3a -Primary Radar Subsystem

Attention is now called to FIG. 3a which illustrates a more detailed block diagram of the primary radar subsystem 34 of FIG. 2a. Briefly, RF power from the transmitter 56 is switched to any one of the four arrays 46, 48, 50, 52 by a high power 1:4 switch 91. The outputs of the switch 91 are preferably connected to a feed structure at each array location comprised of a radial power line divider for azimuth distribution and coaxial cable for distribution in elevation. A radial line feed technique is preferred because it constitutes a light weight means of handling high power and because it allows the use of a high gain uniform distribution when transmitting and assumes low sidelobe levels when receiving. The transmit signal passes through the switch 91 (which serves the function of array switching and duplexing), into the port of the radial line corresponding to a uniform amplitude distribution in azimuth. After power distribution in the radial line, each output is sent through coaxial cable to an elevation feed and diode phase shifters to the radiating dipole elements.

On receive, the signal flow is reversed with the signal from the port of the radial power line divider corresponding to a uniform distribution passing through the high power switch/duplexer 91 to the receiver 58. Thus, the function performed by the switch/duplexer 91 is to selectively couple a transmit signal from a transmit input to any one of four array outputs or couple a receive signal from any of those array outputs to a receive output. This function can be performed by known switch and duplexer devices of the type described in said "Radar Handbook," pages 8–25 to 8–36. However, a preferred switch/duplexer device 91 will be described in detail in connection with FIG. 3b. The transmitter 56 of FIG. 3a supplying energy to the radiating dipoles via the switch 91 is preferably of a traveling wave tube (TWT) type particularly designed for low weight, small size and high efficiency and stability.

The receiver 58 can be of a type discussed in the aforementioned "Introduction to Radar Systems" in Chapter 8. Preferably, it is of the double conversion type utilizing a high frequency first IF stage and appropriate filtering to eliminate noise and other interference at the image frequency. Typically, the input energy applied to the receiver is initially preamplified and then coupled into a first converter where the L-band signals are converted to a first IF frequency, e.g., 288 MHz. After amplification and filtering, the first IF signals are sent to a second converter and heterodyned to a lower frequency, e.g., 32 MHz. This latter signal is then preferably applied to a pulse compression line filter to improve signal characteristics. The output of the receiver 58 to the signal processor 60 consists of an "in-phase" bipolar video signal and the quadrature component of that signal.

The exciter 54 provides the coded transmitter drive waveforms and clock reference signals as well as the local oscillator signals for the receiver to thus provide fully coherent operation. The exciter comprises a highly stable phase locked circuit. Passive chirp generation, in conjunction with a frequency synthesizer, develops linearly "chirped" doppler waveforms. In the preferred embodiment 32 different transmit frequencies are available covering a 150 MHz operating bandwidth.

The output of the receiver 58 is coupled to the previously mentioned primary radar signal processor 60 which will be discussed in greater detail in connection with FIG. 4. The signal processor 60 additionally receives information from a sidelobe receiver 92 responsive to signal energy received from primary radar sidelobe antennas 84 via switch 93. This energy is subsequently utilized for sidelobe blanking, as will be discussed hereinafter in connection with the description of the signal processor 60. Each sidelobe blanking antenna preferably comprises a horizontal halfwave dipole in front of a ground plane. The sidelobe antennas are used only on receive and blank only the azimuth sidelobes, and therefore require very little gain. Each of the four sidelobe antennas is preferably mounted immediately adjacent to one of the four primary radar antennas. The sidelobe receiver 84 is preferably similar to the primary radar receiver 58.

The signal processor 60 bidirectionally communicates with the radar control unit 40. As previously mentioned, the radar control unit 40 assembles beam return reports which it communicates to the digital computer system 32. In response to a radar control command received from the digital computer 32, the radar control unit operates, in a manneer to be described in greater detail hereinafter, to control the signal processor, receiver, exciter, switches, duplexers and phase shifters to both transmit and receive.

Figure 3B:
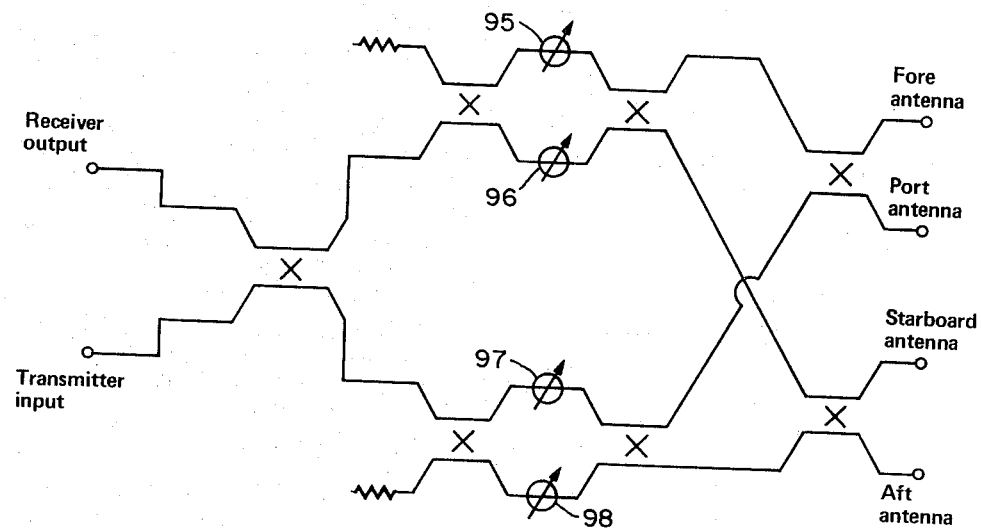
FIG. 3b is a schematic diagram illustrating the high power switch/duplexer of FIG. 3a in greater detail.

FIG. 3b -High Power Switch/Duplexer

The high power switch/duplexer 91 employs four single bit (0° to 180°) diode phase shifters 95, 96, 97 and 98 in conjunction with a hybrid matrix power distribution network. By properly controlling the phase shifters, the full transmitter output power can be routed to any one of the four outputs of the hybrid matrix. On receive two of the phase shifter bits are reciprocated to direct the received power into the receive channel. The loss and isolation of the switch are primarily determined by the phase and amplitude control achieved and by the isolation of the hybrids. The time required to switch from one output port to a second (or from transmit to receive) is 5 us.

The phase shifters for the switch preferably consist of a 3-foot length of reduced height waveguide loaded at regular intervals by 18 pairs of diode switches mounted in stripline circuits. The loading of each diode is very light (approximately 5° of phase shift); hence is 36 diodes five 180° of phase shift.

Figure 4:
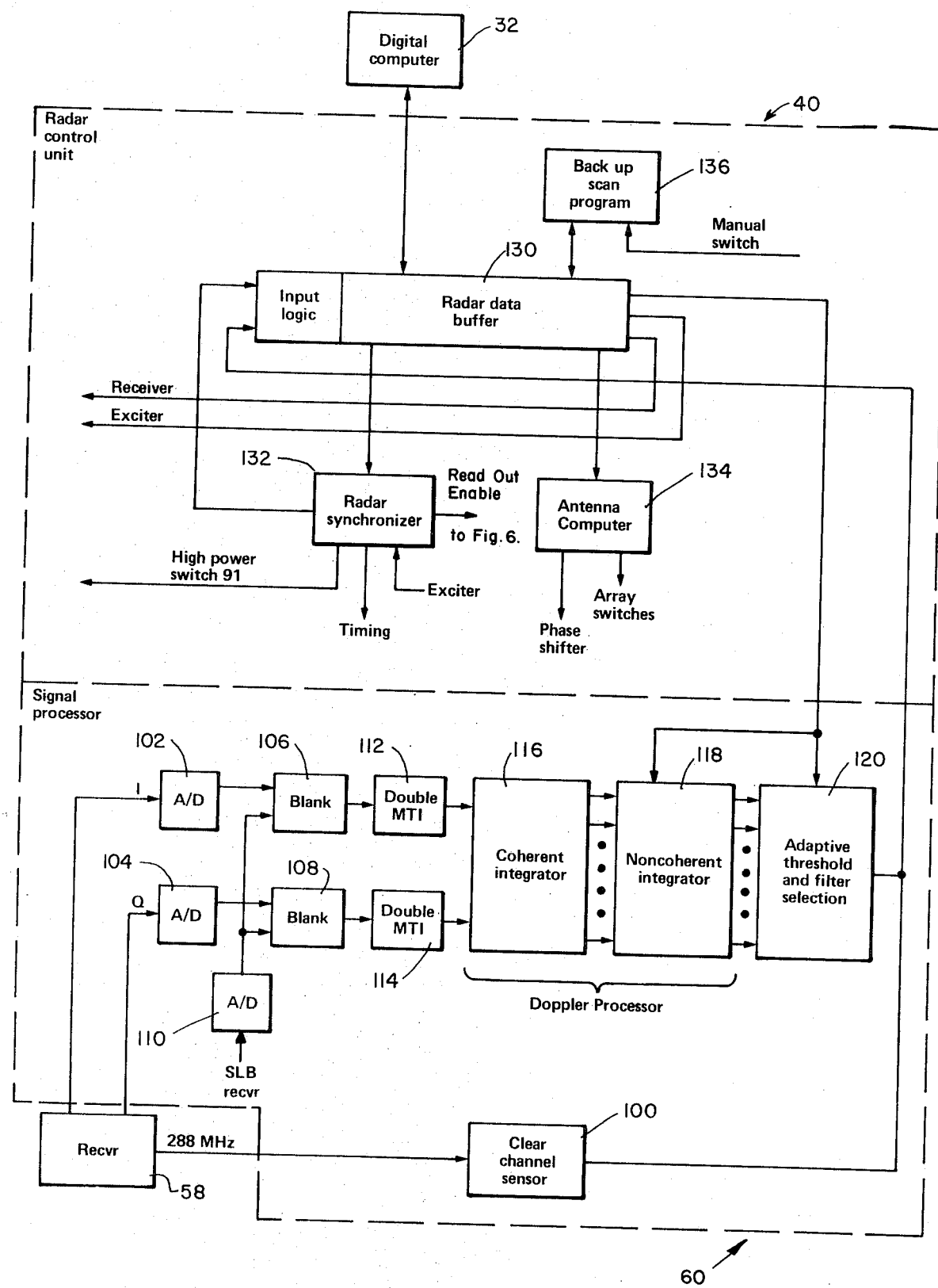

FIG. 4 -Signal Processor and Radar Control Unit

Attention is now called to FIG. 4 which illustrates a more detailed block diagram of the signal processor 60 and radar control unit 40 discussed in FIG. 3a. The signal processor 60 includes a clear channel sensor 100 which is preferably responsive to the output of the first converter (not shown) of the receiver 58 to provide a measurement of any noise jamming signal or other interference being received through a selected antenna in a specified direction (azimuth) by detecting passively any electromagnetic energy within the 150 MHz system bandwidth. More particularly, the clear channel sensor 100 uses the nominal channel output from the momentarily inactive but beam steered array, 46, 48, 50 or 52 at a time $T_{CCS}$ (to be discussed hereinafter) immediately after the selection of the array and the setting of the phase shifters for that array and prior to the dwell.

Briefly, the clear channel sensor 100 is preferably comprised of 32 bandpass filters (not shown), each connected to receive the 288 MHz output from the first converter of the radar receiver 58, and each centered on a different one of 32 frequencies to be used to transmit track beams. The frequencies are equally spaced between 1225 and 1375 MHz. the output of each filter is separately integrated in a lossy integrator to developo a time-average signal proportional to noise, jamming and other interference. Each time-average signal is then separately sampled and converted to digital form to provide a 3-bit number indicative of how clear the channel is, a binary number 000 indicating the clearest condition, and 111 indicating the worst condition. The 3-bit jam numbers for the 32 frequencies are supplied to the radar control unit 40 for communication to the digital computer as will be discussed hereinafter.

Aside from the clear channel sensor 100, the remainder of the signal processor 60 is preferably completely digitally implemented. All memory elements within the signal processor are preferably mechanized using metal oxide silicon (MOS) registers. Since random access of data is not necessary, shift registers can be utilized eliminating the requirement for an addressing function. Only clock signals are needed to sequentially control the input/output data flow.

The signal processor includes a pair of analog-to-digital converters 102 and 104 which sample and quantize the in-phase and quadrature analog phase detected video returns into eleven bit digital words (10 bits + sign). A sampling rate of several thousand samples per sweep (PRF interval) is provided. The digital format is maintained throughout the signal processor, the advantage being that once the information is converted to digital form, the stringent stability requirements no longer apply and data need only be time coherent to the extent of the range resolution cell. Subsequent to conversion by converters 102 and 104, the I and Q digital signals are respectively applied to sidelobe blanking (SLB) logic circuits 016 and 108. The output of the previously mentioned sidelobe blanking receiver 84 is also applied to the circuits 106 and 108 via an analog to digital converter 110. The blanking logic circuits 106 and 108 function to compare the sidelobe video signal from the receiver 84 with that of the main video signal from the receiver 84 with that of the main video signal from the receiver 58. Noise effects will appear in both the sidelobe and main video signals and can therefore be eliminated by blanking the main video signal when the ratio of the sidelobe signal to the main video signal exceeds a given threshold. Consequently, the function of the blanking circuits 106 and 108 is to compare the ratio of the sidelobe and main video signals and to blank the main video signal when the ratio therebetween exceeds a predetermined threshold.

The digital output signals from the sidelobe blanking logic circuit 106 and 108 are respectively applied to digital, double MTI cancellers 112 and 114, respectively, to provide "whitening" of the signals. These elements will be discussed in greater detail hereinafter in connection with FIG. 5. Suffice it to say at this time that the cancellers function to "whiten" the spectrum and reduce the dynamic range by cancelling main lobe clutter. The outputs of the cancellers 112 and 114 are applied to a doppler processor which provides further signal to clutter enhancement and signal to noise improvement. The doppler processor is comprised of a coherent integrator 116 including a bank of thirteen digital doppler filters and a noncoherent integrator 118 which performs up to four summations. The doppler processor will be discussed in greater detail in connection with FIG. 6.

The output of the doppler processor is applied to an adaptive threshold and filter selection network 120. Briefly, the function of the network 120 is to compare each of the 13 digital signals applied thereto from the doppler processor against 13 digital threshold values supplied to the network 120 by the radar control unit 40. The network 120 indicates those of the 13 digital inputs that exceed their corresponding threshold value and, in addition, which of the 13 inputs is largest.

The radar control unit 40 will be discussed in detail in the subsequent consideration of FIGS. 7-10. At this juncture, it is appropriate to point out that the radar control unit 40 is comprised of four major units including the radar data buffer 130, the radar synchronizer 132, the antenna phase computer 134, and the backup scan program unit 136.

As will be seen hereinafter, the function of the radar data buffer 130 is to control the transfer of data between the radar control unit and the digital computer system 32. That is, beam return reports assembled as a consequence of information provided by the signal processor 60 are assembled in the radar data buffer for transmission to the computer system 32. Further, the radar data buffer functions to store the radar control command provided to the radar control unit by the digital computer system 32.

The radar synchronizer 132 receives a stable reference signal from the previously mentioned exciter 54 and control information from the radar data buffer 130 to in turn develop timing signals necessary to control and synchronize the operation of the various elements in the radar system. These timing signals are discussed hereinafter in connection with FIG. 8.

The antenna phase computer 134, to be discussed in connection with FIG. 9, performs phase calculations to control the high power switch/duplexer 91 and phase shifters so as to cause a radar beam to be fired as dictated by the radar control commands stored in the radar data buffer.

Figure 10:
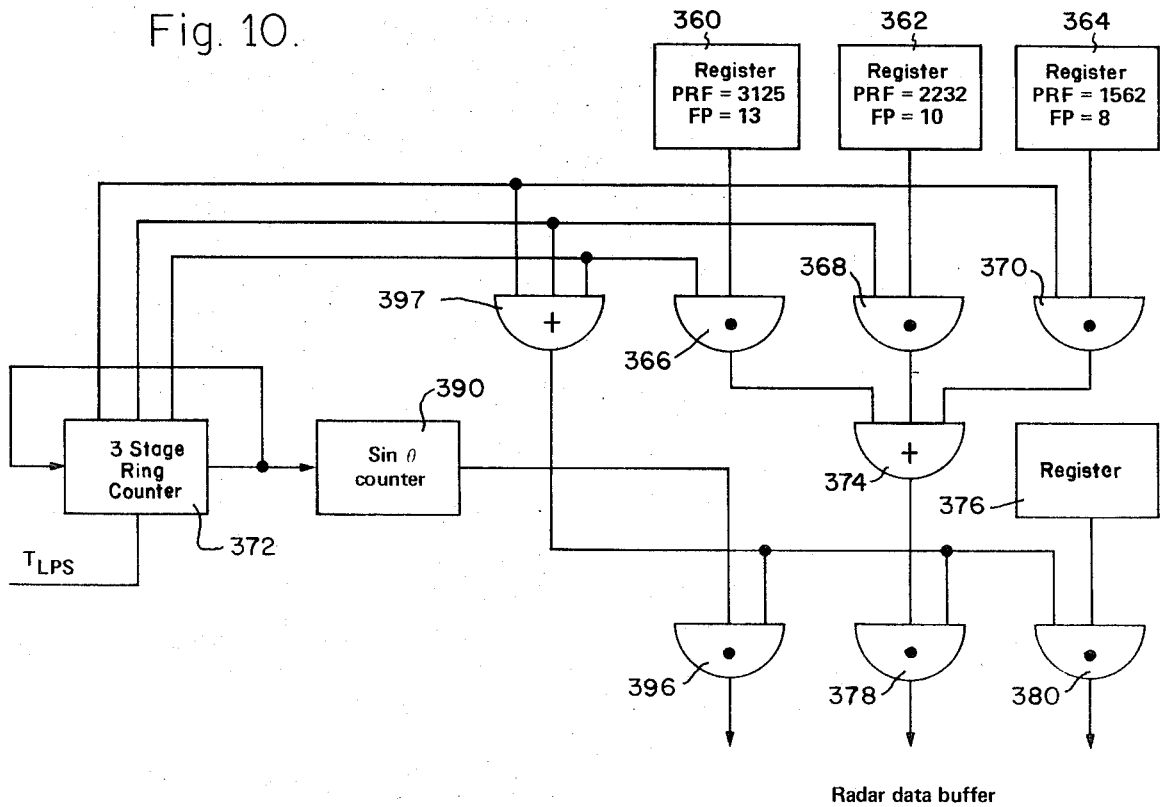
FIG. 10 is a block diagram of the backup scan programmer of the radar control unit of FIG. 4.

The backup scan program unit 136 to be discussed hereinafter in connection with FIG. 10 provides a fixed sequence of control commands to the radar data buffer, as defined by operator controlled manual switches, when the digital computer 32 is, for some reason, not functioning.

Figure 5:
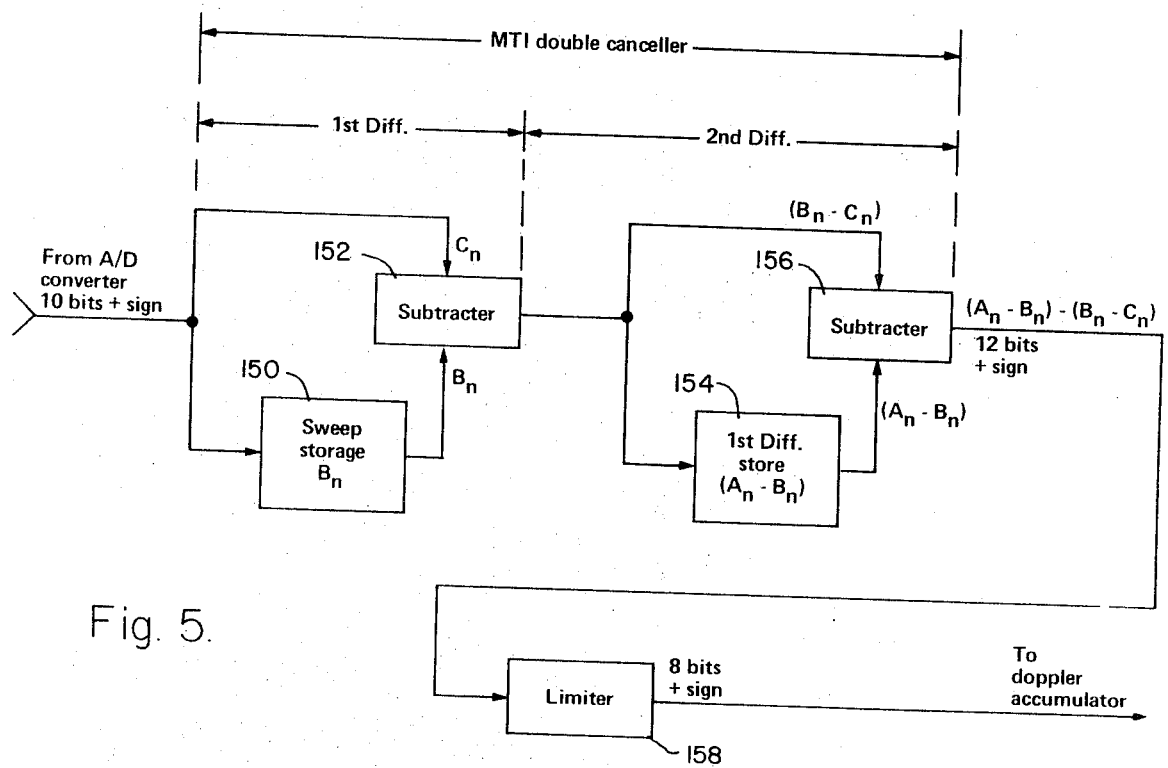
FIG. 5 is a block diagram of a digital double MTI processor utilized in the signal processor of FIG. 4.

FIG. 5 - Double MTI Canceller

Attention is now directed to FIG. 5 which illustrates the details of one of the double MTI cancellers 112 or 114, previously discussed in connection with FIG. 4. It will be recalled that the cancellers 112 and 114 respectively operate on in-phase and quadrature video signals to provide whitening of the signal. Each double MTI canceller solves the equation.

$$(A_n - B_n) - (B_n - C_n)$$

where A, B, and C are correlated returns during successive range sweeps ($n$ being the corresponding range cell within a range sweep). In order to solve the foregoing equation, storage devices are required to accumulate data from previous range sweeps. Since access to the range coil data is required in sequence for cells 1, 2, 3 ... $n$ during successive range sweeps A, B, C, shift registers can be advantageously employed for storage.

As shown in FIG. 5, the input to the double MTI cancellor is an 11 bit word consisting of 10 amplitude bits plus a sign bit. The operation of the double cancellation process is as follows. The sequential range cell data words from sweep A are clocked through a first sequential shift register memory 150 at a rate such that $A_1$ (range cell 1, transmission A) is at the output of the memory at the same time $B_1$ data is available at the input. The difference $A_n - B_n$ is formed at the output of subtractor 152 and shifted through a second memory 154, while the $B_n$ data is being shifted through the memory 150. The same procedure is repeated for the data from the sweep C to provide the difference $B_n - C_n$ at the output of the first subtractor 152 and $$(A_n - B_n) - (B_n - C_n)$$

at the output of the second subtractor 156.

The double cancelled MTI output is limited to 8 bits plus sign by a limiter 158. Limiting is desirable since a large dynamic range is not required after clutter cancellation.

Figure 6:
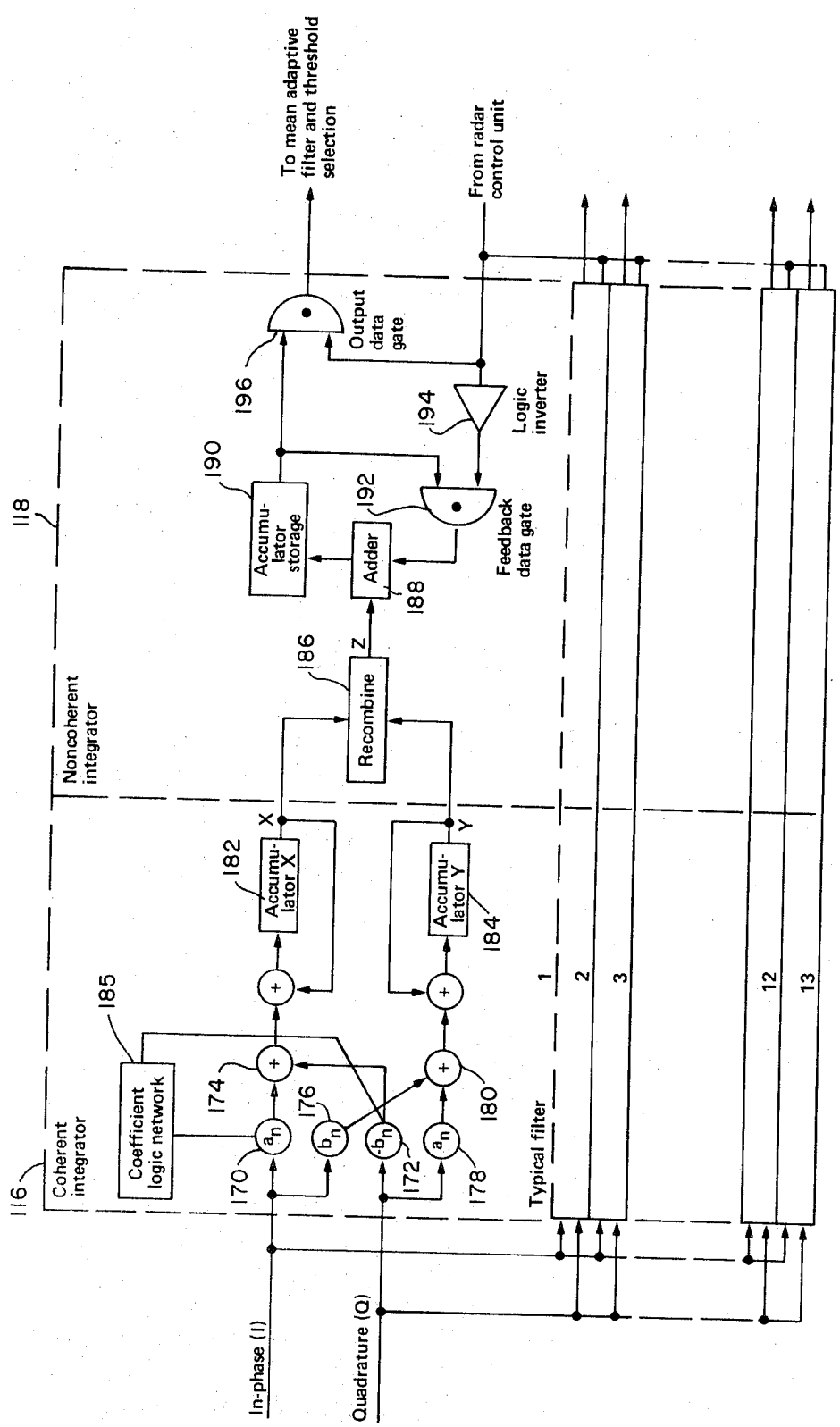
FIG. 6 is a block diagram of a doppler processor including the coherent integrator and noncoherent integrator utilized in the signal processor of FIG. 4.

FIG. 6 - Coherent Integrator and Noncoherent Integrator

Attention is now directed to FIG. 6 which illustrates a more detailed block diagram of the doppler processor mentioned in FIG. 4 as including a coherent integrator 116 and noncoherent integrator 118, both digitally implemented. The function of the coherent and noncoherent integrators 116 and 118 is of course to isolate the doppler information associated with moving targets.

The coherent integrator 116 as represented in FIG. 6 is comprised of a bank of complex digital filters each of which is supplied with the in-phase and quadrature digital outputs of the double MTI cancellers 112 and 114 respectively. The filters of the coherent integrator 116 are respectively centered at $N$ (PRF/16) where $N$ is an integer, and each filter has a bandwidth of PRF/16. It follows of course that the coherent integrator 116 would be comprised of 16 bandpass filters. However, as shown in FIG. 6, only the center fourteen of the 16 filters need be implemented since the edge filters are not useful because they would yield a relatively low signal to noise (S/N) enhancement ratio because of the main lobe clutter and low MTI gain at the extremities of the PRF interval. A further one of the fourteen filters, that located at the zero doppler position, can also be deleted because, as will be seen hereinafter, a ground doppler offset value $\Delta F_{GDO}$, provided by the computer as part of the radar control command is used by the receiver local oscillator to effectively always null what would be the output of that deleted filter.

Each of the thirteen complex filters uses both in-phase (I) and quadrature (Q) components of the received digitized signal and operates by multiplying each of successive orthogonal input samples of a given data pulse interval at a 4 MHz rate by the projected components of a rotating unit vector $a_n$ and $b_n$ on the real and imaginary axes. The coefficients $a_n$ and $b_n$ change from filter to filter and sweep to sweep. The quantity $a_nI$ developed by multiplier 170 is summed with the quantity $-b_nQ$ developed by multiplier 172 in summing network 174. Similarly, the quantity $b_nI$ developed by multiplier 176 and the quantity $a_nQ$ developed by multiplier 178 is summed by network 180. The outputs $a_nI - b_nQ$ and $a_nQ + b_nI$ constitute orthogonal components X and Y of a complex bandpass filter output. Each of these components is summed and stored in shift register accumulators 182 and 184, respectively, with samples of previous data pulse intervals until the completion of sixteen such intervals. In that manner, the radar signal received is filtered and integrated in each of 13 different bandpass channels to develop, when recombined into a vector signal Z in digital form, a signal proportional to the frequency content of the doppler shifted radar signal received in a particular frequency band.

After 16 data pulse intervals, the accumulated orthogonal components $X$ and $Y$ are recombined into a single channel by a recombination network 186 hard-wired to form the sum $Z = X + kY$. The output Z represents an approximation of the signal vector which is then submitted to noncoherent integration. At this point, the filter registers in the coherent integrator 116 are cleared for the first data pulse interval of the next group of 16 data pulses.

Since the input signal to the filter registers in the coherent integrator filters has a dynamic range of eight bits, the shift registers within the filters should be designed for a dynamic range of 12 bits in order to accomodate signal gain through the filters. While truncation of the signals by dropping least significant bits may be implemented at various stages in the doppler processor to minimize hardware, a minimum of three levels per RMS noise voltage should be maintained in order to prevent adverse effects on noise statistics. A nearly exact representation of the filter coefficients $a_n$ and $b_n$ is possible by the use of read only memories. Consequently, filter implementation is extremely flexible and can readily provide for a variety of filter characteristics by means of different sets of coefficients $a_n$, $b_n$. These coefficients are stored in a coefficient logic network 185 including a look-up table addressed by the sequence number of the pulse in the burst since the coefficients are dependent upon whether the pulse is the 1st, 2nd, ..., or 16th in the burst sequence.

The noncoherent integrators 118 performs a summing operation on successive groups of data pulses for each of the thirteen coherent integrator filters. Since quadrature recombination performed in network 186 constitutes envelope detection, the effects of a summation is noncoherent video integration. The noncoherent integrator is designed to sum up to four sixteen data pulse groups, the number of such groups being controlled by the radar control unit in response to a burst number B contained in the radar control command.

The operation of the noncoherent integrator 118 is essentially that of a summer (adder 118 and accumulated storage registers 190). In operation, the data is acquired by the noncoherent integrator from the filters of the coherent integrator 116, and added sweep by sweep for each range cell to existing data which arrives via the feedback data AND gate 192. When the predetermined number of integrations have been performed (up to four) as defined by the radar control command, the radar control unit inhibits the feedback data gate 192 via the logic inverter gate 194 and enables the output data AND gate 196 which interfaces with the adaptive threshold circuits 120 of FIG. 4. During this time the feedback data gate yields zero output and allows entry of the first group of data pulses of the next dwell. Because of the 16 pulse integrations performed by the coherent integrator, the operating speed of the noncoherent integrator is only 250 KHz.

Figure 7A:
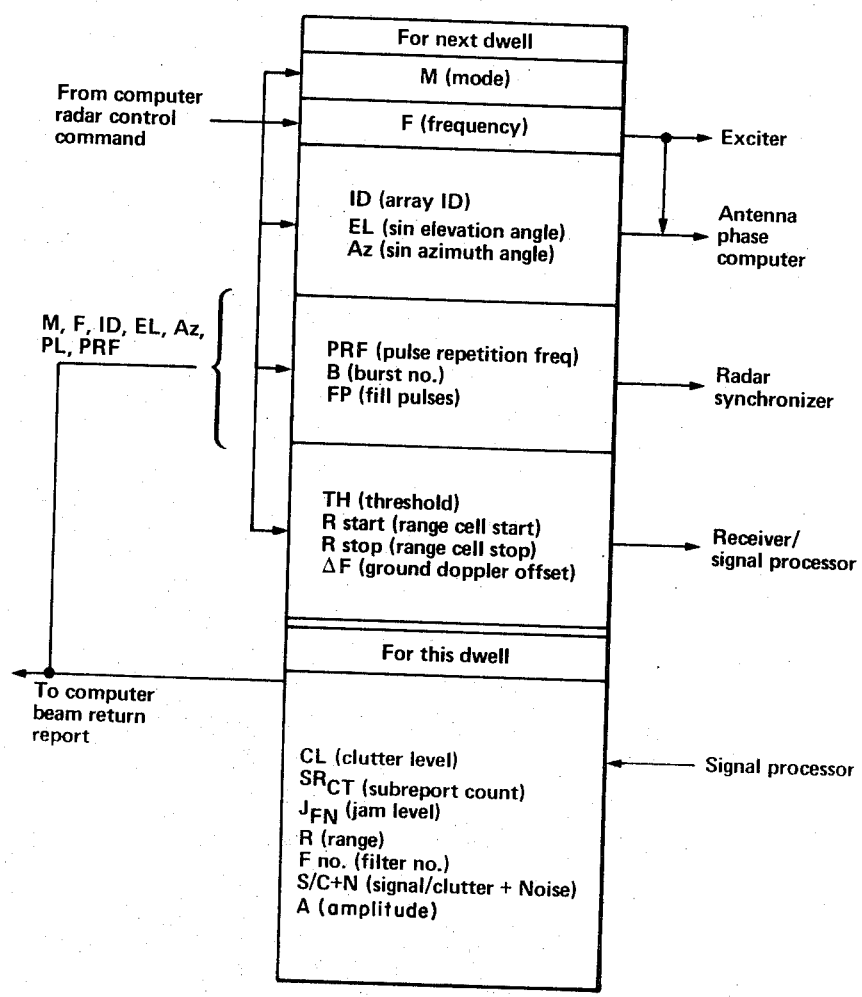
FIG. 7a is a representative diagram of a storage page in the radar data buffer of the radar control unit of FIG. 4 listing the items of information contained within a radar control command and a beam return report.

FIG. 7a - Radar Data Buffer

FIG. 7b - Radar Control Command Format

FIG. 7c - Beam Return Report Format

Reference was previously made in connection with FIG. 4 to the radar data buffer 130 which constitutes part of the radar control unit 40. The radar data buffer comprises a digital memory capable of storing radar control commands supplied thereto from the digital computer 32 and beam return reports supplied thereto by the signal processor 60 for subsequent transmittal to the digital computer 32.

In accordance with the preferred embodiment of the invention, the radar data buffer contains two pages of storage, each page having the capacity to store the information shown in the single page depicted in FIG. 7a. Radar control commands are loaded into the two pages alternately from the digital computer 32. While one page is being loaded, the control command in the other page is controlling the beam being fired with that other page also acting to store the beam return report being assembled.

Considering first the radar control command, attention is called to FIGS. 7a and 7b. As noted, FIG. 7a illustrates the information contained within a typical data buffer page. FIG. 7b illustrates the format of a radar control command, assuming an 18 bit word length, characteristics of the preferred computer system embodiment to be discussed hereinafter.

As shown in FIG. 7b, a typical radar control command is comprised of six, 18 bit words. In accordance with the exemplary bit allocation represented in FIG. 7b, the respective fields have the following significance:

word 0; bits 1 and 2 are used to identify a particular one of the four antenna arrays;

word 0; bits 3-5 are used to identify a beam mode, i.e., whether the beam to be fired is being used for search or track purposes, for example;

word 0; bits 6-17 are used to define the sine of the azimuth angle relative to broadside, at which a beam is to be fired;

word 1; bits 1-5 are used to define the frequency of the pulses to be fired;

word 1; bits 6-17 are used to identify the sine of the elevation angle with respect to broadside, at which a beam is to be fired;

word 2; bits 0-5 are used to define a threshold value which is used by the radar control unit to set the threshold of the adaptive threshold network 120 of FIG. 4;

word 2; bits 6-17 are used to define the value $\Delta F_G$ which represents the ground doppler offset and is effectively that value which compensates for the motion of the airborne platform relative to the ground.

word 3; bits 3-4 are used to define a burst number, which as will be seen hereinafter, is employed by the radar control unit to control the number of data pulse groups fired during each dwell.

word 3; bits 5-17 are used to define a range start cell;

word 4; bits 5-17 are used to define a range stop cell, the range start and stop cells defining a range window or time interval during which the radar is responsive to return beams;

word 5; bits 2-5 are used to define the number of fill pulses in the beam to be fired (to be discussed in more detail hereinafter in connection with FIG. 8);

word 5; bits 6-17 are used to define the PRF (pulse repetition frequency) of the beam to be fired.

FIG. 7a illustrates a typical page of the radar data buffer and shows where each of the fields of the radar control command is routed. Thus, the frequency field of the radar control command (word 1, bits 1-5) is used by the exciter 54 (FIG. 3) and the antenna phase computer 134 (FIG. 4) and the signal processor 60 (FIG. 4). The array ID, the elevation, and the azimuth information fields are all routed to the antenna phase computer. The PRF, burst member, and fill-pulse fields are all routed to the radar synchronizer 132 (FIG. 4) to be discussed in greater detail hereinafter in connection with FIG. 8. The threshold, R-start, R-stop and $\Delta F_G$ fields are all routed to the receiver 58 and signal processor 60 (FIG. 3a). The information so routed to the various elements of the radar system determine the characteristics of the beam to be fired and in addition set up the receiver and signal processor to enable them to interpret the return beam.

Attention is now called to FIG. 7c which illustrates the format of a typical beam return report communicated from the radar control unit 40 to the digital computer 32 (FIG. 4). Again, the format in FIG. 7c assumes an 18 bit digital word. As shown, each report is comprised of a header portion which includes nine words and a report portion which includes two words for each target reported. That is, only one nine word header is reported back to the digital computer per beam dwell. For each target return corresponding to that dwell, and meeting certain criteria entered into the receiver and signal processor as a consequence of the radar control command, a two word subreport is assembled that is part of the beam return report.

The beam return header includes several items of information supplied to the radar data buffer 130 by the radar control command. With respect to these items, the radar data buffer is merely returning to the computer that which the computer defined in the radar control command. These items of information and their field location in the beam return report header as shown in FIG. 7c are as follows:

word 0; bits 1-5 are used to define frequency;

word 0; bits 6-17 are used to define the sine of the azimuth angle word 1; bits 6-17 are used to define the sine of the elevation angle;

word 2; bits 7 and 8 are used to identify the array;

word 2; bits 15-17 are used to define the mode;

word 8; bits 6-17 are used to define PRF.

In addition to the foregoing items of information entered into the radar data buffer 130 in response to a radar control command, and thereafter merely returned to the computer as part of a beam return report, the header contains the following items of information;

word 1; bits 1-5 are used to define clutter level word 2; bits 9-14 are used to identify the number of subreports, i.e., the number of detected targets, which are being reported following the particular header, it being recalled that each of the subreports contains two 18-bit words;

words 3-7; bits 0-17 and word 8; bits 0-5 are used to define a three bit (eight level) jam number with respect to each of the 32 transmit frequencies.

Each two word subreport contains the following information fields:

word 0; bits 5-17 are used to define a range which may be ambiguous;

word 1; bits 1-4 are used to represent the signal to clutter plus noise ratio;

word 1; bits 5-13 are used to define the amplitude of the returned signal; and word 1; bits 14-17 are utilized to define the filter number of the largest return signal which of course indicates the doppler frequency, where the filters are numbered successively in order of increasing doppler frequency.

As shown in FIG. 7a, this information is entered into the radar data buffer from the signal processor.

In addition to the radar control command supplied from the computer to the radar data buffer and the beam return report supplied from the radar data buffer to the computer, timing signals are also communicated therebetween. Thus, a timing signal $T_{BL}$ is communicated from the computer to the radar data buffer to signal completion of the loading of a radar control command into the buffer. On the other hand, timing signals in the form of an interrupt to the computer are provided by the radar buffer as follows:

$T_{LPS}$ which advises the computer that the data buffer can accept new data from the computer; and $T_{DA}$ which signals the computer that data is available in the radar data buffer for communication to the computer.

These timing signals will be discussed in greater detail hereinafter with reference to FIG. 8.

Figure 8A:
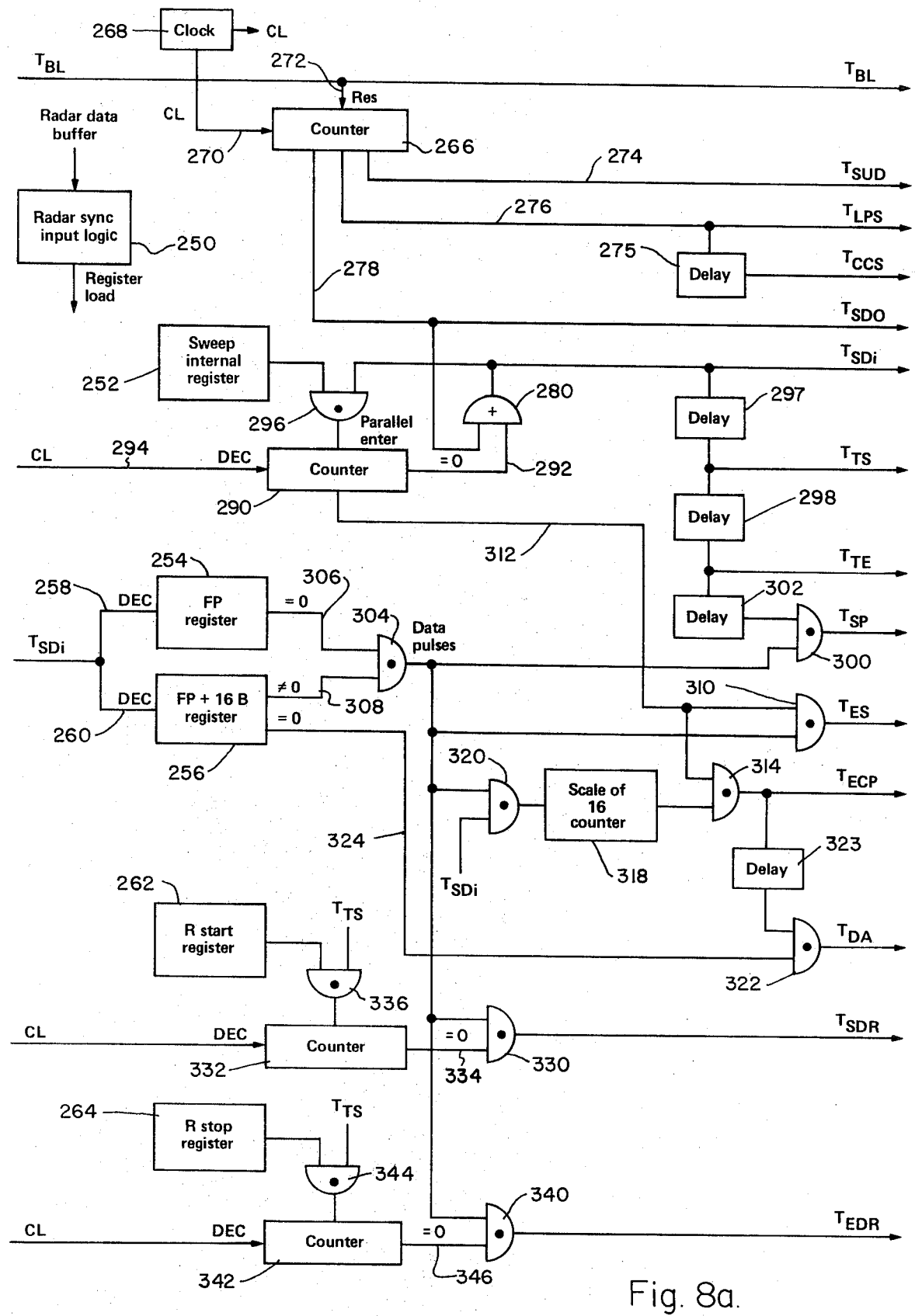
FIG. 8a is a block diagram of the radar synchronizer of the radar control unit of FIG. 4.
Figure 8B:
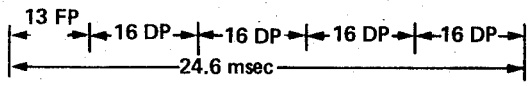
FIG. 8b is a beam timing and format diagram illustrating the dwells associated with a typical search beam and a typical track beam.
Figure 8B:
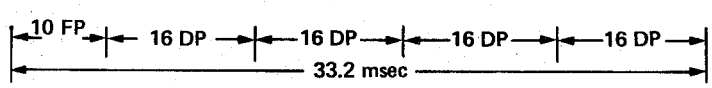
Figure 8B:
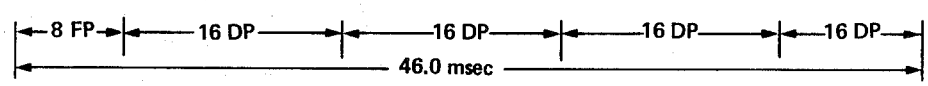
Figure 8B:
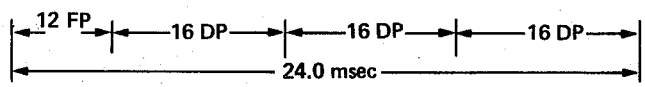
Figure 8B:
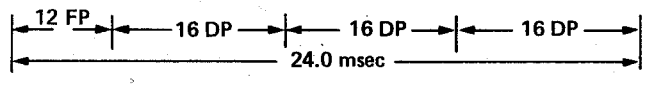

FIG. 8a - Radar Synchronizer

FIG. 8b - Beam and Timing Format Diagram

Figure 8C:
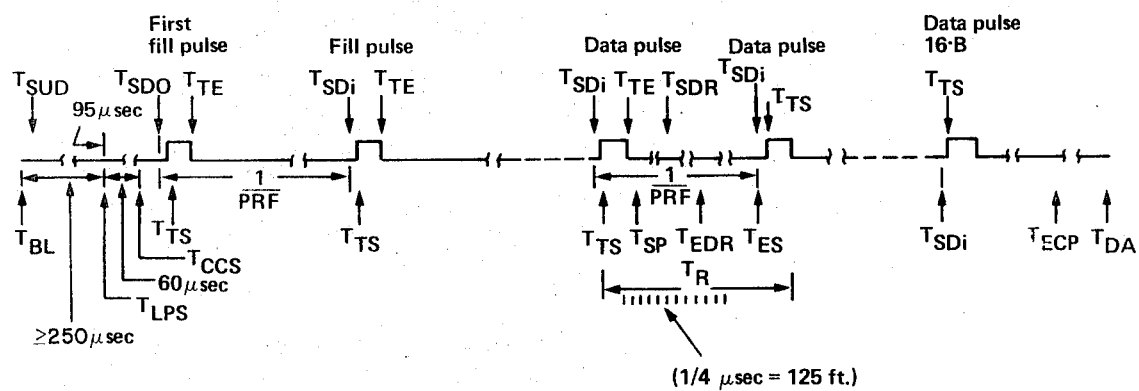
FIG. 8c equals transmission is a pulse timing diagram illustrating the timing signals associated with each transmitted fill pulse and data pulse.

FIG. 8c - Pulse Timing Diagram

Attention is now called to FIG. 8a which illustrates a block diagram of the radar synchronizer 132 previously referred to in connection with FIG. 4. The radar synchronizer 132 comprises registers, counters, and simple logic circuits which operate in response to applied input information to produce output timing signals, as will be discussed in greater detail hereinafter. The items of input information applied to the radar synchronizer input logic 250 from the radar data buffer consists of the pulse repetition frequency (PRF), burst number (B), and fill pulse number (F.P.). In addition, a timing signal $T_{BL}$ generated by the computer to represent that the buffer has been loaded is also applied to the radar synchronizer 132. In response to these input signals, the radar synchronizer 132 gates out the output timing signals illustrated in FIG. 8a which are then routed throughout the system as will be discussed hereinafter. Prior to considering the various timing signals, however, attention is called to FIG. 8b which illustrates the beam and timing format of a typical search beam and a typical track beam.

In the search mode, search beams are fired from the four antenna arrays at a plurality of different azimuth angles. It has previously been assumed herein that there exists 92 azimuth positions throughout the 360° at which search beams are to be fired. The typical search beam fired at any of these 92 positions is represented in FIG. 8b and can be seen to consist of three distinct dwells. A first dwell is indicated as consisting of seventy seven pulses at a pulse repetition frequency of 3125 PPS. The second dwell is illustrated as consisting of seventy four pulses at a PRF of 2232 PPS. The third dwell in the typical search beam illustrated is shown to consist of 72 pulses at a PRF of 1562 PPS. Multiple PRF's are employed in the search beam in order to maximize doppler and range visibility. The use of multiple PRF's is discussed at page 129 of the aforecited "Introduction to Radar Systems."

Each search beam dwell consists of a number of fill pulses followed by four groups of 60 data pulses each. Fill pulses are fired prior to the data pulses in order to assure that the same clutter pattern is seen for each data pulse. That is, in order to better enable the signal processor 60 to isolate a return pulse from the clutter, it is advantageous that all of the return pulses be superimposed on the same clutter pattern. This is assured by generating a sufficient number of fill pulses prior to the data pulses. The number of fill pulses required is dependent on the system range and the pulse repetition frequency being used and can be determined by the computer 32 by use of a simple table look-up routine. The number of fill pulses for each dwell is indicated as part of the radar control command. As shown in FIG. 8b, the higher the pulse repetition frequency, the greater the number of fill pulses required. Thus, for PRF's of 3125 PPS, 2232 PPS and 1562 PPS, 13, 10, and 8 fill pulses are acquired, respectively. The total duration of each of the search beam dwells is approximately 24.6 mseconds, 33.2 mseconds, and 46.0 mseconds, respectively.

Also shown in FIG. 8b is a typical track beam consisting of two identical dwells (identical as to pulse configuration and PRF). As will be discussed hereinafter, they differ only in that they are offset from a defined azimuth angle Z so that the first track beam dwell is fired at an azimuth angle $Z - \Delta Z$ and the second track beam dwell is fired at an azimuth angle $Z + \Delta Z$. This technique is referred to as sequential lobing and is referred to on page 165 of the aforecited "Introduction to Radar Systems." Each of the track beam dwells consists of a group of 12 fill pulses plus three groups of 16 target data pulses. The number of groups of data pulses is defined by the burst member (B) field of a radar control command and, as represented in FIG. 7b, can comprise anywhere from one to four groups in accordance with the preferred embodiments of the invention.

Attention is now called to FIG. 8c which illustrates the timing signals generated in association with the fill and data pulses of a dwell, regardless of whether the dwell is part of a search or a track beam. The timing signals and their significance are as follows:

$T_{BL}$ - As has been previously pointed out, the timing signal $T_{BL}$ is provided to the radar synchronizer 132 from the digital computer 32 to indicate that the buffer 130 has been loaded and that the information therein can now be used to energize the arrays to fire a beam. $T_{BL}$ occurs only once per dwell, prior to the first fill pulse.

$T_{SUD}$ - A timing signal $T_{SUD}$ occurs in response to and shortly after the timing signal $T_{BL}$ and initiates an interval during which several operations are performed to set up for the ensuing dwell: specifically, azimuth and elevation calculations are performed in the antenna phase computer to point the beam; gate selections within the radar synchronizer are made to set up the appropriate PRF, burst member, number of fill pulses; the exciter 54 is set up in accordance with the frequency specified in the buffer; and a threshold specified by the radar control command is entered into the adaptive threshold network 120 of the signal processor 60. $T_{SUD}$ occurs only once per dwell, prior to the first fill pulse, and is coupled to the antenna phase computer 134, exciter 54, receiver 58 and signal processor 60.

$T_{LPS}$ - The timing signal $T_{LPS}$ occurs approximately 250 microseconds after the timing signal $T_{SUD}$ and is coupled to the antenna phase computer 134, exciter 54, receiver 58, signal processor 60 and backup scan programmer 136. In response to the timing signal $T_{LPS}$, the phase shifters (FIG. 3a) are loaded and the high power switch 91 is operated, all in accordance with the calculations of the antenna phase computer 134. Additionally, the buffer 130 is cleared for new data and the logic for PRF, burst number, and fill pulse number within the radar synchronizer, frequency within the exciter, and threshold within the adaptive threshold network, are enabled in accordance with the calculations performed during the interval initiated by the timing signal $T_{SUD}$. Approximately 95 microseconds after the generation of the timing signal $T_{LPS}$, the first fill pulse is generated. It will be assumed herein that the duration of each fill pulse and each data pulse is 31 microseconds. However, the rate at which these pulses are generated, i.e., the space between successive fill pulses and data pulses is determined by the PRF specified.

$T_{CCS}$ The timing signal $T_{CCS}$ occurs approximately 60 microseconds after the timing signal $T_{LPS}$. This signal is used to initiate the clear channel sensor 100 in the signal processor. The SDO signal described hereinafter is used to complete the clear channel sensing process and to transfer the data to the radar data buffer.

The aforementioned timing signals $T_{BL}$, $T_{SUD}$, $T_{LPS}$, and $T_{CCS}$ are generated only once per dwell, prior to the first fill pulse. The following timing signals are associated with the generation of each and every pulse, regardless of whether the pulse constitutes a fill pulse or a data pulse:

$T_{SDi}$ - The timing signal $T_{SDi}$ for the first fill pulse, i.e., $T_{SD0}$ where $i = 0$, occurs approximately 95 microseconds after the timing signal $T_{LPS}$. For all subsequent pulses, the timing signal $T_{SDi}$ occurs [(1/PRF)-5] microseconds after the timing signal $T_{TS}$. The timing signal $T_{SDi}$ functions to switch the high power switch/duplexer from receive to transmit, and to stop range counting.

$T_{TS}$ - Each timing signal $T_{TS}$ is generated 5 microseconds after each timing signal $T_{SDi}$ and is coupled to the exciter 54 to initiate the transmission of a pulse.

$T_R$ - Range timing signals $T_R$ are generated at quarter microsecond intervals, each interval representing 125 feet of range, beginning one quarter microsecond after the timing signal $T_{TS}$.

$T_{TE}$ The timing signal $T_{TE}$ occurs 31 microseconds after the timing signal $T_{TS}$ and functions to end transmission and switch the duplexer from transmit to receive. $T_{TE}$ is coupled to the duplexers and exciter 54.

The following timing signals also shown in FIG. 8c are uniquely associated with each of the data pulses:

$T_{SP}$ - The timing signal $T_{SP}$ occurs 5 microseconds after the timing signal $T_{TE}$ and is coupled to the signal processor 60 to start data collection in the coherent integrator 116.

$T_{SDR}$ - The timing signal $T_{SDR}$ occurs at a time determined by the R-start information contained within the radar control command and is coupled to the signal processor 60 to initiate range gating.

$T_{EDR}$ - The timing signal $T_{EDR}$ occurs at a time defined by the R-stop information in the radar control command and is coupled to the signal processor 60 to end the range data collection interval, i.e., to terminate range gating.

$T_{ES}$ - The timing signal $T_{ES}$ occurs coincident with the timing signal $T_{SDi}$ during data pulse intervals and is coupled to receiver 58 and signal processor 60 to define the end of a data collection interval for a pulse.

The following timing signal also shown in FIG. 8c is uniquely associated with the last data pulse in each group of sixteen data pulses: $T_{ECP}$ - A timing signal $T_{ECP}$ occurs at the same time as the previously mentioned timing signal $T_{ES}$ but whereas $T_{ES}$ occurs for each data pulse, $T_{ECP}$ occurs only every 16th data pulse. $T_{ECP}$ is coupled to signal processor 60 to end coherent processing and shift data from the coherent integrator 116 to the noncoherent integrator 118 and to clear the coherent integrator 116.

The following timing signal, also shown in FIG. 8c, is uniquely associated with the 16th data pulse in the last data pulse group (B):

$T_{DA}$ - The timing signal $T_{DA}$ occurs a fixed time after $T_{ECP}$ associated with the last data pulse in a dwell. $T_{DA}$ is coupled to the signal processor 60 and the radar data buffer 130 to shift data out of the noncoherent integrator 118 to the radar data buffer and to clear the noncoherent integrator.

From the foregoing discussion of the timing signals, it should be apparent that the entire sequence of timing signals supplied by the radar synchronizer is initiated in response to the timing signal $T_{BL}$ supplied by the computer. Of course, one timing signal $T_{BL}$ is supplied by the computer for each dwell since each dwell requires that the computer supply the radar data buffer with a new radar control command. For a search beam, the timing signal $T_{SDR}$ coincides with $T_{SP}$ and the timing signal $T_{EDR}$ coincides with $T_{ES}$. For track, $T_{SDR}$ and $T_{EDR}$ are set in accordance with the R-start and R-stop fields of the radar control command.

Attention is now again specifically directed to FIG. 8a which illustrates a block diagram of the radar synchronizer 132 for generating each of the timing signals illustrated in FIG. 8c. The radar synchronizer includes an input logic circuit 250 which is responsive to the radar control command (FIGS. 7a and 7b) to load various registers contained within the radar synchronizer.

The radar synchronizer contains a sweep interval register 252 which is used to store a count representing the interval (1/PRF) between successive pulses. Register 252 is loaded by the input logic circuit 250 in response to the PRF indicated in the radar control command. The count loaded into the register 252 is preferably expressed in terms of a number of range timing signals $T_R$, i.e., in terms of one-quarter microsecond intervals. By way of example, for a PRF equal to 2500 PPS, 1/PRF = 400 microseconds meaning that a count of 1600 would be stored in the sweep interval register 252.

The radar synchronizer contains a second register 254 which is loaded by the input logic circuit 250 with the number of fill pulses specified by the radar control command. Register 256 is loaded with a count equal to the total number of pulses (i.e. fill pulses plus data pulses = FP + 16·B) in the dwell defined by the radar control command. Register 254 and 256 are implemented as decrementing counters having decrementing input terminals 258 and 260, to be discussed hereinafter.

The radar synchronizer also includes a register 262 which is loaded by the input logic circuit 250 with the number of the $R_{start}$ cell. Register 264 is loaded with the number of the $R_{stop}$ cell.

In addition to the aforementioned registers 252, 254, 256, 262 and 264, which are loaded by the input logic circuit 250, the radar synchronizer includes a plurality of binary counters. More particularly, a counter 266 is provided which is used to count clock pulses supplied at one-quarter microseconds intervals by clock pulse source 268. The reset input terminal 272 is connected to receive the timing signal $T_{BL}$ from the computer. Thus, $T_{BL}$ resets the counter 266 to zero and thereafter counter 266 counts the clock pulses generated by source 268 throughout the entire dwell. Counter 266 has a plurality of output terminals which provide output signals in response to particular counts defined therein. Thus, the signal $T_{SUD}$ is provided on counter output terminal 274 a short fixed time interval after the signal $T_{BL}$. The timing signal $T_{LPS}$ is provided on output terminal 276, 250 microseconds after the occurrence of $T_{BL}$ and a signal $T_{CCS}$ is provided by delay means 275, 60 microseconds after the occurrence of $T_{LPS}$. Output terminal 278 provides the signal $T_{SDO}$ 95 microseconds after the occurrence of $T_{LPS}$. The timing signal $T_{SDO}$ is applied to the input of an OR gate 280 whose output is connected to provide the signal $T_{SDi}$. It will be recalled that the timing signal $T_{SDO}$ occurs prior to the first fill pulse in each dwell. Thereafter, the timing signal $T_{SDi}$ occurs prior to each of the other fill and data pulses in the dwell. All $T_{SDi}$ pulses subsequent to $T_{SDO}$ are produced by counter 290 on output terminal 292 connected to the input of OR gate 280. More particularly, counter 290 is a decrementing binary counter having a decrementing input terminal 294. The output of clock pulse source 268 is connected to decrementing input terminal 294. Counter 290 is loaded from register 252 by an AND gate 296 which is enabled by the output of OR gate 280. Thus, upon the occurrence of any timing signal $T_{SDi}$ (including $T_{SDQ}$) a count representing the duration of a sweep interval will be entered into the counter 290. This count will then be decremented toward zero in response to pulses provided by clock source 268. When the count in counter 290 reaches zero, output terminal 292 will become true to thereby enable OR gate 280 and produce a timing signal $T_{SDi}$ which reloads counter 290 from register 252.

Timing signal $T_{TS}$ is produced in response to $T_{SDi}$ after a 5 microsecond delay introduced by delay means 297. Timing signal $T_{TE}$ is produced in response to $T_{TS}$ after a 31 microsecond delay introduced by delay means 298. Timing signal $T_{SP}$ is produced by AND gate 300 only during data pulse intervals in response to $T_{TE}$ after a 5 microsecond delay introduced by delay means 302. AND gate 300 is enabled by the output of AND gate 304 only during a data pulse interval.

It has been previously mentioned that the registers 254 and 256 are each decrementing counters. Register 254 is initially loaded with the number of fill pulses in a dwell and register 256 is loaded with the total number, i.e., fill plus data of pulses in a dwell. Both registers 254 and 256 are decremented in response to $T_{SDi}$. After the count in register 254 equals zero, the non zero count in register 256 will indicate data pulse intervals. Register 254 is provided with an output terminal 306 which goes true when the count in register 254 equals zero. Register 256 is provided with an output terminal 308 which is true for so long as the count in register 256 is not zero. Thus, AND gate 304 will be enabled after all of the fill pulse intervals and during the data pulse intervals. As previously mentioned, the output of AND gate 304 enables AND gate 300 to generate the timing signal $T_{SP}$ during data pulse intervals. It similarly enables AND gate 310 during data pulse intervals to generate the timing signal $T_{ES}$ 5 microseconds prior to the end of a pulse interval as defined by counter 290 on output terminal 312.

The signal $T_{ECP}$ occurs concurrently with the signal $T_{ES}$ but only on the 16th data pulse of each data pulse group. Thus, the output terminal 312 connected to the input of gate 310 is also applied to the input of 314. Gate 314 is enabled on every 16th data pulse by the output of a scale of 16 counter 318. The scale of 16 counter is incremented by the output of AND gate 320 in response to the timing signals $T_{SDi}$ during data pulse intervals.

The timing signal $T_{DA}$ is developed by the AND gate 322 which is enabled during the last data pulse interval of a dwell as indicated by the output terminal 324 of register 256 becoming true. Terminal 324 goes true when the counter register 256 has been decremented to zero. When enabled, gate 322 will output the signal $T_{DA}$ a fixed time delay (introduced by delay means 323) after the signal $T_{ECP}$.

The timing signal $T_{SDR}$ is developed by the AND gate 330 only during data pulse intervals as defined by the output of gate 304. Timing signal $T_{SDR}$ will be generated when the output of decrementing counter 322 reaches zero thereby causing its output terminal 34 to become true. Counter 332 is loaded via AND gate 336 from the previously mentioned $R_{start}$ register 262 during every pulse interval in response to timing signal $T_{TS}$. Counter 332 is decremented in response to the clock pulses provided by source 268.

Timing signal $T_{EDR}$ is generated in the same manner as timing signal $T_{SDR}$. That is AND gate 340 is enabled during data pulse intervals by the output AND gate 304. A decrementing counter 342 is loaded from the $R_{stop}$ register 264 via gate 344 during each pulse interval. Counter 354 provides an output pulse on terminal 346 when the count therein reaches zero. This pulse is coupled to AND gate 340 to define the timing signal $T_{EDR}$.

Figure 9:
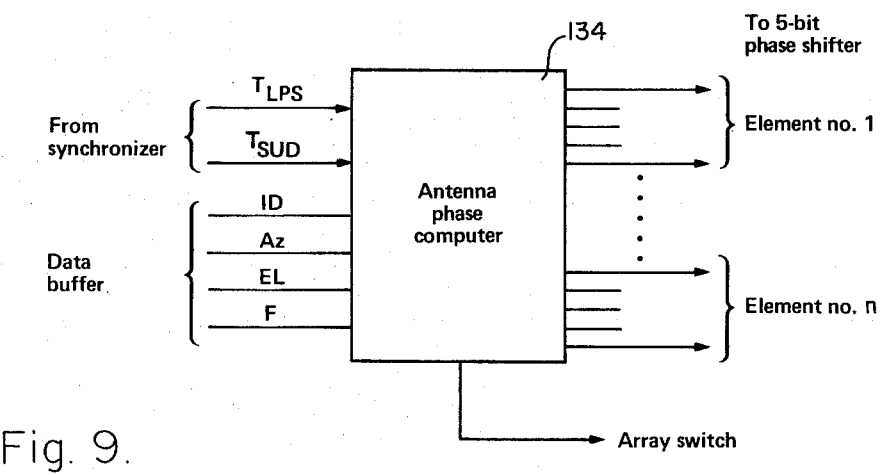
FIG. 9 is a block diagram of the antenna phase computer of the radar control unit of FIG. 4.

FIG. 9 - Antenna Phase Computer

Attention is now called to FIG. 9 which illustrates in greater detail inputs and outputs to a block representing the antenna phase computer 134 previously referred to in connection with FIG. 4. The antenna phase computer 134 is preferably a wired program computer which calculates the phase shift necessary to steer a beam in elevation and azimuth. Assuming equal element spacing with equal signal amplitudes, the phase shifts required for steering in azimuth ($\Phi_{AZ}$) and elevation ($\Phi_{EL}$) are represented by the following expressions:

$$\Phi_{AZ} = 2\pi \ (dF/C) \sin \theta$$

$$\Phi_{EL} = 2\pi \ (dF/C) \sin \Phi$$

where $F$ frequency, $d$ equals spacing between adjacent elements, $C$ equals propagation velocity of electromagnetic radiation, $\theta$ equals the azimuth angle from broadside, and $\Phi$ equals the elevation angle from broadside.

The values of $\sin \theta$, $\sin \Phi$, and $F$, which are contained in the radar control command, are supplied from the radar data buffer to the input of the antenna phase computer 134. The array ID number is also supplied from the radar data buffer to the antenna phase computer. Additionally, the previously mentioned timing signals $T_{SUD}$ and $T_{LPS}$ are applied to the antenna phase computer from the radar synchronizer. In turn, the antenna phase computer 134 calculates the foregoing equations to develop 5 bit digital signals for application to the phase shifters of FIG. 3a to fire a beam from the appropriate array and at the designated azimuth and elevation angles from broadside. Beam steering through the use of variable phase shift elements is discussed in "Introduction to Radar Systems," p. 298.

FIG. 10 - Backup Scan Programmer

Attention is now directed to FIG. 10 which illustrates a block diagram of the backup scan programmer 136 (FIG. 4) which constitutes part of the radar control unit. The primary function of the backup scan programmer is to provide a sequence of radar control commands to the radar data buffer in the event of computer failure. As shown in FIG. 10, the backup scan programmer includes registers 360, 362 and 364 which respectively define different PRF's and number of fill pulses, respectively corresponding to the three dwells of a search beam discussed in connection with FIG. 8b. The outputs of registers 360, 362 and 364 are respectively connected to the inputs of AND gating networks 366, 368 and 370. The gating networks 366, 368 and 370 are respectively enabled by different outputs of a three stage ring counter 372. Ring counter 372 is incremented in response to the previously discussed timing signal $T_{LPS}$. As a single bit circulates through ring counter 372, the contents of registers 360, 362 and 364 are respectively applied to the input of OR gating structure 374.

A register 376 is provided which stores all parameters required for the search beam radar control commands other than PRF and FP which are defined by registers 360, 362, 364 and AZ and ID which are defined by a counter 372 to be discussed hereinafter. The output of gating structure 374 is connected to the input of AND gating structure 378 and the output of register 376 is connected to the input of AND gating structure 380.

Each search beam requires the identification of a different azimuth value ($\sin\theta$). Based on previously indicated assumptions, a full 360° search pattern requires the designation of 92 different azimuth values. In order to generate these 92 different azimuth values, a $\sin \theta$ counter 390 is provided which is incremented once per each cycle of the ring counter 372. The output of the $\sin \theta$ counter is connected to the input of AND gating structure 396. The AND gating structures 396, 378 and 380 are all enabled together in response to a timing signal developed by OR gate 397 to apply a radar control command to the radar data buffer.

Although the backup scan programmer has been disclosed primarily as device for sequentially developing radar control commands in accordance with a fixed pattern when the computer 32 malfunctions, it should be understood that a system in accordance with the present invention could operate independently of the digital computer utilizing a fixed sequencing device such as the programmer depicted in FIG. 10. The information stored in the registers illustrated in FIG. 10 can be wired-in but preferably are are operator controlled as for example by manually operated switches.

FIG. 11 - Digital Computer Operational Flow Diagram

Attention is now called to FIG. 11 which comprises a flow diagram depiction the manner in which the digital computer 32 operates to formulate radar control commands in response to beam return reports supplied thereto from the radar control unit. For the sake of clarity, FIG. 11 has been split into FIGS. 11a, 11b, and 11c. As has been previously mentioned, the preferred implementation of the invention employs a general purpose digital computer programmed to formulate the radar control commands. An actual program for a specified general purpose digital computer, the Hughes Aircraft Company model HM-4118, which implements the flow diagram of FIG. 11 will be presented hereinafter in Appendix A. It is pointed out, however, that the operational sequence represented by the flow diagram of FIG. 11 could be performed by other means such as a hard wire special purpose computer or digital logic network and that the program set forth in Appendix A merely represents the preferred embodiment of the invention.

The blocks illustrated in the flow diagram of FIG. 11 all represent tasks to be executed. The lines interconnecting the blocks describe the sequence of task execution. The diamond shaped blocks represent decision blocks which, in effect, steer the sequence in a particular one of at least two directions. The overall flow diagram will be referred to as a management routine since its purpose is to manage the available time or energy of the primary radar system to optimumly allocate time between different beam modes, such as search or track, and between different arrays or azimuth positions.

The initial block 400 in FIG. 11a is labeled "enter" and depicts the computer entering into execution of the management rountine. The computer 32 may be called upon in an airborne early warning system to perform other tasks which may be unrelated to the primary radar system and management routine. Entry into the management routine is triggered by an interruupt signal initiated by the radar control unit 40 and then honored by the computer 32.

After entry into the management routine, the beam return report (FIG. 7c) is entered into the memory of the computer 32 from the radar data buffer 130. This operation is represented by block 402. Thereafter, a coordinate conversion routine 404 is executed to compute the coordinates of the targets with respect to the inertial coordinate system, defined by data supplied to the computer 32 from the aircraft avionics system 20 (FIG. 2a). That is, the aircraft avionics system 20 provides the data to the computer which relates the orientation of the aircraft to a reference coordinate system. The coordinate conversion routine represented by block 404 relates the coordinates of the target to the inertial coordinate system of the aircraft and therefore to the reference coordinate system.

Decision block 406 determines the mode of the most recently fired beam; i.e., whether the beam was a search beam, a track beam, or a verify beam. If the beam was a search beam, operation proceeds to decision block 408 which then determines the dwell number of the beam corresponding to the beam return report being processed; i.e., whether the beam return report is responsive to search beam dwell one, two, or three.

Assuming initially that the beam return report is responsive to a search beam dwell one, operation proceeds to block 410 which increments the buffer pointer by one. This operation refers to a buffer pointer register (not shown) which stores a pointer address (0–3) identifying the active one of four output buffers each of which can be used in assembling of a radar control command. Thus, in response to the operation represented by block 410, if the buffer pointer were equal to 2, it would be incremented to 3; if the buffer pointer were equal to 3, it would be incremented to 0. The value of the buffer pointer determines which of the four buffers next supplies a radar control command to the radar data buffer. After completion of the operation represented by block 410, operation proceeds to a subroutine identified as REM 610, represented by block 412 to be discussed hereinafter.

Returning now to decision block 408, if the dwell number were two, operation would proceed to block 414 which designates subroutine REM 400, to be discussed hereinafter.

It will be recalled that a search beam consists of three dwells. After the beam return report associated with the third dwell of a search beam is entered into the computer, operation proceeds from block 408 to block 416 which initiates an analysis of the report. The first operation in this analysis represented by block 416 is to record the real time of measurement. Thereafter, operation proceeds to block 418 which calls for execution of a multipath resolution routine. A preferred implementation of the multipath resolution routine is described in copending U.S. Pat. application Ser. No. 329,762, filed Feb. 5, 1973. Basically, the purpose of the multipath resolution routine is to determine if there were any target detections that occured on the search beam, and if there were detections, were there sufficient number of direct and indirect returns via multiple paths such that a certain level of confidence exists that a valid target has been located. The multipath resolution routine will produce a list of tentative targets. These tentative targets are of two types; (1) targets with respect to which the range has been resolved and (2) targets with respect to which the range has not been resolved. This information will be utilized later in the operation represented by the flow diagram for issuing one of two types of verify beam commands.

Decision block 420 determines whether or not any tentative targets were produced as a consequence of the multipath resolution routine of block 418. If tentative targets have been produced, operation proceeds from block 420 to block 422 which sets a verify request flag and stores target parameters for subsequent analysis. If a multipath resolution routine did not produce any tentative targets, then operation proceeds from block 420 to block 424 which causes the buffer pointer to be incremented. This is the same operation as was mentioned before in connection with block 410. It should be noted that the operation represented by block 424 is entered directly from block 420 in the event no tentative targets exist and via block 422 in the event tentative targets do exist. After execution of the operation represented by block 424, operation proceeds to the previously mentioned subroutine REM 610, represented by block 426, to be discussed hereinafter.

The discussion of the flow diagram has thus far been concerned with processing a beam return report responsive to a search beam. Returning now to decision block 406, consideration will be given to what occurs in the event the beam return report is responsive to a track beam. In the event of a track beam, operation proceeds from block 406 to block 430. It will be recalled that a track beam is comprised of two dwells. The operation represented by block 430 determines whether the beam return report is responsive to track beam dwell number one or two. If the report is responsive to track beam dwell number one, operation proceeds from block 430 to previously mentioned block 414 and subroutine REM 400 to be discussed hereinafter. On the other hand, if the beam return report is responsive to track dwell number two, operation proceeds from block 430 to block 432 which calls for the execution of a tracking routine. The function of the tracking routine is to use the parameters in the beam return report to extrapolate and predict the future position of the target and to verify the confidence level of track quality of the target. In addition, the tracking routine represented by block 432 updates the target data which is stored in the computer memory in a track store table. That is, data with respect to each target being tracked is stored in the track store table and updated each time that target responds to a track beam.

After the tracking routine, represented by block 432, has been executed, operation proceeds to block 434 which calls for the computing of a track update rate. That is, in accordance with a preferred embodiment of the invention, track beams are fired at different targets at different rates, depending upon the characteristics of the target. In accordance with the preferred embodiment of the invention, the system can store data for up to 64 targets in the track store table contained within the computer memory. A target update rate of 2, 4, 6, 8 or 10 seconds is determined for each of these targets in accordance with the equation illustrated adajcent to block 434 in FIG. 11a. For example, if it is determined that a particular target should have a track update rate of 4 seconds, this means that a track beam should be fired at that target once every 4 seconds. As previously mentioned, one of the primary functions of the flow diagram of FIG. 11 is to allocate the radar system time between the various azimuth positions for search, and between the various targets being tracked. This time allocation is performed by determining the priorities of beams to be fired. As will be seen hereinafter, computation of the track update rate represented by block 434 is used in the determination of task priorities.

The computer represented by block 434 is to resolve the equation $T = 1.1 (R\theta/m)^{1/2}$ where $T$ defines the track update rate; $R$ defines the range of the target; $\theta$ defines the azimuth angle; and $m$ defines the tangential acceleration of the target. Resolution of this equation effectively defines the length of time it will take a particular target to pass through a given azimuth window. After the foregoing track update equation has been computed for a given target, the closest track update rate of 2, 4, 6, 8, or 10 seconds is stored in the track store table associated with the other data relating to that target. After execution of the computation represented by block 434, operation proceeds to previously mentioned block 424 causing the buffer pointer to be incremented. Thereafter, operation proceeds to previously mentioned subroutine REM 610 represented by block 426.

Thus far, operation has been considered in the event the beam return report relates to a search beam or a track beam. In the event a beam return report is responsive to a verify beam, operation proceeds from previously mentioned bock 406 to decision block 440. Verify beams are fired in response to the setting of a verify request flag, as by block 422, after a search beam has located a tentative target. The purpose of the verify beam is to verify whether or not the tentative target located by the search beam is an actual target. Thus, after a verify beam is fired, the beam return report produced in response thereto is examined in decision block 440 to ascertain whether or not there is a target detection. If there was no target detection, operation proceeds from block 440 to block 442 which causes the buffer pointer to be incremented. Operation then proceeds from block 442 to previously mentioned subroutine REM 610 representd by block 444.

On the other hand, if the beam return report responsive to the verify beam does confirm that the search beam did indeed locate a target, then operation proceeds from the decision block 440 to decision block 446. Decision block 446 determines whether the range of the targets had been resolved. It will be recalled that execution of the multipath resolution routine 418 listed two types of tentative targets; namely, those with respect to which the range had been resolved and those with respect to which the range had not been resolved. If the beam return report related to a target for which the range had been resolved, the operation proceeds from decision block 446 to block 448 which calls for the execution of the initialize track routine. The initialize track routine operates to form a target entry in the previously mentioned track store table for this particular target. When initially entering this target into the track store table, the fastest track update rate, i.e., 2 seconds is selected. Subsequent tracking may or may not cause that track update rate to be revised by the computation represented by previously mentioned block 434.

In the event the range of the tentative target had not been resolved by the multipath resolution routine (block 418) then operation proceeds from decision block 446 to block 450 which causes execution of a range resolution routine. A preferred embodiment of the range resolution routine is disclosed in the U.S. Pat. application Ser. No. 329,763 Filed Feb. 5, 1973. However, whereas the beam return report data utilized in executing the multipath resolution routine (block 418) was responsive to the search beam, the beam return report data now used in the execution of the operation represented by block 450, is responsive to the verify beam.

Operation proceeds from block 450 to decision block 452 which then determines whether the new track is an already existing track or whether it is indeed a new track. If the target is being tracked, i.e., already represented by an entry in the track store table, then it is disregarded and operation proceeds to the previously mentioned block 442 to increment the buffer pointer. On the other hand, if the new target does not correspond to an entry in the track store table, then the operation proceeds from decision block 452 to the previously mentioned block 448 which causes execution of the initialize track routine.

It will be recalled that in response to search beam dwell number two and track beam dwell number one, operation proceeded to block 414 for the execution of subroutine REM 400. The responsibility of the subroutine REM 400 is to determine the beam mode, i.e., search, track, or verify, that should next receive radar energy.

Entry into the subroutine 400 is represented by block 454 (FIG. 11b). Operation then proceeds to decision block 456 which determines whether or not a verify request flag is set. It will be recalled that in response to a search beam dwell three, a verify request flag is set (block 422) if the multipath resolution routine identifies any tentative targets. The reason for initially checking the verify request flag in the determination of priorities, which is the essential function of the subroutine REM 400, is that if a search beam has detected a tentative target, then it should be verified as soon as possible in order to insure that the tentative target does not appear from the current commanded radar coordinates. Accordingly, if the operation represented by decision block 456 indicates that there is a verify request flag set, then operation is transferred immediately to subroutine REM 200, to be discussed hereinafter, to establish the verify parameters. On the other hand, if a verify request flag is not set, then operation proceeds from decision block 456 to block 460.

Block 460 represents a computation operation to compute the priority $(PT_i)$ of the track targets. The track priority equation, as indicated in FIG. 11b adjacent to block 460, is:

$$PT_i = TC-TLU/\Delta T$$

where $TC$ represents the current real time; $TLU$ represents the time of last update of the target data contained in the track store table, and $\Delta T$ represents the track update rate, either 2, 4, 6, 8, or 10 seconds, as earlier computed by the operation represented by block 434. After the track priority number $PT_i$ has been computed for each of the targets represented in the track store table, operation proceeds from block 460 to block 462 which selects the largest track priority $PT$. The track priority $PT$ with respect to each target being tracked, is a measure of how urgent it is that a track beam be fired at that target. This should be readily apparent from the track priority equation which constitutes a ratio between how long it's been since the target was last updated to how often that particular target should be updated. The target which has the highest track priority number is of course exhibiting the greatest urgency for updating. However, if the system is not extremely busy with targets, it may be that even the largest track priority number has a value less than 1 which effectively means that it is not yet time to update the data in the track store table for that target. Decision block 464 determines whether the largest track priority (PT) is greater than 1. If it is not greater than 1, operation is transferred from decision block 464 to a search subroutine REM 100, to be discussed hereinafter, represented by block 466. On the other hand, if the track priority is greater than 1, operation proceeds to block 468 to compute a search priority number PS to determine whether at this time it is more important to update the target data for a particular track or to issue a further search beam.

Block 468 computes the search priority PS in accordance with the following equation:

$PS = TC\text{-}TLS/\Delta TS$ where $TC$ represents real time; $TLS$ represents the time of issuance of the last search beam; and $\Delta TS$ equals $K \cdot N + \Delta TSN$ where $K$ is a constant representing track beam time; $N$ is the number of active targets being tracked; i.e., the number of entries in the track store table; and $\Delta TSN$ is a nominal search rate which is a system parameter stored in the computer's memory. Thus, the intended time between search beams $\Delta TS$ varies dependent upon the number of targets being actively tracked. If the number of active targets, $N$, is 0, then $\Delta TS$ equals $\Delta TSN$. On the other hand, as the number of active targets increases, the intended time between the issuance of successive search beams, $\Delta TS$, also increases. Since the term $\Delta TS$ appears in the denominator of the search priority equation, the search priority number will decrease as the number of targets being actively tracked increases for a given time interval since the issuance of the last search beam.

After the search priority has been computed as a consequence of the operation designated by block 468, operation proceeds to decision block 470 which determines whether or not the largest track priority PT is greater than the search priority PS. If PT is greater, then operation is transferred to a track subroutine REM 300 designated by block 472. On the other hand, if PT is not greater than PS, then operation proceeds to the search subroutine REM 100 designated by block 474.

Attention is now called to FIG. 11c which defines the operational flows for the previously mentioned search, verify, and track subroutines REM 100, REM 200, and REM 300 respectively.

Initially considering the track subroutine, REM 300, entry is indicated by block 480. It should be appreciated that the track subroutine is executed to develop a radar control command for application to the radar control unit to cause a track beam to be fired. After entrance into the track subroutine, operation proceeds to block 482 which sets the mode of the radar control command being assembled. From block 482, operation proceeds to block 484 which calls for execution of an array subroutine REM 800. At this point in our discussion, we will divert to a discussion of the array subroutine REM 800 and later return to complete the discussion of the track subroutine of REM 300.

Entry into the array subroutine 800 also shown in FIG. 11c, is represented by block 486. Operation proceeds from block 486 to block 488 which calls a coordinate conversion routine which performs the inverse operation of that performed by previously mentioned block 404 (FIG. 11a). That is, block 404 functions to convert the beam return report coordinates to a reference system, taking into account the orientation of the aircraft to the reference system. Block 488 refers to an inverse operation which now references the coordinates of the beam to be fired to the aircraft, independent of the coordinate reference system. By so doing, the appropriate antenna array and the azimuth angle at which the beam should be fired from that array can be determined. More particularly, operation proceeds from block 488 to block 490 which determines the array from which the beam should be fired. In order to better understand the functions of blocks 488 and 490, assume a simple example in which a target is located true north from the aircraft. In terms of a reference coordinate system, the target can be indicated as being located at true north. However, when it is desired to fire a beam at that target, it is necessary to orient the target with respect to the aircraft, rather than with respect to the reference system, to determine from which array the beam should be fired and at what angle. If the aircraft were travelling directly west, then block 488 would convert the true north position of the target to a 90° position relative to the aircraft. Block 490 will then determine that a target at 90° relative to the aircraft must be fired from the starboard array. Block 492 then determines the size of the azimuth angle at which the beam should be fired from the selected array and block 494 determines the size of the elevation angle at which the beam should be fired. The elevation angle is that angle that will cause the beam to be fired in a horizontal direction relative to ground taking into consideration and compensating for the aircraft's attitude or roll angle. Operation proceeds from block 494 to block 496 which represents a computation of the ground doppler offset $\Delta F_G$. As previously mentioned, the ground doppler offset refers to a value corresponding to the velocity of the aircraft. This value is used in the receiver 58 to compensate for the aircraft speed and effectively look at the doppler effect produced by the target relative to a stationary aircraft. After the operation represented by block 496 is completed, operation is returned to block 500 of the track subroutine REM 300.

As previously pointed out, each track beam is comprised of two dwells fired at the same PRF and frequency but at slightly different azimuth angles. Block 500 represents the operation for adding the angles $\pm \Delta$ azimuth to the basic azimuth angle. Operation proceeds from block 500 to block 502 which accesses range start and range stop information from the entries in the track store table. These quantities are computed by the previously mentioned tracking routine 432. Operation proceeds from block 502 to block 504 which calls for the execution of a routine to select PRF and frequency. A preferred embodiment of a routine to select PRF and frequency is disclosed in U.S. Pat. application Ser. No. 329,763, filed Feb. 5, 1973. Briefly the purpose of the routine (block 504) is to determine the most appropriate PRF and frequency to be used for the particular target. The PRF and frequency are selected to achieve appropriate range and radial velocity visiblity.

After the PRF and frequency have been selected operation proceeds to block 506 which represents an operation to compute the total number of pulses to be transmitted in each dwell of the track beam and the number of fill pulses in each dwell. The operation represented by block 506 initially determines the previously referenced burst number B which will be an integer between one and four representing the number of bursts or groups of sixteen data pulses to be fired in a dwell. The appropriate burst number selected is dependent upon the range as exemplified by the following table:

| RANGE | BURST NUMBER (B) |
|---|---|
| 0–140 miles | 1 |
| 141–168 miles | 2 |
| 169–186 miles | 3 |
| 187–200 miles | 4 |

It has been previously mentioned that fill pulses are fired in each dwell prior to the data pulses in order to establish a constant clutter pattern. The number of fill pulses required for any particular dwell is based on the PRF selected and is preferably determined by a table look procedure based on the following table:

| PRF | FILL PULSES |
|---|---|
| 1562–1822 PPS | 8 |
| 1823–2083 | 9 |
| 2084–2343 | 10 |
| 2344–2604 | 11 |
| 2605–2865 | 12 |
| 2866–3125 | 13 |

After the burst number (B) and number of fill pulses (FP) have been computed as a consequence of the operation represented by block 506, operation proceeds to block 508 which calculates the detection threshold for a particular target. The procedure for computing the detection threshold is as follows:

(1) multiply the noise voltage by a factor such that the false alarm rate is equal to a predetermined constant per unit of time; e.g. 10 false alarms in an uninterrupted 360° azimuth scan.

(2) under normal (noise only) conditions, establish the threshold using a fixed factor corresponding to approximately 11.6 db relative to estimated RMS noise level.

(3) accumulate detections which do not correlate with previous subsequent detections over each 360° azimuth scan.

(4) if the number of uncorrelated detections differs from the desired false alarm rate (for example, as a result of non Rayleigh clutter, jamming, or other non noise like external disturbances) adjust the threshold on succeeding scans to again establish the desired threshold (previously assumed to be 10 per scan). The threshold should be adjusted in small increments.

Based on the aforementioned operations constituting the track subroutine REM 300, it should be appreciated that ater completion of the operation represented by block 508, all of the data required for the radar control commands for the two track dwells have been developed. Operation then proceeds from block 508 to block 510 which stores the two radar control track commands at two different pages of the computer output buffer; that is, at the page designated by the buffer pointer plus one and at the succeeding page. Operation then proceeds from block 510 to block 512 which outputs the data from the page designated by the buffer pointer to the radar control unit.

Attention is now called to the search subroutine REM 100 which is entered via block 514.

The first operation in the execution of the search subroutine REM 100 is to set the mode to search. This is represented by block 516. Operation then proceeds to block 518 which calls a search pattern routine. The function of this routine is to retrieve, as from an index register, the next beam within the defined search pattern to be fired. The basic parameters of this next beam are recalled from index registers and then utilized in the array routine, previously discussed, to compute the particular antenna array, and azimuth and elevation angles of the beam to be fired from that selected array. The array routine is represented in the subroutine REM 100 by block 520.

Operation proceeds from block 520 to block 522 which assigns the standard PRF's and frequencies used for search. Operation then proceeds to block 524 which sets the minimum and maximum range cell numbers respectively. It will be recalled that for a search beam, the range window is open to its maximum.

Operation proceeds from block 524 to block 526. The function of block 526 is to assign the standar burst numbere ($B = 4$) and the appropriate number of fill pulses as represented by FIG. 8b. Operation then proceeds from block 526 to block 528 which calls for computation of a detection threshold. This operation is analogous to the operation previously described represented by block 508. After completion of the operation represented by block 528, all of the data required for the three search beam dwells has been developed. Operation then proceeds to block 530 which calls for the assembled radar control commands to be stored in three successive pages of the computer output buffer starting at the page designated by the buffer pointer, plus one. Operation then proceeds through block 532, identified as REM 610, to previously mentioned block 512. It will be recalled that block 512 can also be entered via REM 610 from previously mentioned blocks 410, 424, and 442.

From the foregoing, it should now be appreciated how the radar control commands are assembled in the computer output buffer for the track and search beams.

Attention is now called to the block 540 which represents the entrance to the verify subroutine REM 200. Initially, the mode field of the radar control command being assembled is set to verify, represented by block 542. Operation then proceeds to block 544 representing the call array routine REM 800 during which it will be recalled that the antenna array number and the beam azimuth and elevation angles were computed.

Operation proceeds from block 544 to decision block 546 which determines whether or not the range for this verification request is ambiguous or nonambiguous. If it is ambiguous, control is transferred to block 548 which will retrieve the search PRF and frequency information used in the initial detection. Operation then proceeds to block 550 which sets the range start and range stop numbers to their maximums. From block 550, operation proceeds to block 552 which assigns the standard burst number and fills pulses corresponding to the search beam illustrated in FIG. 8b. Thus, the operations represented by blocks 548, 550 and 552 cause the assembling of a radar control command which is then stored in a page of the output data buffer equal to the buffer pointer plus 1 as represented by block 554. Operation then proceeds to decision block 556. Block 556 determines whether there is data at the page of the output data buffer identified by the pointer plus 1. If there is no data at the current setting of the buffer pointer, then operations proceed to block 558 which causes entry into the previously mentioned subroutine REM 400 (FIG. 11c) which determines the mode of the next beam to be fired. It will be recalled from the explanation of the subroutine REM 400 that if there is a verify request flag set, then the verify beam previously stored in the next page of the output data buffer will be transferred to the radar data buffer. If decision block 556 determines that there is data stored at the data buffer page designated at the current setting of the buffer pointer, then operation will be transferred to block 512 to transfer that data to the radar data buffer.

Returning now to block 546, if it is determined that the range was not ambiguous, then operation will proceed from block 546 to block 560 which retrieves the search PRF and frequency information associated with the original detection. In block 562, the burst number (B) and number of fill pulses (FP) is computed in a similar fashion to the computation in block 506. Operation then proceeds to block 564 which sets the range start and range stop to the maximum maneuver gate. The maximum maneuver gate is a system parameter and is set such that the worst case target, that is, the worst case maneuvering conditions, can be accounted for such that the target could not get out of the range window in a two second interval. Operation then proceeds to block 566 which computes the detection threshold in a manner discussed previously in connection with block 508. Thereafter, operation proceeds to block 568 which stores the now assembled radar control verify command in the page of the data output buffer designated by the pointer plus one. Thereafter, operation proceeds to the decision block 556 as previously described.

As was previously mentioned, the flow diagram illustrated in FIG. 11 depicts the manner in which a general purpose computer 32 can operate to formulate a radar control command in response to a beam return report supplied thereto from the radar control unit. Although the preferred implementation of the invention does employ a general purpose computer, it is again reiterated that the operations represented in the flow diagram of FIG. 11 could be performed by other means such as a hardwired special purpose computer of logic network. The preferred manner of executing the flow diagram of FIG. 11 using a typical general purpose computer will now be described.

Figure 12:
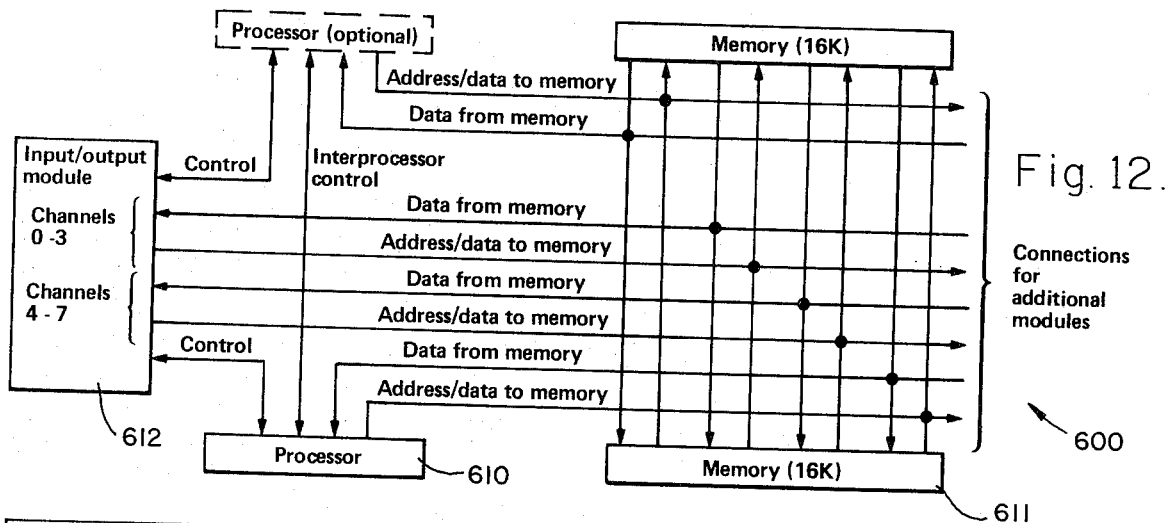
FIG. 12 is a block diagram of an exemplary general purpose digital computer system suitable for use as the digital computer illustrated in FIG. 4.

FIG. 12 - General Purpose Digital Computer System

Attention is now directed to FIG. 12 which illustrates an exemplary computer system 600 suitable for use in the airborne early warning system of FIG. 2a. The system shown in FIG. 12 comprises a Hughes Aircraft corporation high speed general purpose digital computer system model HM-4118 which is well suited for use in real time applications. The computer system 600 includes at least one arithmetic logic processor 610, one module of core memory 611, and four buffered input/output channels 612. The system can be expanded to 16,384 words of core memory through the expansion of the memory module in increments of 4,096, and to 131,072 words through the addition of seven other fully expanded memory modules. The system can also be expanded to a maximum configuration including two processors, and eight buffered input/output channels. Each processor and input/output channel may have direct access to all memory modules. The two processors of a fully expanded system can be conducted together to form a multi-processor configuration. While in the multi-processor configuration, each processor can operate with memory concurrently so long as each addresses a different memory module. If the same memory module is addressed by both simultaneously, a prearranged priority system services one processor ahead of the other. Although multiple modes of operation are available to a user, it will be assumed herein, for clarity of explanation, that the system 600 includes only one processor and that one input/output channel is adequate with one or more memory modules as required to meet other mission objectives.

The processor 610 is the program control unit of the computer system. It receives data words and instructions from the memory, executes the instructions, performs arithmetic and logic operations on the data, and sends the data to the memory for storage. System control of the processor is exercised with interrupt signals sent from the peripheral equipment via the buffered I/O to the processor to initiate program branching. The processor controls the peripheral equipment with external-function command words. The execution of an external function instruction causes a coded command word to be transmitted from the memory to the selected peripheral device where the word is decoded and the specified function performed. The following is a summary of the computer operational characteristics.

| OPERATION | PARALLEL ARITHMETIC |
|---|---|
| | General Characteristics |
| Logic | Synchronous, 4 MHz clock |
| Word Length | 18 bits |
| Instructions | 60 |
| Memory | 18-bit word modules, 1 μs cycle time; maximum capacity 131,072 words |
| Input/Output | Parallel transfers over up to 8 channels of 2,000,000 words/second total |
| Number Representation | Sign and absolute magnitude |
| Arithmetic Organization | All computation assumes fixed-point binary arithmetic |

| | Instruction Operation Times |
|---|---|
| Add, Subtract | 2 μs |
| Double Precision Add | 3.25 or 3.5 μs |
| Multiply | 3.5 μs |
| Divide | 6.25 μs |
| Square Root | 9 μs |
| Gray Code Conversion | 6 μs |

| | Real-Time Control |
|---|---|
| Elapsed Time Clock | Over 2 minutes (1 ms resolution decreasing time) |
| Time of Day Clock | Over 4772 hours in 2 consecutive memory cells (1 ms resolution increasing time) |
| Sense Switches | 10 |
| Indicators | 10 general purpose (7 have preassigned functions) plus 3 Special overflow, compare high, compare low |
| Memory Protect | Memory protected on any AC line transient, automatic recovery to cell zero |

| | Addressing Features |
|---|---|
| Type of Address | Single address, direct or relative addressing with or without index and/or indirect addressing |
| Index Registers | 48 (4 sets of 12) |
| Indirect Addressing | Yes |

The input/output module 612 provides interface control of data input/output operations between a variety of peripheral devices and the computer. For real-time data processing applications, data input to the computer may be received from a wide range of peripheral devices such as radar, digital data links, and analog-to-digital equipment. Data output may be transmitted to a variety of devices such as displays, consoles, and data links. For normal data processing applications, devices such as a magnetic tape unit, a line printer, a card reader, a card punch, and a disc file may be used for input/output operations and secondary storage. The input/output module provides interface control of data input/output operations between the peripheral equipment and the computer, consists of one or two bidirectional, four channel buffers. These buffers, designated as buffer A and buffer B, are identical and independent of each other. Each buffer contains control logic for input/output data and provides routing for address and data lines between the peripheral equipment and the computer memory.

Each channel carries two kinds of information flow between the computer and the peripheral equipment; incoming data, sent through 18 input lines, and outgoing data, sent through 18 output lines. These same lines are time shared for the transfer of control information; the output lines carry I/O commands to the peripheral equipment, and the input lines carry status information to the computer. Each channel has 17 address lines that identify the memory locations in the computer to be used for the input/output operations. There are control lines provided for interrupt, data requests, data acknowledge, and external function.

Each buffered input/output (I/O) channel operation is a control loop that transmits signals between the peripheral equipment and the computer. The computer or the peripheral equipment perform the specified function and the computer transmits a control signal to terminate the operation.

The exchange of data between the computer and the peripheral equipment takes place over data lines. Input data is received from input data lines, and outgoing data is transmitted over output data lines. Address lines are provided for selecting the memory address or input or output data for each channel.

An input data transfer operation transfers one word of data from a peripheral device through the buffered I/O to a specified address in the computer memory. To accomplish the operation, the peripheral device places a data word on the input data lines and a memory address on the address lines, and activates the input request line. The buffer terminates the input data transfer operation by sending a data acknowledge signal to the peripheral device.

An output data transfer operation transfers one word of data from the computer memory through the buffered I/O on the output data lines to a peripheral device. This type of output data transfer is initiated by a peripheral device when it places a memory address on the address lines and activates the output request line. The output data transfer operation is terminated when the peripheral device receives a data acknowledge signal from the buffer indicating that the output data lines contain valid information.

To store a program, a peripheral device initiates a program-load operation by activating both a program load request line and an input request line to the buffered I/O. Functionally, the program load and the input data transfer operations are identical except that program load can be performed while buffer lockout has been established in the buffer. Each channel has provisions for a program load request line.

A channel interrupt operation transfers one word from a peripheral device to memory, interrupts the normal computer program sequence, and signals the peripheral device to inhibit further interrupt requests until the program is ready for the next interrupt operation. The peripheral device initiates an interrupt word transfer by setting the interrupt request line after it has placed an address on the address lines and an interrupt word on the input data lines. After sampling the input data lines, the computer terminates the interrupt word transfer by sending a data acknowledge signal to the peripheral device, setting an interrupt indicator in the processor, and resetting an interrupt enable line to the device. When execution of an interrupt subroutine for the device has been completed, the computer terminates the channel interrupt operation by setting the interrupt enable line. This line represents computer program readiness for interrupts and does not inhibit interrupt word transfers if requested. Use of the line to inhibit interrupt requests is a function of the peripheral device.

An external-function operation is the means of processor communication through the buffered I/O with peripheral equipment. This operation is initiated by the computer program with an external function instruction. This instruction causes the transfer of one word from computer memory through the buffered I/O on the output data lines to a peripheral device. The buffer notifies the peripheral device of the external function operation with an acknowledge signal. Normally, the output communication is a control word which instructs a peripheral device to perform an operation.

Figure 13:
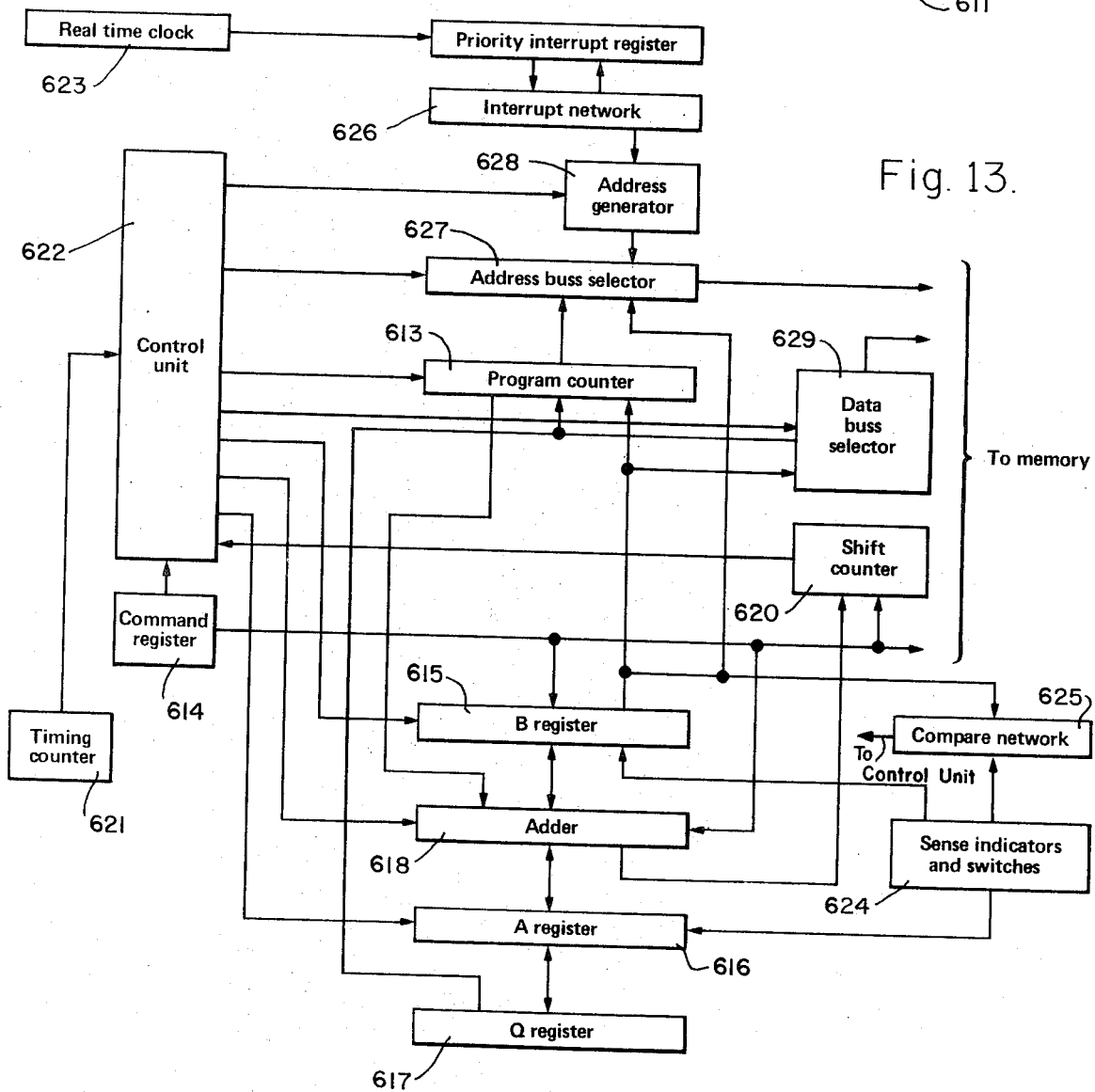
FIG. 13 is a block diagram of an exemplary data processor utilized in the system of FIG. 12.

FIG. 13 - Data Processor 610

The functional units within the processor 610 shown in block diagram in FIG. 13 are as follows:
Program Counter 613

The Program Counter is an 18-bit counter holding the address of the next instruction of the program to be executed. The program Counter is incremented by one after an instruction is Program from memory, except for skip instructions when it is incremented by 2. For transfer instructions, the contents of the Program Counter are changed to the effective address of the instruction. At the start of the DPA instruction the contents of the B register are transferred to the Program Counter for incrementing by one to gain access to the second part of the DPA operand. The Program Counter also provides the base for the operand address when the relative addressing option is employed. The Program Counter has a range of 131,072 words.
Command Register 614

The Command register is an 8 bit holding register for the instruction and augmentor codes of the instruction currently being executed. These instructions and augmentor codes are decoded and establish the proper logic controls to perform the specified operation.
Buffer Register 615

The 18 bit Buffer register is primarily a register for temporary storage of data transferred to and from memory. When the contents of index registers or clock words are modified, their new values are stored in the B register pending return storage in memory. The B register contains the effective address for all addressing operations and functions as a buffer between the memory and the other arithmetic circuits for instructions requiring an operand. The B register manipulates data for execution of some of the arithmetic instructions. A complement control is provided for gating the B register when a subtraction is to occur.

Accumulator Register 616

The A register is used for execution of all arithmetic instructions (with the exception of the right rotate Q register (RRQ instruction) and for the execution of the PIA and PAI instructions. The A register may hold an augend, minuend, an operand to be compared (either logically or algebraically) to the contents of a memory location, a multiplier, or the most significant bits of a dividend. At the conclusion of an arithmetic operation, it may hold a sum, a difference, a quotient, the most significant bits of a product, or the result of a square root operation. In general, the contents of the A register must be interpreted in terms of the program operation which has just been performed or is about to be performed.

Quotient Register 617

The Q register functions as an extension of the A register for those instructions which require words of a length greater than 18 bits. These arithmetic operations are the DPA, MLY, DIV, and SQR instructions. The Q register is also connected as a shift register and may be used by itself or in conjunction with the A register during shift operations. During shift operations, the contents of the Q register, A register, or both are shifted at a rate of one bit per block pulse (0.25 $\mu$s) for the number of bits specified by the instructions. The input data supplied to the Q register is from the A register or the adder. Output data from the Q register is sent to the B register, A register, or memory via the interrupt and addressing circuits. Circuits are also provided for use of the Q register during console input/output operations.

Adder Network 618 the Adder network is a full 18-bit, parallel, binary adder. The network adds the selected input data to the register data. The Adder is required during arithmetic operations, during relative addressing and indexed operations, and during updating the Program Counter, clock words, and index registers. The Adder network includes the various controls and matrices used to accomplish the required operations. Included in the Adder are the sum and carry networks. A complete 18-bit addition is performed in one clock time (0.25 microsecond).

Interrupt Register 619

The Interrupt register is an 18-bit register which controls the interrupt operation. This interrupt function occurs whenever an outside source of data desires to change the normal program sequence.

Shift Counter 620

The Shift Counter has three major functions. In shift operations it counts down the number of places to be shifted. Its initial value is obtained from the K field in a shift instruction. In multiply, divide, square root, and convert grey code operations it is used to count the number of iterations involved. During address modification it stores the R-field of the instruction.

Timing Counter 621

The Timing Counter is a 4-bit ring-type counter whose outputs control timing of all operations in the computer. The normal count sequence is advanced to the next count at each clock pulse. However, the timing counter can enter a null state before recycling when new memory data is not available. For some arithmetic operations the timing counter will deviate from the regular count sequence.

Control Unit 622

The Control Unit decodes instructions and sequences the operations necessary to carry out each instruction command. A series of microcommands are generated which direct the transfer between registers, memory access, and other fundamental tasks to complete the execution of each instruction. This Control Unit includes a 4-bit register (level counter) that identifies and specifies the type of word being fetched or stored in memory. The outputs of the "level counter" establish initial logic conditions to perform an instruction or complete an operation cycle.

Real Time Clock 623

The Real Time Clock provides a means for programming the computer system through use of an interrupt instruction for operation with respect to real time.

Sense Indicators 624

The Sense Indicators comprise a group of 13 flip-flops which indicate the results of previous operations and the current status of the processor. As such, the contents of the Sense Indicators can provide a means of program branch control. When a flip-flop is set, the condition is detected by an appropriate branch instruction. When the flip-flop is reset, the branch instruction is ineffective in branching the program routine being executed. The functions of the Sense Indicators are reflected in the table following on the next page. In addition to the assigned functions, four instructions affect the states of the sense indicators.

The reset indicators (REI) instruction resets those bits of the sense indicators specified by the N-field of the instruction word. The REI instruction affects F 1, F 2, F 4 through F 6, F 8 through F 10, and F 7 in a multisystem mode. The set indicators instruction (SEI) sets the bits of the sense indicators specified by the N-field of the instruction word. The SEI instruction affects the same flip-flops as the REI instruction. The place accumulator in indicators (PAI) instruction places the least significant bits of the A register in the sense indicators. The PAI instruction controls all sense indicators except F 1, F 3, and F 7.

SENSE INDICATOR
FUNCTIONS

| Indicator | Function |
|---|---|
| Flag | Show the result of comparison instructions as follows: |
| FL | FL     FH     Comparison |
|  | 0     1     High |
|  | 1     0     Low |
| FH | 1     1     Equal |
| Sense Indicators | Serve as program flags or branch controls |
| F 1 | Indicates the processing of an interrupt and locks out further interrupt processing. |
| F 2 | Indicates an illegal divisor, an illegal radicand during a Square Root operation, or indicates the parity of bits shifted during a Right Rotate Both instruction. |
| F 3 | Indicates that a console device is not being used. When F3 is not lit, a console input/output operation is in progress. |
| F 4 | Indicates parity error during console input/output operations. |
| F 5 | Indicate the designated index register bank |

-Continued

SENSE INDICATOR
FUNCTIONS

| Indicator | Function |
|---|---|
| | (0 through 3) as follows: |
| | F5   F6   Bank |
| | 0    0    0 |
| | 0    1    1 |
| | 1    0    2 |
| | 1    1    3 |
| F 7 | Indicates that this processor has executive control of computer operations in a dual-processor system. Always lit in a single-processor computer. |
| F 8 | Programmer controlled. |
| F 9 | Programmer controlled. |
| F 10 | Programmer controlled. |
| Overflow FV | Indicates that an overflow occurred during the execution of an arithmetic instruction. |

Indicators F 1 through F 10 may be sensed by the skip on indicators (SKI) instruction. All thirteen indicators may be stored in the accumulator by the place indicators in accumulator (PIA) instruction. The transfer on overflow (TOF) instruction tests FV, and resets it if FV has been set by a previous arithmetic operation. A master clear operation will reset FV, F 2, F 4 through F 6, F 8 through F 10 and F 7 (in a Multiprocessor mode). The master clear operation sets F 1, and F 3 and does not affect FL and FH. The processor also is equipped with a group of ten sense switches which control program branches for manual operator control. The configuration of these switches may be sensed by the skip on switches (SKW) instruction.

Compare Network 625

The Compare Network permits the state of sense indicators and switches to be determined in response to an instruction "Skip on Indicators" (SKI). If indicators specified by the instruction in the buffer register 115 are on (1), one instruction is skipped. Otherwise the next instruction in sequence is taken, thus permitting a conditional branch. Set Indicator (SEI) and Reset Indicator (REI) instructions permit the indicators to be set as required. Place Indicators in Accumulator (PIA) and Place Accumulator in Indicators (PAI) are further instructions which enable the programmer to use the sense indicators referred to hereinbefore as "flags" in the flow chart.

Interrupt Network 626

The Interrupt Network provides the logic and control functions for priority interrupt. The interrupt register 619 provides an indicator for each of 18 interrupt conditions. Each indicator is set when the corresponding condition is detected and remains set until the normal program sequence is interrupted for that condition. If more than one indicator is on, the one with highest priority will be serviced first. When the normal program sequence is interrupted, a lockout indicator (a sense indicator) is set to prevent further interruption. A Reset Indicator (REI) resets the lockout indicator after the interrupting sequence is completed.

Address Buss Selector 627

The address buss selector 627 is an AND/OR network which selects the address from the program counter or the operand address as generated in the B register or the interrupt network 628 in response to a control signal by the control unit 622.

Data Buss Selector 629

The data buss selector 629 is an AND/OR gate combination that selects the output of the B register 615 or the Q register 617 in response to a control signal from the control unit 622 to pass selected data to memory.

Address Generator 628 The Address Generator cooperates with the interrupt network to generate an address much like the program counter 613 and buffer register 615 with the generated addresses used through an Address Buss Selector 627 for absolute addressing, relative addressing and indirect addressing. If absolute addressing is specified, the primary address is the value specified by a particular field (Y) of the instruction plus the content of an index register specified by another field (R) of the instruction, if any is specified. If relative address is specified by the R field of the instruction, the primary address is equal to the sum of the program counter 613 plus the number specified by the Y field. Unless indirect addressing is specified by the R field, the effective address is the primary address. When indirect addressing is specified, the effective address is obtained from the word in memory specified by the primary address. If the operation code of the instruction so specifies, that effective address is modified by the contents of a predetermined index register. All the index registers and necessary logic networks are contained in the address register.

Processor operation is initiated when instructions, stored in sequential locations in memory, are accessed. The memory location of an instruction to be accessed is contained in the Program Counter. The contents of the Program Counter are incremented by one after each instruction access from memory, except when the instruction is a transfer. When a transfer instruction is executed, the next instruction may be accessed from any designated memory location. If a skip operation is executed, the program counter is incremented a second time when skip conditions are met. The transfer and skip operations may be generated by branch controls such as arithmetic Overflow and Divide Check.

An additional facility provided in the processor for producing program branches is the interrupt function. When interrupts are activated by either internal or external sources via the register 619, the normal program sequencing is inhibited. When an interrupt occurs, the contents of the Program Counter are stored temporarily and the program branches to the preassigned interrupt cell associated with the source of the interrupt.

Attached as Appendix A is a listing of a source program for the exemplary computer just described to implement the flow chart of FIG. 11. All of the instructions of the HM-4118 computer system, from which the instructions in the source program were selected, are described in Appendix B. The source program follows the flow chart and is therefore self-explanatory, i.e., there is correspondence between the flow chart and the program written in a recognized programming language for an existing computer. That source program can be entered into the HM-4118 computer system with an assembly program to obtain an object program. The manner in which that is done is described in an Appendix C titled Assembly Program.

Summary

From the foregoing, it should now be recognized that an improved airborne radar system has been disclosed herein capable of providing 360° surveillance coverage and capable of exhibiting independent and optimized search and track data rates. The foregoing capabilities are achieved by mounting multiple antenna arrays within the profile of the aircraft. The multiple arrays are energized to fire radar beams by an on-line control means, preferably a digital computer, which assigns time shared transmitter and receiver equipment to the arrays. Time assignments are made based on conditions existing at any moment, in accordance with predetermined criteria preferably embodied in a program for controlling the functions of the computer.

APPENDIX A

MULTIPATH AUTO ACQUISITION (MAA)
THE MULTIPATH AUTO ACQUISITION SUBROUTINE IS CALLED BY THE ENERGY MANAGEMENT ROUTINE WHEN RETURNS ARE DETECTED ON THE SEARCH BEAM DWELLS (THERE ARE THREE DWELLS — ONE FOR EACH OF THE THREE PRF S USED ON THE SEARCH BEAM.)

INPUTS:
    TARGET REPORTS FOR DWELLS 1, 2 AND 3
    START LOCATIONS FOR DWELLS 1, 2 AND 3
    PRECALCULATED FOLDOVER RANGE FOR DWELLS 1, 2 AND 3

OUTPUTS:
    NUMBER OF AUTO ACQUISITION TRACK CANDIDATES
    POINTER TO AUTO ACQUISITION TRACK CANDIDATES TABLE
    AUTO ACQUISITION TRACK CANDIDATES TABLE WITH ENTRIES
        SORTED INTO DESCENDING PLOT QUALITY ORDER

ROUTINE CONSTANTS:

| | | |
|---|---|---|
| RNGCL1 | DEC 1280 | DWELL 1 RANGE CELL/INTERVAL COUNT |
| RNGCL2 | DEC 1810 | DWELL 2 RANGE CELL/INTERVAL COUNT |
| RNGCL3 | DEC 2560 | DWELL 3 RANGE CELL/INTERVAL COUNT |
| MAXVAL | DEC 9720 | MAX RANGE IN RANGE CELLS |
| MAXGAT | DEC 389 | CORRELATION GATE RADIUS AT MAX RANGE |
| CORGAT | BSS 1 | CORRELATION GATE RADIUS FOR RU RANGE |
| DLTRL | DEC 972 | RANGE DELTA FOR MULTIPATH TIME DELAY |
| 017 | OCT 17 | |
| 03777 | OCT 3777 | |

ROUTINE ADDRESS CONSTANTS:

| | | |
|---|---|---|
| RTRB1 | GAD TR1 | START OF TARGET REPORT BUFFER 1 |
| RTRB2 | GAD TR2 | START OF TARGET REPORT BUFFER 2 |
| RTRB3 | GAD TR3 | START OF TARGET REPORT BUFFER 3 |
| RTRD1 | GAD TR1+9 | START OF DATA IN TARGET REPORT BUFFER 1 |
| RTRD2 | GAD TR2+9 | START OF DATA IN TARGET REPORT BUFFER 2 |
| RTRD3 | GAD TR3+9 | START OF DATA IN TARGET REPORT BUFFER 3 |
| CANDCT | GAD CAND | ADDRESS OF TRACK CANDIDATE TABLE ENTRY COUNT |
| CANDPT | GAD CAND+1 | ADDRESS OF FIRST DATA WORD IN TRACK CANDIDATE TABLE |
| CANADD | GAD CANA | ADDRESS OF TRACK CANDIDATE TABLE POINTERS |
| PTR | GAD *+1,1 | REGISTER POINTER FOR MULTIPATH LOOP |
| | GAD 4 | INDEX REGISTER 4 |
| | GAD 3 | INDEX REGISTER 3 |
| | GAD 2 | INDEX REGISTER 2 |
| TKSTAD | GAD TKST | ADDRESS OF TRACK STORE TABLE |
| TKSTCT | GAD TKCT | ADDRESS OF REPORT COUNT IN TRACK STORES |
| MPTDAD | GAD MPTD | ADDRESS OF MULTIPATH TIME DELAY TABLE |

INTERNAL TEMPORARY STORAGE

| | | |
|---|---|---|
| XO | BSS 1 | POINTER TO DWELL 1 BUFFER |
| YO | BSS 1 | POINTER TO DWELL 2 BUFFER |
| ZO | BSS 1 | POINTER TO DWELL 3 BUFFER |
| XE | BSS 1 | DWELL 1 END OF BUFFER ADDRESS |
| YE | BSS 1 | DWELL 2 END OF BUFFER ADDRESS |
| ZE | BSS 1 | DWELL 3 END OF BUFFER ADDRESS |
| RXF | BSS 1 | DWELL 1 FOLDOVER RANGE |
| RYF | BSS 1 | DWELL 2 FOLDOVER RANGE |
| RZF | BSS 1 | DWELL 3 FOLDOVER RANGE |
| XN | BSS 1 | NUMBER OF TARGET REPORTS FOR DWELL 1 |
| YN | BSS 1 | NUMBER OF TARGET REPORTS FOR DWELL 2 |
| ZN | BSS 1 | NUMBER OF TARGET REPORTS FOR DWELL 3 |
| SAVRTN | BSS 1 | RETURN ADDRESS TEMPORARY STORAGE |
| PASS | BSS 1 | PASS INDICATOR |
| CURPLT | GAD *+1 | ADDRESS OF CURRENT PLOT INFORMATION |
| RU | BSS 1 | RANGE (AMBIGUOUS IF NEGATIVE) |
| CX | BSS 1 | DIRECT/MULTIPATH COUNT FOR DWELL 1 |
| CY | BSS 1 | DIRECT/MULTIPATH COUNT FOR DWELL 2 |
| CZ | BSS 1 | DIRECT/MULTIPATH COUNT FOR DWELL 3 |
| QP | BSS 1 | PLOT QUALITY (FUNCTION OF CX, CY AND CZ) |
| XP | BSS 1 | X POSITION OF PLOT ON TRACKING PLANE |
| YP | BSS 1 | Y POSITION OF PLOT ON TRACKING PLANE |
| DRM1 | BSS 1 | FIRST MULTIPATH DELAY TIME DELTA |
| TEMP | BSS 10 | RESERVE AREA FOR TEMP STORAGE |
| CORREL | BSS 1 | CROSS CORRELATION FLAG<br>0 = NO CORRELATION<br>1 = CORRELATION |

APPENDIX "A" — Continued

```
MAA000   CLA 12           SAVE RETURN ADDRESS OF RADAR ENERGY
         ADD I1
         STR SAVRTN       MANAGEMENT PROGRAM

CLA I0           SET NUMBER OF AUTOMATIC ACQUISITION
         STR*CANDCT          CANDIDATES = NONE
```

HOUSEKEEP TARGET BUFFER PARAMETERS THAT ARE USE FOR ALL DWELL PASSES.

```
         CLA RTRB1        FETCH START OF BUFFER AND START OF DATA
         LDQ RTRD1           ADDRESSES FOR DWELL 1
         STQ XO              (SET UP POINTER TO DWELL 1 DATA)
         TSX MAA900       COMPUTE COUNT AND END OF BUFFER

STR XE           SET UP END OF BUFFER ADDRESS AND
         STQ XN              TARGET COUNT FOR DWELL 1

CLA RNGCL1       SET UP DWELL 1 FOLDOVER RANGE
         STR RXF

CLA RTRB2        FETCH START OF BUFFER AND START OF DATA
         LDQ RTRD2           ADDRESSES FOR DWELL 2
         STQ YO              (SET UP POINTER TO DWELL 2 DATA)
         TSX MAA900       COMPUTE COUNT AND END OF BUFFER

STR YE           SET UP END OF BUFFER ADDRESS AND
         STQ YN              TARGET COUNT FOR DWELL 2
         CLA RNGCL2       SET UP DWELL 2 FOLDOVER RANGE
         STR RYF

CLA RTRB3        FETCH START OF BUFFER AND START OF DATA
         LDQ RTRD2           ADDRESSES FOR DWELL 3
         STQ ZO              (SET UP POINTER TO DWELL 3 DATA)
         TSX MAA900       COMPUTE COUNT AND END OF BUFFER

STR ZE           SET UP END BUFFER ADDRESS AND
         STQ ZN              TARGET COUNT FOR DWELL 3

CLA RNGCL3       SET UP DWELL 3 FOLDOVER RANGE
         STR RZF
```

BASIC INITIALIZATION IS COMPLETE. BEGIN DWELL PROCESSING

```
         CLA XN           DWELL 1 = NO RETURNS ?
         TRZ MAA010          YES, CHECK DWELL 2
         CLA I1              NO, PROCESS DWELL 1 RETURNS
         STR PASS         SET PASS = 1

CLA XO           SET X (REGISTER 2) = XO (POINTER TO
         STR 2               DWELL 1 DATA)

TRU MAA030       BRANCH TO PROCESSING AREA

MAA010   CLA YN              DWELL 2 = NO RETURNS ?
         TRZ              YES, CHECK DWELL 3
         MAA020
         CLA I2           NO, PROCESS DWELL 2 RETURNS
         STR PASS     SET PASS = 2

CLA YO       SET XO = POINTER TO DWELL 2 BUFFER
         STR XO
         CLA ZO       SET YO = POINTER TO DWELL 3 BUFFER
         STR YO
         CLA I0       SET ZO = NULL
         STR ZO

CLA YE       SET XE = DWELL 2 END OF BUFFER
         STR XE
         CLA ZE       SET YE = DWELL 3 END OF BUFFER
         STR YE
         CLA I0       SET ZE = NULL
         STR ZE

CLA          SET RXF = DWELL 2 FOLDOVER
         RNGCL2
         STR RXF
         CLA          SET RYF = DWELL 3 FOLDOVER
         RNGCL3
         STR RYF
         CLA I0       SET RZF = NULL
         STR RZF
         CLA XO       SET X (REGISTER 2) = XO (POINTER TO
         STR 2           DWELL 2 DATA)
         TRU          BRANCH TO PROCESSING AREA
         MAA030

MAA020   CLA ZN           DWELL 3 = NO RETURNS ?
         TRZ           YES, BRANCH TO EXIT PROCESSING
         MAA040
         CLA I3       SET PASS = 3
         STR PASS

CLA YN       WERE THERE ANY DWELL 2 PROCESS FUNCTIONS
                          PERFORMED??
```

APPENDIX "A" – Continued

```
          TRZ          NO
          MAA023
```

IF PASS 2 FUNCTIONS WERE PERFORMED, DATA TO BE MOVED TO THE "X" AREAS WILL BE LOCATED IN THE "Y" AREAS.

```
          CLA YO              SET XO = POINTER TO DWELL 3 BUFFER
          STR XO

CLA YE              SET XE = DWELL 3 END OF BUFFER
          STR XE
          TRU MAA025          BRANCH TO NULL SET
```

IF PASS 2 FUNCTIONS WERE NOT PERFORMED, DATA TO BE MOVED TO THE "X" AREAS WILL BE LOCATED IN THE "Z" AREAS.

```
MAA023    CLA ZO              SET XO = POINTER TO DWELL 3 BUFFER
          STR XO
          CLA ZE              SET XE = DWELL 3 END OF BUFFER
          STR XE

MAA025    CLA RNGCL3          SET RXF = DWELL 3 FOLDOVER
          STR RXF
          CLA I0
          STR YO              SET YO AND ZO = NULL
          STR ZO
          STR YE              SET YE AND ZE = NULL
          STR XE
          STR RYF             SET RYF AND RZF = NULL
          STR RZF

CLA XO              SET X (REGISTER 2) = XO (POINTER TO
          STR 2                  DWELL 3 DATA)
          TRU MAA030          BRANCH TO PROCESSING AREA

MAA030    CLA 0,2             CHECK PROCESS FLAG (BIT ZERO OF RANGE)
                                 IS RX PROCESSESD
          TRN *+2             YES, CHECK FOR END OF TABLE
          TRU MAA100          NO, PROCESS THIS REPORT

INX 2,2             SET X TO NEXT DWELL X RETURN
          CLA 2               END OF DWELL X TABLE ?
          CMA XE                 (X > XE)
          TRH *+2             YES, CHECK PASS
          TRU MAA030          NO, CHECK NEXT REPORT

CLA PASS
          ADD I1              PASS = PASS + 1
          STR PASS

CMA I3              PASS = 2 ?
          TRL MAA010             YES, PROCESS FOR PASS 2
                              PASS = 3 ?
          TRE MAA020             YES, PROCESS FOR PASS 3

MAA040    CLA*CANDCT          AUTOMATIC ACQUISITION CANDIDATES = NONE ?
          TRZ*SAVRTN             YES, RETURN WITH A-REGISTER = ZERO
          TSX MAA800          CALL SORT ROUTINE TO SEQUENCE TRACK
                                 CANDIDATES IN ORDER OF PREFERENCE
                                 (HIGHEST PLOT QUALITY TO LOWEST)

CLA*CANDCT          LOAD A-REGISTER WITH COUNT OF VERIFY
                                 TARGETS
          LDQ CANADD          LOAD Q-REGISTER WITH ADDRESS OF TARGET
                                 ENTRY POINTER TABLE
          TRU*SAVRTN          RETURN TO RADAR ENERGY MANAGEMENT

MAA100    TXS**+1             CALL RRA TO RESOLVE RANGE AMBIGUITY IF
          GAD RRA000             POSSIBLE

TSX**+1             CALL FMD TO CALCULATE FIRST MULTIPATH
          GAD FMD000             DELAY

TSX**+1             CALL MDC TO DETECT AND COUNT MULTIPATH
          GAD MDC000          RETURNS
          TSX**+1             CALL CCS TO CROSS CORRELATE THIS PLOT
          GAD CCS000             VS. TRACK STORES

CLA CORREL          DID THE TRACK CORRELATE WITH AN EXISTING
                                 TRACK ?
          TRZ MAA030             YES, BYPASS AUTO-ACQUISITION CHECK

TSX**+1             CALL AAQ TO CHECK AUTO-ACQUISITION
          GAD AAQ000             QUALITY

TRU MAA030          RETURN TO CHECK NEXT REPORT
```

MAA800 SORTS THE TRACK CANDIDATES IN ORDER OF HIGHEST PLOT QUALITY. SINCE THE TRACK CANDIDATE TABLE COULD CONTAIN AS MANY AS 63 PLOTS, AND EACH ENTRY IN THE TABLE CONTAINS 4 WORDS, THE NORMAL EXCHANGE SORT WOULD BE TIME CONSUMING. THE METHOD CHOSEN IS A SEMI-EXCHANGE SORT THAT EXCHANGES POINTERS TO THE ENTRIES RATHER THAN THE ENTRIES THEMSELVES.

APPENDIX "A" – Continued

```
MAA800    CLA*CANDCT        FETCH COUNT OF ENTRIES IN TRACK
          CMA I2               CANDIDATE TABLE
          TRL MAA850        IF ONLY 1 TARGET, NO SORT REQUIRED

SUB I1            USE REPORT COUNT-1 FOR LOOP COUNTER TO
          STR 1                SET UP POINTER TABLE (REGISTER 1)
          CLA CANADD        SET UP POINTER TO TRACK CANDIDATE
          STR 2                ADDRESS TABLE (REGISTER 2)
          CLA CANDPT
          STR 0,2           STORE ADDRESS OF ENTRY INTO ADDRESS
          INX 1,2              TABLE AND BUMP ADDRESS TABLE POINTER
          ADD I4            INCREMENT ENTRY ADDRESS TO NEXT ENTRY
          TRX *-3,1         LOOP FOR ALL TARGETS
MAA810    CLA*CANDCT        FETCH COUNT OF ENTRIES IN TRACK
          SUB I2               CANDIDATE TABLE
          STR 4             USE COUNT-2 FOR LOOP COUNTER THROUGH
                               SORT (REGISTER 4)
          CLA CANADD        SET POINTER TO TABLE OF TRACK CANDIDATE
          STR 3                ADDRESSES (REGISTER 3)

CLA I0            SET EXCHANGE FLAG = NONE
          STR CHNGER

MAA820    CLA 0,3           SET POINTER TO AN ENTRY IN "TC" TABLE
          STR 1                FROM "TC" ADDRESS TANLE (REGISTER 1)
          CLA 1,3           SET POINTER TO AN ENTRY+1 IN "TC" TABLE
          STR 2                FROM "TC" ADDRESS TABLE (REGISTER 2)

CLA 3,1           COMPARE PLOT QUALITY FROM ENTRY TO
          CMA 3,2              ENTRY+1
          TRL MAA840        IF LOWER, EXCHANGE ENTRY POINTERS

MAA830    INX 1,3           BUMP ADDRESS TABLE POINTER AND BRANCH
          TRX MAA820,4      BACK TO COMPARE ALL ENTRIES

CLA CHNGER        IF PASS COMPLETED WITHOUT CHANGING AN
                               ENTRY
          TRZ 0,12             RETURN, SORT COMPLETE

TRU MAA810        OTHERWISE REPEAT PROCESS
MAA840    CLA 0,3           EXCHANGE POINTERS IN "TC" ADDRESS TABLE
          LDQ 1,3              SO THAT FIRST ADDRESS ALWAYS POINTS
          STR 1,3              TO THE ENTRY WITH THE HIGHEST PLOT
          STQ 0,3              QUALITY
          STR CHNGER        SET EXCHANGE FLAG AND BRANCH TO
          TRU MAA830           CHECK NEXT ENTRY

MAA850    CLA CANDPT        IF ONLY 1 REPORT TRACK CANDIDATE
          STR*CANADD           TABLE, SET ADDRESS POINTER TO FIRST
          TRU 0,12             PLOT AND RETURN
CHNGER    BSS 1             EXCHANGE FLAT FOR SORT
```

MAA900 COMPUTES THE NUMBER OF TARGET REPORTS THAT CAME IN DURING A DWELL PERIOD AND THE "END OF BUFFER" ADDRESS FOR THAT DWELL.

INPUTS:
  A-REGISTER = BUFFER ADDRESS
  Q-REGISTER = START OF DATA ADDRESS
OUTPUTS:
  A-REGISTER = END OF BUFFER ADDRESS
  Q-REGISTER = TARGET REPORT COUNT
INTERNAL TEMPORARY STORAGE:

```
SAV001    BSS 1

ROUTINE CONSTANTS:
I1        DEC 1
I3        DEC 3
O77       OCT 000077

MAA900    STR 1             SAVE START ADDRESS OF REPORT HEADER
          STQ 2             SAVE START ADDRESS OF DATA

CLA 2,1           FETCH HEADER WORD CONTAINING TARGET
          RSA 3                REPORT COUNT
          LGM 077              SHIFT AND MASK OUT JUNK BITS
          STR SAV001           SAVE
                            COMPUTE "END OF BUFFER ADDRESS"

MLY I3
          XCA               ((COUNT * 3) + START) - 1
          ADD 2
          SUB I1            "END OF BUFFER" ADDRESS IN A-REGISTER

LDQ SAV001        REPORT COUNT IN Q-REGISTER

TRU 0,12          RETURN

RRA000    CLA I1            INITIALIZE PRIMARY/MULTIPATH COUNTERS
          STR CX
          CLA I0
          STR CY
          STR CZ
```

APPENDIX "A" – Continued

```
                CLA PASS
                CMA I3
                TRE RRA040      PASS = 3 ?
                                  YES
RRA010          CLA YO          SET UP POINTER TO DATA FOR NEXT DWELL
                STR 3
RRA011          CMA YE          END OF BUFFER ?
                TRH RRA030        YES, CHECK NEXT DWELL
                CLA 0,3         HAS THIS REPORT BEEN PROCESSED ?
                TRN RRA013        YES, CHECK NEXT REPORT
                TRU RRA015        NO, COMPARE THIS REPORT

RRA013          INX 2,3         BUMP POINTER TO NEXT REPORT AND
                CLA 3             CHECK FOR END OF BUFFER
                TRU RRA011

RRA015          STR TEMP+3      SAVE RANGE OF REPORT TO BE USED
                                  (RY)

CLA 0,2
RRA017          STR TEMP+2      SAVE RANGE OF REPORT TO BE USED
                                  (RX)
                CMA MAXVAL      IF RANGE > MAXIMUM ALLOWABLE,
                TRH RRA013        BRANCH TO CHECK NEXT REPORT

RRA 018         CLA TEMP+3
                ADD TOL
                CMA TEMP+2      DOES RX = RY + TOLERANCE ?
                TRE RRA019        YES
                TRL *+7         DOES RX < RY + TOLERANCE
                CLA TEMP+3        NO
                ADD RYF         CHECK NEXT RY FOLDOVER RANGE
                STR TEMP+3
                CMA MAXVAL      GREATER THAN MAX RANGE
                TRH RRA013        YES, NO MATCH THIS BY RETURN
                TRU RRA017        NO, TRY AGAIN
                CLA TEMP+3
                SUB TOL
                CMA TEMP+2      DOES RX = Ry - TOLERANCE ?
                TRE RRA019        YES
                TRH RRA019      RY - TOL < RX < RY + TOL

CLA TEMP+2      CHECK NEXT RX FOLDOVER RANGE
                ADD RXF         RX = RX + RXF
                TRU RRA017

RRA019          CLA TEMP+2      RU = RX + NX(RXF)
                STR RU

CLA II          SET PRIMARY FLAG FOR DWELL 2
                STR CY

CLA 0,2
                CSA
                STR, 0,2        SET RX AND RY = PROCESSED
                CLA 0,3
                CSA
                STR 0,3
RRA020          CLA ZO          ZO = NULL ? (PASS 2)
                TRZ 1,12          YES, RETURN

STR 4           SET UP POINTER TO DATA FOR NEXT DWELL
RRA021          CMA ZE          END OF BUFFER ?
                TRH 1,12          YES, EXIT

CLA 0,4         HAS THIS REPORT BEEN PROCESSED
                TRN RRA023        YES, CHECK NEXT REPORT
                TRU RRA025        NO, COMPARE THIS REPORT

RRA023          INX 2,4         BUMP POINTER TO NEXT REPORT AND
                CLA 4           CHECK FOR END OF BUFFER
                TRU RRA021

RRA025          STR TEMP+4      SAVE RANGE OF REPORT TO BE USED
                                  (RZ)
                CMA MAXVAL      IF RANGE > MAXIMUM ALLOWABLE
                TRH RRA023        BRANCH TO CHECK NEXT REPORT

CLA TEMP+4
                ADD TOL         RU = RZ + TOLERANCE ?
                CMA RU
                TRE RRA027        YES
                TRL *+2         DOES RU < RZ + TOL
                TRU RRA023        NO, NO MATCH THIS RZ RETURN
                CLA TEMP+4
                SUB TOL         RU = RZ - TOLERANCE ?
                CMA RU
                TRE RRA027        YES
                TRH RRA027      RZ - TOL < RU < RZ + TOL

CLA TEMP+4      CHECK THE NEXT RZ FOLDOVER RANGE
                ADD RZF         RZ = RZ + RZF
                TRU RRA025
```

APPENDIX "A"—Continued

```
RRA027    CLA I1            SET PRIMARY FLAG FOR DWELL 3
          STR CZ
          CLA 0,4
          CSA               SET RZ = PROCESSED
          STR 0,4
          TRU 1,12            RETURN

RRA030    CLA ZO            ZO = NULL ? (PASS 2)
          TRZ RRA040          YES

STR 4             SET UP POINTER TO DATA FOR NEXT DWELL
RRA031    CMA ZE            END OF BUFFER ?
          TRH RRA040          YES, EXIT
          CLA 0,4           HAS THIS REPORT BEEN PROCESSED ?
          TRN RRA033          YES, CHECK NEXT REPORT
          TRU RRA035          NO, COMPARE THIS REPORT

RRA033    INX 2,4           BUMP POINTER TO NEXT REPORT AND
          CLA 4               CHECK FOR END OF BUFFER
          TRU RRA031
RRA035    STR TEMP+4        SAVE RANGE OF REPORT TO BE USED
                              (RZ)
          CLA 0,2
RRA037    STR TEMP+2        SAVE RANGE OF REPORT TO BE USED
                              (RX)
          CMA MAXVAL        IF RANGE > MAXIMUM ALLOWABLE
          TRH RRA033          BRANCH TO CHECK NEXT REPORT

RRA038    CLA TEMP+4
          ADD TOL
          CMA TEMP+2        RX = RZ + TOLERANCE ?
          TRE RRA039          YES
          TRL *+7           DOES RX < RZ + TOL
          CLA TEMP+4          NO
          ADD RZF           CHECK NEXT RZ FOLDOVER RANGE
          STR TEMP+4
          CMA MAXVAL        GREATER THAN MAX RANGE
          TRH RRA033          YES, NO MATCH THIS RZ RETURN
          TRU RRA038          NO, TRAY AGAIN
          CLA TEMP+4
          SUB TOL
          CMA TEMP+2        RX = RZ – TOLERANCE ?
          TRE RRA039          YES
          TRH RRA039        RZ – TOL < RX < RZ + TOL

CLA TEMP+2                  CHECK NEXT BY FOLDOVER RANGE
          ADD RXF           RX = RX + RXF
          TRU RRA037
RRA039    CLA TEMP+2        RU = RX + NX(RXF)
          STR RU
          CLA I1            SET PRIMARY FLAG FOR DWELL 3
          STR CZ

CLA 0,2
          CSA               SET RX = PROCESSED
          STR 0,2
          CLA 0,4
          CSA               SET RZ = PROCESSED
          STR 0,4
          TRU 1,12            RETURN

RRA040    CLA 0,2
          CSA               RU = RX (AMBIGUOUS)
          STR RU
          TRU 1,12            RETURN
```

FMD000 CALCULATES THE MAXIMUM TIME DELAY FOR A GIVEN RANGE. THIS IS ACCOMPLISHED BY DIVIDING THE RANGE BY A DELTA RANGE AND USING THE QUOTIENT TO INDEX A TABLE CONTAINING THE MAXIMUM TIME DELAY.

```
RMD000    CLA I0            CLEAR A-REGISTER
          LDQ RU              LOAD Q-REGISTER WITH RANGE WORD
          RSB 0               (INSURE DIVIDEND IS POSITIVE)
          DIV DLTRL         COMPUTE ADDRESS OF TIME DELAY
          ADD MPTDAD
          STR TEMP+1          ADDRESS = (RU / DLTRL) + MPTDAD
          CLA*TEMP+1        FETCH CONTENTS OF COMPUTED ADDRESS
          STR DRM1          AND SAVE FOR MULTIPATH DETECTION
          TRU 1,12          RETURN
```

MDC000 DETECTS AND COUNTS MULTIPATH RETURNS FOR ALL 3 DWELLS OF A SEARCH BEAM. TO BE CONSIDERED A MULTIPATH RETURN, THE REPORT UNDER INVESTIGATION MUST PASS THE FOLLOWING TESTS

1. THE TIME DELAY BETWEEN THE PRIMARY RETURN AND THE FIRST MULTIPATH MUST BE EQUAL TO OR LESS THAN A "WORST CASE" VALUE DEPENDING ON TARGET RANGE.
2. THE TIME DELAY BETWEEN THE PRIMARY RETURN AND THE SECOND MULTIPATH MUST BE EQUAL TO TWICE THE FIRST MULTIPATH DELAY + OR – 1 CELL.
3. THE FILTER NUMBER FOR THE FIRST OR SECOND MULTIPATH RETURN MUST BE EQUAL TO OR 1 LESS THAN THE FILTER NUMBER FOR THE PRIMARY RETURN.

APPENDIX "A" – Continued

| | | |
|---|---|---|
| MDC000 | CLA I2 | SAVE RETURN ADDRESS TO MAIN PROGRAM |
| | ADD I1 | |
| | STR TEMP+0 | |
| | CLA I2 | SET COUNTER TO LOOP FOR 3 DWELLS |
| | STR I | |
| | CLA CURPLT | SET UP A POINTER TO THE CURRENT PLOT |
| | STR 7 | INFORMATION |
| MDC010 | CLA*PTR | SET UP A POINTER TO THE CURRENT PRIMARY |
| | STR 5 | REPORT |
| | ADD I3 | SET UP A POINTER TO THE NEXT AVAILABLE |
| | STR 6 | REPORT IN THE REPORT BUFFER |
| | TSX MDC100 | CALL FIRST INNER LOOP TO PROCESS THIS DWELL |
| | INX 1,7 | BUMP POINTER TO CURRENT PLOT INFORMATION |
| | TRX MCD010,I | LOOP FOR 3 DWELLS |
| | TRU*TEMP+0 | RETURN |
| MDC100 | CLA I2 | SAVE RETURN ADDRESS OF OUTER LOOP |
| | STR TEMP+1 | |
| MDC110 | TSX MDC900 | CHECK FOR END OF BUFFER |
| | | IF END OF BUFFER, MDC900 AUTOMATICALLY RETURNS TO OUTER LOOP |
| | CLA 1,7 | WAS THERE A PRIMARY FOUND ON THIS DWELL ? |
| | TRZ*TEMP+1 | NO, RETURN TO CHECK NEXT DWELL |
| | CLA 0,6 | HAS THIS REPORT ALREADY BEEN PROCESSED ? |
| | TRN MDC113 | YES, INCREMENT |
| | TRU MDC120 | NO, CHECK FOR MULTIPATH |
| MDC113 | INX 2,6 | BUMP POINTER TO NEXT ENTRY AND |
| | TRU MDC110 | RETURN TO CHECK FOR END OF BUFFER |
| MDC120 | SUB 0,5 | COMPUTE RIM1 − RI < OR = DRM1 |
| | SAP | IF DIFFERENCE IS > DELTA, NO CHANCE |
| | CMA DRM1 | FOR FIRST MULTIPATH SO |
| | TRH*TEMP+1 | RETURN TO OUTER LOOP |
| | LSA 1 | COMPUTE 2(RIM1 − RI) AND SAVE FOR |
| | STR TEMP +2 | SECOND MULTIPATH CHECK |
| | TSX MDC700 | TEST FOR FILTER MATCH |
| | TRU MDC123 | RETURN + 0 = FILTER MATCH |
| | TRU MDC113 | RETURN + 1 = NO MATCH |
| MDC123 | TSX MDC800 | SET THIS REPORT = PROCESSED |
| | | FIRST MULTIPATH FOUND |
| MDC125 | INX 2,6 | BUMP POINTER TO NEXT ENTRY AND |
| | TSX MDC900 | CHECK FOR END OF BUFFER |
| | CLA 0,6 | HAS THIS REPORT ALREADY BEEN PROCESSED ? |
| | TRN MDC125 | YES, INCREMENT |
| | SUB 0,5 | |
| | SAP | ABSOLUTE VALUE (RIM2 − RI) |
| | STR TEMP+4 | SAVE |
| | CLA TEMP+2 | GET 2 (RIM1 − RI) |
| | ADD TOL | |
| | CMA TEMP+4 | (RIM2 − RI) > 2(RIM1 − RI) + TOL |
| | TRH*TEMP+1 | YES, NO 2ND MULTIPATH |
| | CLA TEMP+2 | |
| | SUB TOL | |
| | CMA TEMP+4 | (RIM2 − RI) < 2(RIM1 − RI) − TOL |
| | TRL MDC125 | YES, TRY NEXT RETURN |
| MDC127 | TSX MDC700 | CHECK FOR FILTER MATCH |
| | TRU MDC129 | FILTER MATCH |
| | TRU MDC125 | NO MATCH, TRY NEXT RETURN |
| MDC129 | TSX MDC800 | SET THIS REPORT = PROCESSED |
| | | SECOND MULTIPATH FOUND |
| | TRU*TEMP+1 | RETURN TO OUTER LOOP |
| MDC700 | CLA 1,5 | SAVE FILTER NUMBER OF PRIMARY TARGET |
| | LGM O17 | |
| | STR TEMP+3 | |
| | CLA 1,6 | COMPARE TO FILTER NUMBER OF POSSIBLE |
| | LGM O17 | MULTIPATH TARGET |
| | CMA TEMP+3 | |
| | TRE 0,12 | MATCH |
| | SUB I1 | |
| | CMA TEMP+3 | CHECK FOR TOLERANCE |
| | TRE 0,12 | MATCH |
| | TRU 1,12 | NO MATCH |
| MDC800 | CLA 1,7 | INCREMENT MULTIPATH COUNTER FOR THIS |
| | ADD I1 | DWELL |
| | STR 1,7 | |
| | CLA 0,6 | SET PROCESSED FLAG |
| | CSA | |
| | STR 0,6 | |
| | TRU 0,12 | RETURN |
| MDC900 | CLA 6 | CHECK MULTIPATH POINTER FOR END OF |
| | CMA 3,7 | BUFFER |
| | TRH*TEMP+1 | IF END, EXIT TO OUTER LOOP |
| | TRU 0,12 | OTHERWISE RETURN |

APPENDIX "A" – Continued

CCS000 CROSS CORRELATES THE PLOT UNDER INVESTIGATION AGAINST THE TRACKS CURRENTLY IN THE TRACK STORE TABLE. IF A SEARCH TARGET CORRELATES WITH A KNOWN TRACK, THE PLOT IS IGNORED. IF NO CORRELATION OCCURS, THE PLOT IS ENTERED INTO THE TRACK CANDIDATE TABLE BY A CALL TO THE AUTOMATIC ACQUISITION ROUTINE, AAQ000.

```
CCS000      CLA 12              SAVE RETURN ADDRESS
            STR TEMP+0
            CLA I0              RESET TRACT CORRELATION FLAG
            STR CORREL
            CLA RU              SET UP INPUT PARAM FOR RANGE, AZ
            SAP                    TO DISPLAY X,Y SUBROUTINE
            XCA                 Q-REG = RANGE
            CLA*RTRB1
            LGM 03777           ACC = AZIMUTH
            TSX LIS             SAVE REGISTERS
            TSX CONVTK             CALL SYSTEM SUBROUTINE TO CONVERT
                                   XP AND YP
            TSX LIR             RESTORE REGISTERS

STR XP              SAVE CONVERTED XP AND
            STQ YP                 YP

CLA RU              IS RANGE AMBIGUOUS ?
            TRN CCS030             YES, SET FLAG = NO CORRELATION
            MLY MAXGAT          CALCULATE CORRELATION GATE RADIUS
            DIV MAXVAL             FOR THIS RU RANGE
            STR CORGAT             SAVE
            CLA TKSTAD          SAVE ADDRESS OF TRACK STORE FOR
            STR 5                  CORRELATION CHECK

CLA*TKSTCT          USE COUNT –1 FOR LOOP THROUGH TRACK
            SUB I1                 STORE TABLE
            STR 6

CCS010      CLA 0,5
            SUB XP
            SAP                 COMPARE XP:XT + OR – TOLERANCE
            CMA CORGAT          DOES X POSITION CORRELATE
            TRH CCS020             FAIL

CLA 1,5
            SUB YP
            SAP                 COMPARE YP:YT + OR – TOLERANCE
            CMA CORGAT          DOES Y POSITION CORRELATE
            TRH CCS020             FAIL

CLA I1
            STR CORREL          SET FLAG = CORRELATION
            TRU*TEMP+0             RETURN

CCS020      INX 5,5             BUMP TRACK STORE POINTER TO NEXT ENTRY
            TRX CCS010,6           LOOP FOR ALL TRACKS
                                IF ALL CHECKED AND NO MATCH
CCS030      CLA I0
            STR CORREL          SET FLAG = NO CORRELATION AND
            TRU*TEMP+0             RETURN
AAQ000      INX 1,12
            CLA 12              SAVE RETURN ADDRESS TO MAIN
            STR TEMP+0             PROGRAM

CLA CX              SET UP MULTIPATH COUNTS FOR
            STR TEMP+2             PLOT QUALITY COMPUTATION
            CLA CY
            STR TEMP+3
            CLA CZ
            STR TEMP+4

TSX AAQ900          CALCULATE PLOT QUALITY (QP)

CLA TKSTCT          IS TRACK STORE TABLE FULL ?
            CMA MXTKST
            TRE AAQ010             YES, BRANCH TO DISPLAY SET-UP

CLA SEASTE          SEA STATE = HIGH ?
            CMA I1
            TRH AAQ010             YES, BRANCH TO DISPLAY SET-UP

ADD STTADR          COMPUTE ADDRESS OF SEA STATE/RANGE TABLE
            STR TEMP+1             ADDRESS
            CLA*TEMP+1
            STR 6               SAVE IN REGISTER 6

CLA I0
            LDQ RU              COMPUTE ENTRY INTO SEA STATE/RANGE
            RSB 0                  TABLE
            DIV DLTRL
            ADD 6
1           STR 6               SAVE IN REGISTER 6

CLA 0,6             QP > OR = QM ?
            CMA QP
            TRL AAQ020             YES
```

APPENDIX "A" – Continued

| Label | Instruction | Comment |
|---|---|---|
| AAQ010 | CLA XP | INPUT PARAM, ACC = X OF PLOT |
| | LDQ YP | Q-REG = Y OF PLOT |
| | TSX**+1 | CALL DISPLAY ROUTINE FOR POSSIBLE |
| GAD DISPL1 | | MANUAL INITIALIZATION OF THIS TRACK |
| | TRU*TEMP+0 | RETURN |
| | | SET UP ENTRY INTO TRACK CANDIDATE TABLE |
| AAQ020 | CLA*CANDCT | CALCULATE ADDRESS IN TRACK CANDIDATE |
| | MLY 14 | TABLE FOR THIS NEW CANDIDATE |
| | XCA | |
| | ADD CANDPT | |
| | STR 6 | SAVE IN INDEX 6 |
| | CLA*CANDCT | UPDATE NUMBER OF TRACK CANDIDATES COUNT |
| | ADD 11 | |
| | STR*CANDCT | |
| | CLA*RTRB1 | |
| | LGM 03777 | EXTRACT AND STORE AZIMUTH FOR THIS RETURN |
| | STR 0,6 | |
| | CLA RU | STORE RANGE INTO CANDIDATE TABLE |
| | STR 1,6 | |
| | CLA RTRB1 | SAVE ADDRESS OF FIRST REPORT BUFFER |
| | STR 7 | TO FIND PRF OF HIGHEST COUNT |
| | CLA QP | |
| | RSA 6 | |
| | STR TEMP+2 | COMPARE CX, CY AND CZ TO PLOT QUALITY |
| | CLA CX | TO FIND DWELL WITH HIGHEST COUNT |
| | CMA TEMP+2 | |
| | TRE AAQ025 | |
| | INX 132,7 | NOT DWELL 1, CHECK DWELL 2 |
| | CLA CY | |
| | CMA TEMP+2 | |
| | TRE AAQ025 | |
| | INX 132,7 | NOT DWELL 2, MUST BE DWELL 3 |
| AAQ025 | CLA 7,7 | FETCH "PRF" WORD FROM REPORT HEADER |
| | LGM 07777 | MASK |
| | STR 2,6 | STORE IN CANDIDATE TABLE |
| | CLA QP | STORE PLOT QUALITY |
| | STR 3,6 | |
| | TRU*TEMP+0 | RETURN |
| AAQ900 | CLA 12 | SAVE RETURN ADDRESS |
| | STR TEMP+1 | |
| AAQ910 | CLA 10 | USE TEMPORARY REGISTER FOR EXCHANGE |
| | STR TEMP+5 | FLAG |
| | CLA TEMP+2 | COMPARE MULTIPATH COUNTS FOR |
| | LDQ TEMP+3 | 2 DWELLS |
| | CMA TEMP+3 | |
| | TRH AAQ920 | IF FIRST DWELL IS < OR = SECOND |
| | TSX AAQ | BRANCH TO EXCHANGE |
| AAQ920 | CLA TEMP+3 | |
| | LDQ TEMP+4 | |
| | CMA TEMP+4 | |
| | TRH AAQ930 | |
| | TSX AAQ990 | |
| AAQ930 | CLA TEMP+5 | WAS THERE AN EXCHANGE MADE ? |
| | TRZ AAQ940 | NO, PREPARE TO EXIT |
| | TRU AAQ910 | |
| AAQ940 | CLA TEMP+2 | MERGE MULTIPATH COUNTS TO |
| | LSA 3 | FORM PLOT QUALITY |
| | LGA TEMP+3 | |
| | LSA 3 | |
| | LGA TEMP+4 | |
| | STR QP | SAVE AND |
| | TRU*TEMP+1 | RETURN |
| AAQ980 | STR TEMP+3 | |
| | STQ TEMP+2 | EXCHANGE FIRST AND SECOND ENTRIES |
| | CLA 11 | IN TEMP |
| | STR TEMP+5 | SET EXCHANGE FLAG |
| | TRU 0,12 | RETURN |
| AAQ990 | STR TEMP+4 | |
| | STQ TEMP+3 | EXCHANGE SECOND AND THIRD ENTRIES |
| | CLA 11 | IN TEMP |
| | STR TEMP+5 | SET EXCHANGE FLAG |
| | TRU 0,12 | RETURN |
| SSTADR | GAS *+1 | |
| | GAS SST1 | SEA  STATE  TABLE  1 (LOW) |
| | GAS SST2 | *       *       *      2 (MED) |
| LOW SEA STATE | | |
| SST1 | OCT 110 | MINIMUM QUAL FOR RANGE 000 – 019 |
| | OCT 110 | MINIMUM QUAL FOR RANGE 020 – 039 |

APPENDIX "A" — Continued

```
            OCT 210              MINIMUM QUAL FOR RANGE 040 - 059
            OCT 210              MINIMUM QUAL FOR RANGE 060 - 079
            OCT 210              MINIMUM QUAL FOR RANGE 080 - 099
            OCT 300              MINIMUM QUAL FOR RANGE 100 - 119
            OCT 300              MINIMUM QUAL FOR RANGE 120 - 139
            OCT 300              MINIMUM QUAL FOR RANGE 140 - 159
            OCT 210              MINIMUM QUAL FOR RANGE 160 - 179
            OCT 210              MINIMUM QUAL FOR RANGE 180 - 199
            OCT 210              MINIMUM QUAL FOR RANGE 200 - 219

MEDIUM SEA STATE

SST2        OCT 110              MINIMUM QUAL FOR RANGE 000 - 019
            OCT 110              MINIMUM QUAL FOR RANGE 020 - 039
            OCT 110              MINIMUM QUAL FOR RANGE 040 - 059
            OCT 110              MINIMUM QUAL FOR RANGE 060 - 079
            OCT 210              MINIMUM QUAL FOR RANGE 080 - 099
            OCT 210              MINIMUM QUAL FOR RANGE 100 - 019
            OCT 210              MINIMUM QUAL FOR RANGE 120 - 139
            OCT 210              MINIMUM QUAL FOR RANGE 140 - 159
            OCT 210              MINIMUM QUAL FOR RANGE 160 - 179
            OCT 110              MINIMUM QUAL FOR RANGE 180 - 199
            OCT 110              MINIMUM QUAL FOR RANGE 200 - 219
CAND        BSS 253              AUTO ACQUI TRACK CANDIDATES TABLE
CANA        BSS 63               AUTO ACQUI TRACK CANDIDATES LOOK-UP
                                    TABLE (SORTED, DESCENDING PLOT QUAL)

END
```

THE AUTOMATIC PRF SELECTION SUBROUTINE USES AN ESTABLISHED TRACK
PREDICTED RANGE AND RADIAL VELOCITY TO PICK A FREQUENCY (1225-
1375) AND PRF (1562-3125) TO OPTIMIZE RANGE AND DOPPLER VISIBILITY
IN TRACKING.

INPUT PARAMETERS:
THIS SUBROUTINE IS CALLED BY THE ENERGY MANAGEMENT ROUTINE WHEN
IT IS TIME TO FIRE A TRACK BEAM AT AN ESTABLISHED TRACK.
THE ENERGY MANAGEMENT ROUTINE PASSES THE ADDRESS OF THE TRACK
STORE ENTRY THAT CONTAINS ALL INFORMATION REQUIRED TO PROCESS
THIS TRACK. THE ADDRESS IS PASSED TO THE PRF SELECT ROUTINE
IN INDEX REGISTER TWO.

```
INDEX REGISTER ASSIGNMENTS:
N           EQU 7                "N" COUNTER FOR PRF CALCULATIONS

SCRATCH PAD TEMPORARY STORAGE ASSIGNMENTS:

SAVDAT      EQU 200B             START SAVE AREA AT LOCATION 200 OCTAL
SAVE1       EQU SAVDAT           SAVE AREA FOR JAM LEVEL
XCHNGE      EQU SAVE1+1          EXCHANGE FLAG FOR LEVEL SORT
RP          EQU XCHNGE+1         PREDICTED TRACK RANGE
DOT         EQU RT+1             PREDICTED TRACK RADIAL VELOCITY
FX          EQU DOT+1            BEST FREQUENCY FROM CLEAR CHANNEL
                                    SENSING (MC)
FXC         EQU FX+1             CODED FREQUENCY FROM CLEAR CHANNEL
                                    SENSING
FIRST       EQU FXC+1            FIRST TIME ON FLAG
                                    0 = OFF
                                    1 = ON
VISIBLE     EQU FIRST+1          VISIBILITY FLAG
                                    0 = GOOD
                                    1 = NOT VISIBLE
PRF1U       EQU VISIBLE+1        FIRST FORBIDDEN PRF UPPER BOUND
PRF1L       EQU PRF1U+1          FIRST FORBIDDEN PRF LOWER BOUND
PRFFU       EQU PRF1L+1          NTH FORBIDDEN PRF UPPER BOUND
PRFFL       EQU PRFFU+1          NTH FORBIDDEN PRF LOWER BOUND
RX          EQU PRFFL+1          CURRENT BLIND RANGE ZONE START
R1          EQU RX+1             FIRST BLIND RANGE ZONE START
PRFX        EQU R1+1             CURRENT PRF UNDER INVESTIGATION

RANGE       EQU 2                DISPLACEMENT OF RANGE WORD IN TABLE
RADVL       EQU 3                DISPLACEMENT OF VELOCITY WORD IN TABLE

ROUTINE CONSTANTS:

DR          DEC 243              BLIND RANGE DELTA
DR1         DEC 486              BLIND RANGE PRIME
DPRF        DEC 5                DELTA PRF
RDOT        DEC 14B14            MINIMUM RADIAL VELOCITY
PRFMN       DEC 264.7B15         CONSTANT FOR FIRST FORBIDDEN PRF (UPPER
                                    BOUND) CALCULATION
PRFMX       DEC 323.5B15         CONSTANT FOR FIRST FORBIDDEN PRF (LOWER
                                    BOUND) CALCULATION
K1562       DEC 1562             LOWEST ALLOWABLE PRF
K3125       DEC 3125             HIGHEST ALLOWABLE PRF
K81000      DEC 81000            CONSTANT FOR BLIND RANGE DETECTION

I0          DEC 0
I1          DEC 1
I2          DEC 2
I5          DEC 5
I7          DEC 7
I30         DEC 30
I31         DEC 31
```

APPENDIX "A"—Continued

ADDRESS CONSTANTS:

| | | |
|---|---|---|
| RTRB1 | GAD TR1 | ADDRESS OF TARGET REPORT BUFFER ONE |
| FRQCAD | GAD FRQC | ADDRESS OF FREQUENCY CODE TABLE |
| FRQMAD | GAD FRQM | ADDRESS OF FREQUENCY CYCLE TABLE |
| FRQCND | GAD FRQC+31 | END OF FREQUENCY CODE TABLE |

TABLE AND BUFFER AREAS:

| | | |
|---|---|---|
| TR1 | BSS 200 | RESERVE 200 WORDS FOR REPORT BUFFER 1 |
| TR2 | BSS 200 | RESERVE 200 WORDS FOR REPORT BUFFER 2 |
| TR3 | BSS 200 | RESERVE 200 WORDS FOR REPORT BUFFER 3 |
| FRQC | BSS 36 | RESERVE 36 WORDS FOR FREQUENCY CODE TABLE |
| FRQM | BSS 32 | RESERVE 32 WORDS FOR FREQUENCY CYCLE TABLE |

| | | |
|---|---|---|
| PRF000 | CLA RANGE,2 | FETCH TRACK RANGE FROM TRACK STORE TABLE |
| | STR RP | AND SAVE |
| | CLA RADVL,2 | FETCH TRACK VELOCITY FROM TRACK STORE |
| | STR DOT | TABLE AND SAVE |
| | CLA RP | |
| | CMA DR | COMPARE TRACK RANGE TO BLIND RANGE DELTA |
| | TRL PRF020 | IF RANGE IS < OR = BLIND RANGE DELTA |
| | TRE PRF020 | BRANCH TO NO VISIBILITY |
| | CLA DOT | COMPARE TRACK VELOCITY TO MINIMUM VALUE |
| | CMA RDOT | VELOCITY IS < MINIMUM |
| | TRL PRF020 | BRANCH TO NO VISIBILITY |

THE FOLLOWING INSTRUCTION STRING UNPACKS THE 32 JAM LEVELS THAT WERE INPUT WITH THE TARGET REPORT HEADER AND MERGES THEM WITH THEIR RESPECTIVE FREQUENCY CODES. THE COMBINED CODES AND LEVELS ARE THEN STORED IN ORDER OF FREQUENCY CODE.

| | | |
|---|---|---|
| | INX 6,2 | BUMP POINTER TO FIRST WORD OF JAM DATA |
| | CLA 15 | SET UP COUNT-1 OF SETS PER COMPUTER WORD |
| | STR 3 | (REGISTER 3) |
| | STR 4 | SET UP COUNT-1 OF COMPUTER WORDS (REGISTER 4) |
| | CLA FRQCAD | FETCH ADDRESS OF FREQUENCY CODE TABLE |
| | STR 5 | AND SAVE FOR INDEXING (REGISTER 5) |
| | CLA 10 | SET FREQUENCY CODE COUNTER TO FIRST CODE |
| | STR 6 | 0 THROUGH 31 (REGISTER 6) |
| PRF001 | LDQ 0,2 | LOAD Q-REGISTER WITH SIX SETS OF LEVELS |
| PRF002 | CLA 6 | FETCH FREQUENCY CODE FROM REGISTER 6 |
| PRF004 | CLA 1,4 | FETCH ENTRY+1 FROM FREQUENCY CODE TABLE |
| | LGM 17 | SAVE ONLY LAST 3 BITS AND |
| | STR SAVE1 | STORE FOR LATER USE |
| | CLA 0,4 | FETCH ENTRY+0 FROM FREQUENCY CODE TABLE |
| | LGM 17 | SAVE ONLY LAST 3 BITS AND COMPARE IT |
| | CMA SAVE1 | TO SAVED ENTRY+1 |
| | TRH PRF006 | IF ENTRY+0 > ENTRY+1, BRANCH TO EXCHANGE |
| PRF005 | INX 1,4 | BUMP POINTER TO NEXT ENTRY AND BRANCH |
| | TRX PRF004,2 | BACK TO CHECK NEXT SET |
| | CLA XCHNGE | IF AFTER ANY COMPLETED PASS NO EXCHANGES |
| | TRZ PRF007 | WERE MADE, BRANCH TO EXIT |
| | CLA 10 | OTHERWISE RESET THE EXCHANGE FLAG |
| | STR XCHNGE | |
| | INX 30,2 | RESET LINER LOOP COUNTER AND LOOP BACK |
| | TRX PRF003,3 | FOR ANOTHER PASS |
| | TRU PRF007 | ALL INNER AND OUTER LOOPS COMPLETE SO BRANCH TO EXIT |
| PRF006 | CLA 0,4 | EXCHANGE ENTRY+0 AND ENTRY+1 SO THAT |
| | LDQ 1,4 | THE LARGEST VALUE IS ALWAYS PUSHED |
| | STR 1,4 | DOWN TO THE BOTTOM OF THE TABLE |
| | STQ 0,4 | |
| | STR XCHNGE | SET EXCHANGE FLAG NON-ZERO AND |
| | TRU PRF005 | CONTINUE |
| | LRB 3 | MERGE CODE WITH RESPECTIVE JAM LEVEL |
| | STR 0,5 | AND STORE IN FREQUENCY CODE TABLE |
| | INX 1,5 | INCREMENT TABLE POINTER TO NEXT ENTRY |
| | INX 1,6 | INCREMENT FREQUENCY CODE COUNTER AND |
| | TRX PRF002,3 | LOOP FOR 6 SETS |
| | INX 1,2 | INCREMENT POINTER TO PACKED DATA |
| | INX 5,3 | RESTORE LOOP COUNTER FOR NUMBER OF SETS |
| | TRX PRF001,4 | TO UNPACK AND LOOP FOR 6 WORDS |

THE FOLLOWING INSTRUCTION STRING SORTS THE COMBINED CODE AND JAM LEVEL IN ORDER OF LOWEST TO HIGHEST JAM LEVEL. THE "EXCHANGE-SORT" METHOD WAS SELECTED BECAUSE OF IT'S DESIGN SIMPLICITY.

APPENDIX "A"—Continued

```
            CLA I30           SET UP COUNT-2 TO COMPARE ENTRY AND
            STR 2                ENTRY+1 FOR ALL FREQUENCIES
                                 (REGISTER 2)

CLA I31           SET UP COUNT-1 TO LOOP FOR ALL 32
            STR 3                FREQUENCIES (REGISTER 3)

CLA I0            RESET EXCHANGE FLAG (SET IF DURING ANY
            STR XCHNGE           PASS AN ENTRY MUST BE EXCHANGED)
PRF003      CLA FRQCAD        FETCH ADDRESS OF FREQUENCY CODE TABLE
            STR 4                AND SAVE FOR INDEXING (REGISTER 4)
PRF007      CLA FRQCAD        RESTORE POINTER TO TOP OF FREQUENCY CODE
            STR 4                TABLE (REGISTER 4)

PRF008      CLA 0,4           FETCH CODE AND JAM LEVEL FROM FREQUENCY
                                 TABLE
            RSA 3             ISOLATE FREQUENCY CODE AND SAVE FOR
            STR FXC              LATER USE BY ENERGY MANAGEMENT
            ADD FRQMAD        ADD ADDRESS OF TOP OF FREQUENCY CYCLE
                                 TABLE TO COMPUTE ADDRESS OF ENTRY FOR
            STR FX               THIS FREQUENCY AND SAVE TEMPORARILY
            CLA*FX            FETCH FREQUENCY (MC) FROM SAVED ADDRESS
            STR FX            SET FX TO NEXT BEST FREQUENCY FROM
            TRU PRF100           ORDERED FREQUENCY TABLE

PRF010      INX 1,4           BUMP POINTER TO NEXT ENTRY IN ORDERED
                                 FREQUENCY TABLE
            SXH FRQCND,4      HAVE ALL 32 FREQUENCIES BEEN CHECKED?
            TRU PRF008           NO, CHECK NEXT FREQUENCY
PRF020      CLA I1            SET NO VISIBILITY
            STR VISBLE
            TRU 1,12          RETURN TO ENERGY MANAGEMENT
```

CALCULATE ALLOWABLE PRF BANDS (PRFX) FOR THIS FREQUENCY (FX)

WHERE 1562 < OR = PRFAL < OR = (PRFX) < OR = PRFAU < OR = 3125

```
                              CALCULATE FIRST FORBIDDEN PRF UPPER
                                 BOUND (PRF1U) THIS FREQUENCY (FX)
PRF100      CLA FX            FETCH FREQUENCY AT B17
            MLY DOT           MULTIPLY BY RADIAL VELOCITY AT B14
            DIV PRFMN         DIVIDE BY CONSTANT AT B15
            ADD I1            ANSWER AT B16, ROUND AND
            RSA 1
            STR PRF1U         SAVE

CALCULATE FIRST FORBIDDEN PRF LOWER
                                 BOUND (PRF1L) THIS FREQUENCY (FX)

CLA FX            FETCH FREQUENCY AT B17
            MLY DOT           MULTIPLY BY RADIAL VELOCITY AT B14
            DIV PRFMX         DIVIDE BY CONSTANT AT B15
            ADD I1            ANSWER AT B16, ROUND AND
            RSA 1
            STR PRF1L         SAVE

CLA I1            SET FIRST TIME ON FLAG = ON
            STR FIRST

STR N             SET N = 1

PRF110      CLA I0            COMPUTE NTH FORBIDDEN PRF UPPER BOUND
            LDQ PRF1U
            DIV N             PRFFU = PRF1U / N
            STR PRFFU
            CLA I0            COMPUTE NTH FORBIDDEN PRF LOWER BOUND
            LDQ PRF1L
            DIV N             PRFFL = PRF1L / N
            STR PRFFL
            CLA FIRST         FIRST TIME = ON?
            TRZ PRF130           NO
            CLA PRFFU         IS PRF FORBIDDEN UPPER > 3125?
            CMA K3125
            TRH PRF115           YES, BRANCH
            CMA K1562         NO, IF PRF FORBIDDEN UPPER < 1562?
            TRL PRF113           YES, BRANCH

CLA PRFFU         CURRENT ALLOWABLE LOWER = FIRST UPPER+1
            ADD I1
PRF112      STR PRFAL
            CLA I0            NO, SET FIRST TIME = OFF
            STR FIRST
            CLA K3125         CURRENT ALLOWABLE UPPER = 3125
            STR PRFAU
            TRU PRF200

PRF113      CLA K1562         SET ALLOWABLE LOWER TO MINIMUM
            TRU PRF112

PRF115      CLA PRFFL         IS PRF FORBIDDEN LOWER > 3125?
            CMA K3125
            TRH PRF 120          YES
            CLA I0            SET FIRST TIME = OFF
```

APPENDIX "A" – Continued

```
                STR FIRST
                TRU PRF140

PRF120          INX 1,N              N = N+1
                TRU PRF110

PRF130          CLA PRFFU            IS PRF FORBIDDEN UPPER < 1562?
                CMA K1562
                TRL *+3              YES, BRANCH
                ADD I1
                TRU *+2
                CLA K1562            ALLOWABLE LOWER = 1562
                STR PRFAL
                TRU PRF200
PRF140          CLA PRFFL            IS PRF FORBIDDEN LOWER < OR =1562 ?1562?
                CMA K1562
                TRL PRF010             YES
                TRE PRF010
                SUB I1               NO, PRF ALLOWAL UPPER = PRF FORBIDDEN
                STR PRFAU              LOWER - 1
                TRU PRF120

CHECK IF TARGET RANGE IS IN BLIND RANGE
                                       ZONE FOR THIS PRF

PRF200          CLA PRFAU            SET THIS PRF TO FIRST ALLOWABLE
                STR PRFX               UPPER
PRF210          CLA I0               CALCULATE FIRST BLIND RANGE ZONE
                LDQ K81000             THIS PRF
                DIV PRFX
                STR R1               SAVE FIRST BLIND RANGE ZONE START
                STR RX               SAVE CURRENT BLIND RANGE ZONE START

PRF220          CLA RP               IS TRACK RANGE LESS THAN CURRENT BLIND
                CMA RX                 RANGE ZONE ?
                TRL PRF222             YES, VISIBILITY IS GOOD
                CLA RX
                ADD DR               IS TRACK RANGE < OR = CURRENT BLIND
                CMA RP                 RANGE ZONE + BLIND ZONE DELTA?
                TRH PRF221           NO
                CLA PRFX
                SUB DPRF             SET CURRENT PRF TO CURRENT - DELTA PRF
                STR PRFX
                CMA PRFAL            IS NEW PRF < ALLOWABLE LOWER ?
                TRL PRF140             YES
                TRU PRF210

PRF221          CLA RX
                ADD R1               RX = RX + R 1
                STR RX
                TRU PRF220

PRF222          CLA I0               SET VISIBILITY = GOOD
                STR VISBLE
                TRU 1,12             RETURN TO ENERGY MANAGEMENT
                END

SYSTEM PARAMETERS:
RGATE           EQU 300B             MAXIMUM MANEUVER GATE
                                       (SET UP BY TRACKING)
TFACT           EQU RGATE+1          FALSE ALARM COUNT (PER SCAN)
TCFAR           EQU TFACT+1          FALSE ALARM CONTROL SETTING
THRES           EQU TCFAR+1          SEARCH THRESHOLD

SCNCP           EQU THRES+1          SCAN COMPLETE INDICATOR

RANGST          EQU SCNCP+1          RANGE START (SET UP BY TRACKER)
RANGSP          EQU RANGST+1         RANGE STOP             *
TGTRNG          EQU RANGSP+1         RANGE                  *
TGTVEL          EQU TGTRNG+1         VELOCITY               *
TGTAZM          EQU TGTVEL+1         AZIMUTH                *
ENSAR           BSS 1                SAVE REGISTERS FOR A-REGISTER,
ENSQR           BSS 1                  Q-REGISTER AND SYSTEM INDICATORS
ENSIR           BSS 1

BSTRTE          BSS 1                BURST MODE          (COMPUTED BY
                                                           REM700)
FILPLS          BSS 1                NUMBER OF FILL            *
                                     PULSES

MODE            BSS 1                TEMPORARY HOLD REGISTER FOR MODE WORD

VERIRQ          BSS 1                VERIFICATION REQUEST FLAG
VERIAD          BSS 1                ADDRESS OF NEXT REPORT ADDRESS
VERPTR          BSS 1                POINTER TO LAST USED VERIFY ADDRESS

RTRNG           BSS 1                RANGE OF LAST TARGET VERIFIED

BUFPTR          BSS 1                POINTER TO NEXT RCD BUFFER

DWELL           BSS 1                DWELL COUNTER

TMPSV1          BSS 10               RESERVE 10 REGISTERS FOR TEMP STORAGE
```

APPENDIX "A" – Continued

ROUTINE CONSTANTS:

| | |
|---|---|
| I0 | DEC 0 |
| I1 | DEC 1 |
| I2 | DEC 2 |
| I3 | DEC 3 |
| I4 | DEC 4 |
| I5 | DEC 5 |
| I7 | DEC 7 |
| I8 | DEC 8 |
| I10 | DEC 10 |
| I13 | DEC 13 |
| I48 | DEC 48 |
| | |
| K11 | DEC 1.1B16 |
| K1000 | DEC 1000 |
| K5000 | DEC 5000 |
| | |
| O77 | OCT 77 |

ADDRESS CONSTANTS:

| | | |
|---|---|---|
| RTRB1 | GAD TR1 | ADDRESS OF TARGET REPORT BUFFER 1 |
| RTRB2 | GAD TR2 | ADDRESS OF TARGET REPORT BUFFER 2 |
| RTRB3 | GAD TR3 | ADDRESS OF TARGET REPORT BUFFER 3 |
| | | |
| FXP | GAD FX | FREQUENCY CODE SET BY 'PRF' ROUTINE |
| PRFXP | GAD PRFX | PRF VALUE SET BY 'PRF' ROUTINE |
| | | |
| YTODL | EQU 16B | TIME OF DAY CLOCK |
| | | |
| RDBFAD | GAD RDBF | ADDRESS OF RADAR CONTROL BUFFER |
| RDBFWD | EQU 6 | NUMBER OF WORDS PER ENTRY |
| RDBFEN | EQU 3 | NUMBER OF ENTRIES MINUS 1 |
| RDBF | TBL, S,R,RDBFEN+1, RDBFWD | RADAR CONTROL BUFFER TABLE |
| | | |
| RARID | ITM O,00, 01, 02,U,02 | ARRAY ID |
| RCMDE | ITM O,00,03,03,U,05 | MODE |
| RCAZM | ITM O,00,06,12,S,17 | SINE OF AZIMUTH ANGLE FROM BROADSIDE |
| | | |
| RCFRQ | ITM O,01,01,05,U,05 | FREQUENCY |
| RCELV | ITM O,01,06,12,S,17 | SINE OF ELEVATION ANGLE FROM BROADSIDE |
| | | |
| RCTHR | ITM O,02,00,06,U,05 | THRESHOLD |
| RDFRQ | ITM O,02,06,12,S,17 | DELTA FREQUENCY (GROUND DOPPLER OFFSET) |
| | | |
| RCBMD | ITM O,03,03,02,U,04 | BURST MODE |
| RCRST | ITM O,03,05,13,U,17 | RANGE CELL START |
| | | |
| RCRSP | ITM O,04,05,13,U,17 | RANGE CELL STOP |
| | | |
| RCFLP | ITM O,05,02,04,U,05 | FILL PULSES |
| RCPRF | ITM O,05,06,12,U,17 | PRF |

INTERFACE ADDRESSES FOR RANGE RESOLUTION ROUTINE:

| | | |
|---|---|---|
| XEP | EQU XE | END OF DWELL 1 BUFFER |
| YEP | EQU YE | END OF DWELL 2 BUFFER |
| | | |
| RXFP | EQU RXF | RANGE CELLS/INTERVAL FOR DWELL 1 |
| RXYP | EQU RYF | RANGE CELLS/INTERVAL FOR DWELL 2 |
| ZOP | EQU ZO | ADDRESS FOR DWELL 3 |
| | | |
| CORELP | EQU CORREL | CORRELATION FLAG |
| | | |
| REM000 | STR ENSAR | SAVE A-REGISTER |
| | STQ ENSQR | Q-REGISTER |
| | PIA | AND |
| | STR ENSIR | MACHINE CONDITIONS FROM POINT OF INTERRUPT |
| | SEI 0000 | SET INDEX BANK TO RADAR CYCLE |
| | | |
| | TSX**+1 | CALL COORDINATE CONVERSION ROUTINE |
| | GAD CORCON | (ADDRESS OF CONVERSION ROUTINE) |
| | CLA RTRB1 | SET UP POINTER TO TARGET REPORT BUFFER |
| | STR 1 | (REGISTER 1) |
| | CLA 2, 1 | FETCH MODE WORD OF REPORT HEADER |
| | LGM 13 | ISOLATE MODE CODE |
| | TRZ REM010 | 0 = SEARCH |
| | CMA I2 | |
| | TRL REM020 | 1 = VERIFY |
| | | |
| | TRU REM030 | 2 = TRACK |
| | | |
| REM010 | CLA DWELL | WHAT IS THE CURRENT DWELL COUNT ? |
| | CMA I2 | |
| | TRH REM012 | DWELL = 3 |
| | ADD I1 | INCREMENT DWELL COUNT AND |
| | STR DWELL | SAVE FOR NEXT PASS |
| | | |
| | TRE REM400 | DWELL = 2 |
| | | |
| | TRU REM600 | DWELL = 1 |

APPENDIX "A" – Continued

| | | |
|---|---|---|
| REM012 | CLA I0 | RESET DWELL COUNTER |
| | STR DWELL | |
| | | CLEAR A AND Q REGISTERS AND |
| | LDQ I0 | FETCH REAL TIME CLOCK |
| | DPA YTODL | |
| | STQ TLS | SAVE TIME OF SEARCH BEAM |
| | STR TLS+1 | (LAST OF 3 DWELLS) |
| | TSX**+1 | COMPUTE MULTIPATH RESOLUTION |
| | GAD MAA000 | (ADDRESS OF RESOLUTION ROUTINE) |
| | | UPON RETURN FROM MULTIPATH RESOLUTION IF A-REGISTER IS ZERO, NO TENTATIVE |
| | TRZ REM600 | TARGETS ARE TO BE VERIFIED. OTHERWISE THE A-REGISTER CONTAINS THE NUMBER OF TARGETS TO BE VERIFIED AND THE |
| | STR VERIRQ | Q-REGISTER CONTAINS THE ADDRESS OF |
| | STQ VERIAD | THE TARGET PARAMETERS. |
| | TRU REM600 | EXIT TO BUMP RADAR OUTPUT BUFFER POINTER. |
| REM020 | CLA 2,1 | CHECK TARGET REPORT BUFFER FOR A |
| | RSA 3 | TARGET RETURN. |
| | LGM O77 | DETECTION ?? |
| | TRZ REM600 | NO. |
| | CLA RTRNG | HAS RANGE AMBIGUITY BEEN RESOLVED ? |
| | TRN *+2 | NO, RESOLVE AMBIGUITY |
| | TRU REM022 | YES, INITIALIZE TRACK |
| | CLA RTRB1 | SET UP TEMPORARY POINTER TO TARGET |
| | STR 8 | REPORT BUFFER 1 |
| | ADD I9 | SET UP POINTER TO FIRST TARGET REPORT |
| | STR 2 | IN BUFFER |
| | ADD I1 | |
| | STR XEP | SET DWELL 1 END OF BUFFER |
| | CLA 8,8 | FETCH PRF USED ON VERIFY BEAM |
| | LGM O7777 | MASK AND |
| | TSX P2R | CONVERT TO RANGE CELLS |
| | STR RXFP | SAVE INTERVAL SIZE FOR DWELL |
| | SUB I5 | REDUCE INTERVAL SIZE BY JITTER |
| | STR RYFP | AND SAVE |
| | CLA VERIPT | SET UP TEMPORARY POINTER TO TARGET |
| | STR 8 | VERIFICATION PARAMETERS |
| | ADD I1 | SET UP POINTER TO TARGET RANGE |
| | STR 3 | |
| | ADD I1 | |
| | STR YEP | SET DWELL 2 END OF BUFFER |
| | CLA I1 | SET PASS = 1 |
| | STR PASSP | |
| | CLA I0 | SET DWELL 3 = NULL |
| | STR ZOP | |
| | TSX**+1 | RESOLVE RANGE AMBIGUITY |
| | GAD RRA000 | |
| | TSX**+1 | CROSS CORRELATE AGAINST TRACK STORES |
| | GAD CCS000 | |
| | CLA CORELP | DID THE TARGET CORRELATE ? |
| | TRZ REM022 | NO, SET NEW TRACK |
| | TRU REM610 | YES, IGNORE |
| REM022 | TSX**+1 | INITIALIZE NEW TRACK |
| | GAD INITRK | (ADDRESS OF INITIALIZER) |
| | TRU REM600 | EXIT TO OUTPUT NEXT BUFFER |
| REM030 | CLA DWELL | WHAT IS THE DWELL NUMBER FOR THIS |
| | CMA I1 | TRACK BEAM ? |
| | TRE REM400 | DWELL = 1 (HOLD FOR DWELL 2) |
| | TSX**+1 | CALL TRACKING ROUTINE |
| | GAD TRAKAD | |

UPON RETURN FROM THE TRACKING ROUTINE THE A-REGISTER CONTAINS THE ADDRESS OF THE TARGET PARAMETERS. THE TRACK UPDATE RATE MUST NOW BE CALCULATED USING THE RANGE AND TARGET ACCELERATION.

| | | |
|---|---|---|
| | STR 1 | SAVE ADDRESS OF TARGET PARAMETERS (REGISTER 1) |
| | CLA I0 | |
| | LDQ 0,1 | CONVERT RANGE TO NAUTICAL MILES |
| | LSB 1 | |
| | DIV I48 | (ANSWER AT B16) |
| | MLY 2,1 | COMPUTE (RANGE * THETA) (ANSWER AT B32) |
| | DIV 1,1 | COMPUTE ((RANGE * THETA) / ACCELERATION) (ANSWER AT B15) |
| | XCA | PLACE ARGUMENT IN Q-REGISTER AND FIND |
| | CLA I0 | SQUARE ROOT |
| | SQR | (ANSWER AT B16) |
| | MLY K11 | MULTIPLY BY 1.1 |
| | XCA | MOVE ANSWER TO B16 |
| | ADD I1 | |

APPENDIX "A" – Continued

```
            RSA 1                   ROUND AND SHIFT
            STR 3,1                    SAVE UPDATE TIME
            TRU REM600              BRANCH TO OUTPUT NEXT COMMAND
```

REM100 IS THE SEARCH PORTION OF THE RADAR ENERGY MANAGEMENT
PROGRAM. IT SETS UP THE REQUIRED RADAR CONTROL PARAMETERS FOR
THE THREE DWELLS OF A SEARCH BEAM.

```
REM100      CLA BUFPTR              COMPUTE ADDRESSES OF NEXT AVAILABLE
            TSX REM900                 RADAR CONTROL BUFFERS
            CLA I0                  SET MODE TO SEARCH
            STR MODE
            TSX**+1                 FETCH NEXT SEARCH BEAM AZIMUTH FROM
            GAD SEARCH                 SEARCH PATTERN
                                       (RETURN WITH AZIMUTH IN A-REGISTER)

TSX LIS                 SAVE INDEX REGISTERS
            TSX REM800                 CALL ARRAY ROUTINE
            TSX LIR                 RESTORE INDEX REGISTERS

CLA ARAYID              FORMAT FIRST WORD OF RADAR CONTROL
            LSA 3                      COMMAND
            LGA MODE
            LSA 12                     (ID, MODE AND AZIMUTH)
            LGA AZBS
            STR 0,5                 STORE IN OUTPUT BUFFERS
            STR 0,6
            STR 0,7

CLA ARAYEL              STORE ELEVATION VALUE INTO
            STR 1,5                    OUTPUT BUFFERS
            STR 1,6
            STR 1,7

CLA DLTFRQ              STORE DELTA FREQUENCY (GROUND DOPPLER
            STR 2,5                    OFFSET) INTO OUTPUT BUFFERS
            STR 2,6
            STR 2,7
            CLA RPRF1               STORE STANDARD PRF 1 (3125) INTO
            RPL RCPRF,5,17             FIRST DWELL BUFFER
            CLA RPRF2               STORE STANDARD PRF 2 (2232) INTO
            RPL RCPRF,6,17             SECOND DWELL BUFFER
            CLA RPRF3               STORE STANDARD PRF 3 (1562) INTO
            RPL RCPRF,7,17             THIRD DWELL BUFFER

CLA I0                  STORE STANDARD FREQUENCY (1225) INTO
            RPL RCFRQ,5,17             ALL 3 DWELL BUFFERS
            CLA I0
            RPL RCFRQ,6,17             (FREQUENCY IS A CODED VALUE RANGING
            CLA I0
            RPL RCFRQ,7,17             FROM 0 TO 31)

CLA I0                  SET RANGE START FOR ALL 3 DWELLS
            RPL RCRST,5,17             TO 0 RANGE CELLS
            CLA I0
            RPL RCRST,6,17
            CLA I0
            RPL RCRST,7,17

CLA K5000               SET RANGE STOP FOR ALL 3 DWELLS
            RPL RCRSP,5,17             TO 5000 RANGE CELLS
            CLA K5000
            RPL RCRSP,6,17
            CLA K5000
            RPL RCRSP,7,17
            CLA I3                  SET BURST MODE TO MAXIMUM FOR ALL 3
            RPL RCBMD,5,17             DWELLS OF SEARCH BEAM
            CLA I3
            RPL RCBMD,6,17             (4 SETS OF 16 PULSES)
            CLA I3
            RPL RCBMD,7,17

CLA I13                 SET FILL PULSE COUNT TO 13
            RPL RCFLP,5,17             FOR FIRST DWELL
            CLA I10                 SET FILL PULSE COUNT TO 10
            RPL RCFLP,6,17             FOR SECOND DWELL
            CLA I8                  SET FILL PULSE COUNT TO 8
            RPL RCFLP,7,17             FOR THIRD DWELL

COMPUTE SEARCH DETECTION THRESHOLD FOR
                                    SEARCH IF SCAN HAS PASSED

CLA SCNCP               IF SCAN NOT COMPLETE
            TRZ REM130                 BRANCH AND USE OLD THRESHOLD
            CLA TFACT               HAS FALSE ALARM COUNT EXCEEDED THE
            CMA TCFAR                  'CFAR' SETTING ?
            CLA THRES
            TRL *+3                 IF COUNT < CFAR , REDUCE THRESHOLD
            TRH *+3                 IF COUNT > CFAR , INCREASE THRESHOLD
            TRU *+3                    OTHERWISE USE THRESHOLD AS IS
            SUB I2
            ADD I1
            STR THRES               SAVE SETTING FOR FUTURE REFERENCE
REM130      CLA THRES               STORE THRESHOLD SETTING INTO
```

APPENDIX "A" – Continued

```
            RPL RCTHR,5,17      ALL 3 RADAR CONTROL BUFFERS
            CLA THRES
            RPL RCTHR,6,17
            CLA THRES
            RPL RCTHR,7,17

TRU REM610          BRANCH TO OUTPUT NEXT SET OF RADAR
                                  CONTROLS
```

REM200 IS THE VERIFY PORTION OF THE RADAR ENERGY MANAGEMENT
PROGRAM. IT SETS UP THE REQUIRED RADAR CONTROL PARAMETERS FOR
THE ONE DWELL VERIFY BEAM.

```
REM200      CLA BUFPTR          COMPUTE ADDRESS OF NEXT AVAILABLE
            TSX REM900            RADAR CONTROL BUFFER

CLA I1              SET MODE TO VERIFY
            STR MODE

CLA VERIRQ          DECREMENT COUNT OF NUMBER OF RETORTS
            SUB I1                TO BE VERIFIED
            STR VERIRQ

CLA         FETCH ADDRESS OF
VERIRQ+1    PARAMETERS FOR
            TARGET
            STR 4               TO BE VERIFIED (ADDRESS IS SET UP BY
            CLA 0,4               THE MULTIPATH RESOLUTION PROGRAM AND
            STR 4                 ALTERED BY REM200)
                                  (SAVE IN REGISTER 4)
            CLA 0,4             FETCH AZIMUTH OF TARGET TO BE VERIFIED

TSX LIS             SAVE INDEX REGISTERS
            TSX REM800            CALL ARRAY ROUTINE
            TSX LIR             RESTORE INDEX REGISTERS

CLA ARAYID          FORMAT FIRST WORD OF RADAR CONTROL
            LSA 3               COMMAND
            LGA MODE
            LSA 12                (ID, MODE AND AZIMUTH)
            LGA AZBS
            STR 0,5

CLA ARAYEL          STORE ELEVATION VALUE INTO
            STR 1,5               OUTPUT BUFFER

CLA DLTFRQ          STORE DELTA FREQUENCY (GROUND DOPPLER
            STR 2,5               OFFSET) INTO OUTPUT BUFFER

CLA 1,4             IS TARGET RANGE AMBIGUOUS ?
            STR RTRNG             (SET NEGATIVE BY MULTIPATH RESOLUTION
                                  ROUTINE IF AMBIGUOUS)
            TRN REM210          YES, BRANCH

CLA 2,4             STORE SEARCH PRF INTO RADAR CONTROL
            TSX P2R             CONVERT PRF TO RANGE CELLS
            ADD I5                ADD JITTER
            TSX R2P             CONVERT TO PRF
            RPL RCPRF,5,17        BUFFER

CLA I0              STORE STANDARD FREQUENCY INTO RADAR
            RPL RCFRQ,5,17        CONTROL BUFFER

CLA 1,4             FETCH TARGET RANGE AND
            TSX REM700            COMPUTE TOTAL AND FILL PULSES

CLA BSTRTE          STORE BURST MODE INTO RADAR CONTROL
            RPL RCBMD,5,17        BUFFER

CLA FILPLS          STORE FILL PULSES INTO RADAR CONTROL
            RPL RCFLP,5,17        BUFFER

TSX REM500          COMPUTE DETECTION THRESHOLD

RPL RCTHR,5,17      STORE DETECTION THRESHOLD INTO RADAR
                                  CONTROL BUFFER
            CLA 1,4             COMPUTE RANGE START AND RANGE STOP
            ADD RGATE             (MAX MANEUVER GATE)
            RPL RCRSP,5,17      R-STOP = RANGE + GATE

CLA 1,4
            SUB RGATE
            RPL RCRST,5,17      R-START = RANGE - GATE
            TRU REM220
REM210      CLA 2,4             FETCH PRF THAT WAS SAVED
            RPL RCPRF,5,17        STORE IT IN THE RADAR CONTROL BUFFER

CLA I0              USE STANDARD FREQUENCY
            RPL RCFRQ,5,17        STORE IT IN THE RADAR CONTROL BUFFER

CLA I0              SET RANGE START TO ZERO
            RPL RCRST,5,17

CLA K5000           SET RANGE STOP TO MAXIMUM
            RPL RCRSP,5,17
```

APPENDIX "A" – Continued

```
              CLA 113              SET FILL PULSES TO MAXIMUM (13)
              RPL RCFLP,5,17

CLA 14               SET BURST MODE TO MAXIMUM (4)
              RPL RCBMD,5,17

CLA THRES            USE CURRENT SEARCH THRESHOLD SETTING
              RPL RCTHR,5,17

REM220     CLA 4                INCREMENT TARGET VERIFICATION POINTER
              STR VERPTR             SAVE POINTER TO LAST SET USED
              ADD I1                 TO NEXT SET OF DATA AND
              STR VERIRQ+1           SAVE FOR NEXT PASS

CLA*BUFPTR           CHECK DATA AT OUTPUT BUFFER
                                     IF SIGN BIT SET (BY RADAR) DATA HAS
              TRN REM400             BEEN OUTPUT AND MUST SET UP ANOTHER
                                     DWELL
              TRU REM610           OTHERWISE OUTPUT DATA AT BUFFER
```

REM300 IS THE TRACK PORTION OF THE RADAR ENERGY MANAGEMENT
PROGRAM. IT SETS UP THE REQUIRED RADAR CONTROL PARAMETERS FOR
THE TWO DWELLS OF A TRACK BEAM.

```
   REM300     CLA BUFPTR           USE ADDRESS OF CURRENT DATA TO BE
                                     OUTPUT TO COMPUTE ADDRESS OF NEXT
              TSX REM900             AVAILABLE RADAR CONTROL BUFFERS

CLA I2               SET MODE TO TRACK
              STR MODE

CLA TRKPTR           FETCH AND SAVE ADDRESS OF TRACK STORE
              STR 2                  ENTRY FOR THIS TARGET
              CLA TGTAZ,2          FETCH TARGET AZIMUTH

TSX LIS              SAVE INDEX REGISTERS
              TSX REM800             CALL ARRAY ROUTINE
              TSX LIR              RESTORE INDEX REGISTERS

CLA ARAYID           FORMAT FIRST WORD OF RADAR CONTROL
              LSA 3                  COMMAND
              LGA MODE
              LSA 12                 (ID, MODE AND AZIMUTH)
              LGA AZBS
              STR 0,5                STORE IN OUTPUT BUFFERS
              STR 0,6
              CLA ARAYEL           STORE ELEVATION VALUE INTO
              STR 1,5                OUTPUT BUFFERS
              STR 1,6

CLA DLTFRQ           STORE DELTA FREQUENCY (GROUND DOPPLER
              STR 2,5                OFFSET) INTO OUTPUT BUFFERS
              STR 2,6

XTR RCAZM,5,17       SUBTRACT DELTA AZIMUTH FROM
              SUB DLTAZM             MAIN BEAM
              RPL RCAZM,5,17

XTR RCAZM,6,17       ADD DELTA AZIMUTH TO
              ADD DLTAZM             MAIN BEAM
              RPL RCAZM,6,17

CLA RNGST,2          STORE RANGE START INTO RADAR CONTROL
              RPL RCRST,5,17         BUFFERS (COMPUTED BY TRACKER)
              CLA RNGST,2
              RPL RCRST,6,17

CLA RNGSP,2          STORE RANGE STOP INTO RADAR CONTROL
              RPL RCRSP,5,17         BUFFERS (COMPUTED BY TRACKER)
              CLA RNGSP,2
              RPL RCRSP,6,17

TSX LIS              SAVE INDEX REGISTERS
              TSX PRF000             CALL PRF AND FREQUENCY SELECTION
              TSX LIR              RESTORE INDEX REGISTERS

CLA PRFXP            STORE SELECTED PRF INTO RADAR CONTROL
              RPL RCPRF,5,17         BUFFERS
              CLA PRFXP
              RPL RCPRF,6,17

CLA FXP              STORE SELECTED FREQUENCY INTO RADAR
              RPL RCFRQ,5,17         CONTROL BUFFERS
              CLA FXP
              RPL RCFRQ,6,17

CLA TGTRG,2          FETCH TARGET RANGE AND COMPUTE BURST
              TSX REM700             RATE AND FILL PULSES

CLA BSTRTE           STORE BURST RATE INTO RADAR CONTROL
              RPL RCBMD,5,17         BUFFERS
              CLA BSTRTE
              RPL RCBMD,6,17

CLA FILPLS           STORE FILL PULSES INTO RADAR CONTROL
              RPL RCFLP,5,17         BUFFERS
```

APPENDIX "A" – Continued

```
            CLA FILPLS
            RPL RCFLP,6,17

TSX REM500          COMPUTE DETECTION THRESHOLD
            STR TMPSV1+2
            RPL RCTHR,5,17      STORE DETECTION THRESHOLDS INTO RADAR
            CLA TMPSV1+2
            RPL RCTHR,6,17         CONTROL BUFFERS

TRU REM610          BRANCH TO OUTPUT NEXT COMMAND
```

REM400 IS THE ENERGY MANAGEMENT PORTION OF THE RADAR ENERGY MANAGEMENT PROGRAM. ITS MAIN FUNCTION IS TO ALLOCATE THE RADAR ENERGY FOR SEARCH OR TRACK BEAMS AND MAINTAIN DATA RATES ON THE EXISTING TRACKS. THIS IS ACCOMPLISHED BY ESTABLISHING A PRIORITY BASED ON THE TIME OF LAST BEAM AND TIME INTERVAL BETWEEN BEAMS. THE HIGHEST PRIORITY WILL DETERMINE THE BEAM MODE (SEARCH OR TRACK).

ROUTINE ADDRESS CONSTANTS:

```
PRIEND      GAD PRIT+256        END OF TRACK PRIORITY TABLE
PRIPTR      GAD PRIT            ADDRESS OF PRIORITY TABLE
```

SCRATCH PAD TEMPORARY STORAGE ASSIGNMENTS:
```
PT          EQU START+1         TRACK PRIORITY AND INTERVAL
PS          EQU PT+2            SEARCH PRIORITY
TLS         EQU PS+1            TIME OF LAST SEARCH BEAM (2 WORDS)
NTS         EQU TLS+2           NUMBER OF TRACKS IN THE SYSTEM

REM400      CLA VERIRQ          IS THERE A TARGET TO BE VERIFIED ?
            TRZ REM410             NO, COMPUTE TRACK PRIORITIES.
            TRU REM200             AND BRANCH TO VERIFY ROUTINE.
REM410      CLA PRIPTR          SET UP A POINTER TO TRACK PRIORITY
            STR 2                  TABLE
            CLA I0              SET UPDATE INTERVAL COUNTER
            STR 1

STR PT              RESET PT
REM420      INX 2,1             SET INTERVAL COUNT TO INTERVAL UNDER
                                   INVESTIGATION
            CLA 0,2             ANY REPORTS IN THIS INTERVAL?
            TRZ REM440             NO, CHECK NEXT INTERVAL
            CLA 3,2
            LDQ 2,2             SOLVE PT=((TC – TLU)/DELTA T)
            CSA
            RSB 0               COMPUTE TIME CLOCK – TIME OF LAST
            DPA YTODL              UPDATE (VALUES IN IMS. INCREMENTS)
            XCA
            MLY K1000              CONVERT TO SECONDS
            XCA
            DIV 1                  DIVIDE BY INTERVAL
            CMA PT              IS PT FOR THIS SET > PT FOR LAST SET ?
            TRH REM430             YES, SAVE PARAMETERS FOR THIS SET
            TRU REM440
REM430      STR PT              SAVE PT FOR THIS SET AND
            CLA 1                  INTERVAL FOR THIS SET
            STR PT+1
REM440      INX 64,2            INCREMENT POINTER TO NEXT SET
            CLA 2
            CMA PRIEND          HAVE WE CHECKED ALL INTERVAL SET S?
            TRH REM450          YES
            TRU REM420          NO, RETURN FOR NEXT SET

REM450      CLA PT              IS LARGEST TRACK PRIORITY
            CMA I1                 > 1 ?
            TRL REM100             NO, BRANCH TO SEARCH ROUTINE

COMPUTE SEARCH PRIORITY
            CLA K
            MLY NTS             SOLVE PS =((TC – TLS)/((TSN +
                                   (K* NT)))
            XCA
            ADD TSNDLT
            STR TMPSV1          SAVE ((TSN+(K*NT))
            LDQ TLS
            CLA TLS+1           COMPUTE TC –TLS
            CSA
            RSB 0
            DPA YTODL
            XCA
            MLY K1000           CONVERT TO SECONDS
            XCA
            DIV TMPSV1          DIVIDE BY DELTA TS
            STR PS              SAVE SEARCH PRIORITY
            CMA PT              IF TRACK PRIORITY IS > SEARCH
            TRL REM300             BRANCH TO TRACK ROUTINE
            TRU REM100             OTHERWISE BRANCH TO SEARCH ROUTINE
```

REM500 COMPUTES THE TRACK THRESHOLD BASED ON THE TRACK GATE AND RANGING INTERVAL TIME. THE COMPUTED VALUE IS THEN SUBTRACTED FROM THE NOMINAL VALUE OF 11.6 DB.

ROUTINE CONSTANTS:

```
NOMNAL      DEC 11.6B16         NOMINAL THRESHOLD LEVEL
```

APPENDIX "A" – Continued

| | | |
|---|---|---|
| SAV1 | BSS 1 | RELATIVE TEMP STORAGE REGISTERS |
| SAV2 | BSS 1 | |
| SAV3 | BSS 1 | |
| REM500 | CLA 12 | SAVE RETURN ADDRESS |
| | STR SAV1 | |
| | XTR RCRSP,5,17 | FETCH RANGE STOP AND |
| | STR SAV2 | SAVE |
| | XTR RCRST,5,17 | COMPUTE GATE SIZE |
| | SUB SAV2 | (STOP – START) +1 |
| | ADD I1 | |
| | LSA 2 | CONVERT TO MICRO-SECONDS |
| | STR SAV2 | SAVE |
| | XTR RCPRF,5,17 | FETCH PRF FOR THIS DWELL |
| | STR SAV3 | AND SAVE |
| | CLA I0 | |
| | LDQQ O1000 | CONVERT RANGING INTERVAL TO |
| | DIV SAV3 | MICRO-SECONDS |
| | XCA | |
| | DIV SAV2 | COMPUTE GATE VS INTERVAL |
| | TSX LOGRTN | CONVERT TO LOG |
| | STR SAV3 | |
| | CLA NOMNA1 | REDUCE NOMINAL THRESHOLD BY |
| | SUB SAV3 | COMPUTED VALUE AND RETURN |
| | TRU*SAV1 | |

REM600 CONTROLS THE SELECTION AND OUTPUT OF THE RADAR CONTROL
BUFFERS. THIS IS DONE BY HOUSEKEEPING THE FLOATING POINTER TO
THE 'NEXT' BUFFER TO BE OUTPUT. (POINTER IS MODULO 4)

REM610 OUTPUTS THE SELECTED OUTPUT BUFFER AND THEN RETURNS CONTROL
TO THE PROGRAM THAT WAS INTERRUPTED BY THE RADAR CYCLE.

| | | |
|---|---|---|
| REM600 | CLA BUFCNT | INCREMENT BUFFER COUNTER |
| | ADD I1 | |
| | LGM I3 | MASK LAST 3 BITS (MODULO 4) |
| | STR BUFCNT | |
| | MLY I6 | COMPUTE ENTRY TO BUFFER TABLE |
| | XCA | |
| | ADD RDBFAD | |
| | STR BUFPTR | SAVE ADDRESS OF BUFFER TO BE OUTPUT |
| REM610 | EXF I0,CHN0 | TELL THE HARDWARE IT'S TIME TO |
| | | FETCH NEW RADAR CONTROLS |
| | CLA ENSIR | RESTORE MACHINE CONDITIONS |
| | PAI | |
| CLA | RESTORE A AND Q | |
| ENSAR | REGISTERS | |
| | LDQ ENSQR | |
| | REI 1000 | ALLOW INTERRUPTS AND |
| | TRU*CH4RTN | RETURN TO POINT OF INTERRUPT |

REM700 COMPUTES THE BURST MODE AND NUMBER OF FILL PULSES BASED
ON TARGET RANGE AND PRF.

ROUTINE CONSTANTS:

| | | |
|---|---|---|
| DCXCNT | DEC –261 | DELTA PRF COUNT |
| RNGVAL | GAD *,1 | ADDRESS OF RANGE VALUES |
| | DEC 0 | |
| | DEC 6852 | 141 MILES |
| | DEC 7213 | 169 MILES |
| | DEC 8088 | 187 MILES |
| REM700 | LDQ I4 | SET UP LOOP COUNTER AND RANGE VALUE |
| | STQ 1 | POINTER (REGISTER 1) |
| REM710 | CMA*RNGVAL | COMPARE TARGET RANGE AGAINST RANGE |
| | TRL REM720 | VALUES UNTIL A MATCH IS FOUND |
| | CLA 1 | |
| | STR BSTRTE | STORE BURST RATE AND |
| | TRU REM730 | BRANCH TO COMPUTE FILL PULSES |
| REM720 | TRX REM710,1 | DECREMENT POINTER AND BURST COUNT |
| REM730 | CLA I13 | SET UP LOOP COUNTER AND NUMBER OF |
| | STR 2 | FILL PULSES (REGISTER 2) |
| | CLA K2866 | STORE MAX PRF VALUE FOR COMPARE |
| | STR 1 | (REGISTER 1) |
| | XTR RCPRF,5,17 | FETCH PRF USED THIS DWELL AND COMPARE |
| REM740 | CMA 1 | TO MAX PRF |
| | TRL REM750 | BRANCH IF LESS |
| | CLA 2 | FETCH FILL PULSE COUNT |
| | STR FILPLS | STORE AND |
| | TRU 0,12 | RETURN |

APPENDIX "A" — Continued

```
REM750      DCX*DCXCNT           DECREMENT PRF COUNT BY DELTA PRF
            DCX 1,2              DECREMENT FILL PULSE COUNT
            TRU REM740             TRY AGAIN
```

REM800 IS THE ARRAY PORTION OF THE RADAR ENERGY MANAGEMENT
PROGRAM. IT CALCULATES THE AzIMUTH AND ELEVATION FROM BROADSIDE
PARAMETERS AND THE ARRAY ID. IT ALSO HAS THE TASK OF COMPUTING
THE DELTA FREQUENCY USED BY THE PHASE COMPUTER IN THE SIGNAL
PROCESSOR.
ROUTINE CONSTANTS:

```
DEGREE     GAD *+1,1            ADDRESS OF DEGREE CONSTANTS
           DEC 398              035 DEGREES (LSB = .088 DEGREES)
           DEC 1650             145    *              *
           DEC 2446             215    *              *
           DEC 3698             325    *              *
DEG090     DEC 1024             090    *              *
```

SYSTEM PARAMETERS:

```
SAVE       EQU 230B             TEMP STORAGE START ADDRESS
SAVERT     EQU SAVE+1           RETURN ADDRESS STORAGE
ACFTAZ     EQU SAVERT+1         AIRCRAFT AZIMUTH
AZBS       EQU ACFTAZ+1         AZIMUTH FROM BROADSIDE
ARAYID     EQU AZBS+1           ANTENNA ARRAY ID
ROLL       EQU ARAYID+1         AIRCRAFT ROLL
PITCH      EQU ROLL+1           AIRCRAFT PITCH
RTHETA     EQU PITCH+1          ANGLE FROM AIRCRAFT VISION
ACRDOT     EQU RTHETA+1         AIRCRAFT VELOCITY
LMDA       EQU ACRDOT+1         WAVELENGTH
DLTFRQ     EQU LMDA+1           DELTA FREQUENCY
ARAYEL     EQU DLTFRQ+1         ARRAY ELEVATION

REM800     LDQ 12               SAVE RETURN ADDRESS
           STQ SAVERT
           TSX**+1              CALL CONVERT TO RADAR COORDINATES
           GAD CONCOR             ROUTINE
           CLA I0               DETERMINE ARRAY ID FROM
           LDQ ACFTAZ             AZIMUTH
           DIV DEG090
           STR 1                SAVE QUOTIENT IN REGISTER 1 FOR
                                  INDEXING
           CLA ACFTAZ
           CMA*DEGREE           CHECK FOR MINIMUM AZIMUTH IN RELATION
                                  TO ARRAY COVERAGE
                                IF AZIMUTH IS LOWER THAN MINIMUM FOR
           TRL *+2                THIS SECTOR, ID = ID
           INX 1,1              OTHERWISE ID = ID +1

DETERMINE AZIMUTH ANGLE FROM BROADSIDE
           CLA DEG090                AZBS = AZACFT - (ID * 90)
           MLY 1
           XCA
           CSA
           ADD ACFTAZ
           TSX**+1
           GAD ARCSIN           COMPUTE SINE OF AZIMUTH ANGLE
           STR AZBS             SAVE AZIMUTH FROM BROADSIDE

CLA 1                FETCH CALCULATED ID
           LGM 13                 (MODULO 4)
           STR ARAYID           SAVE

DETERMINE ELEVATION ANGLE FROM
                                BROADSIDE
           TRZ REM830           ID OF 0 = NOSE ARRAY
           CMA I2
           TRE REM840           ID OF 2 = TAIL ARRAY

CMA I1
           CLA ROLL

TRE REM820           ID OF 1 = A/C RIGHT ARRAY
                                  EL FOR A/C RIGHT = + ROLL
                                ID OF 3 = A/C LEFT ARRAY
REM810     CSA                    EL FOR A/C LEFT = - ROLL

REM820     TSX**+1
           GAD ARCSIN           COMPUTE SINE OF ELEVATION ANGLE
           STR ARAYEL             SAVE ELEVATION FROM BROADSIDE
           TRU REM850

REM830     CLA PITCH            EL FOR NOSE ARRAY = -PITCH
           TRU REM810

REM840     CLA PITCH            EL FOR TAIL ARRAY = +PITCH
           TRU REM820

COMPUTE DELTA FREQUENCY

REM850     CLA RTHETA
           TSX**+1              CALCULATE COSINE THETA
           GAD SINCOS
           MLY ACRDOT             (ACRDOT * COSTHE)
```

APPENDIX "A" – Continued

```
LSB 1              ((ACRDOT * COSTHE) * 2)

DIV LMDA           (((ACRDOT * COSTHE) * 2) / LMDA)
STR DLTFRQ         SAVE DELTA FREQUENCY
TRU*SAVERT         RETURN TO RADAR ENERGY MANAGEMENT
```

REM900 IS A SUBROUTINE CALLED BY THE SEARCH, TRACK AND VERIFY SUBROUTINES TO COMPUTE THE ADDRESSES FOR STORAGE OF RADAR CONTROL COMMANDS.

ROUTINE CONSTANTS:

```
TBLEND   GAD                    END OF RADAR CONTROL DATA TABLE
         RDBF+RBDFWD*4

REM900   LDQ 12                 SAVE RETURN ADDRESS
         STQ SAVRTN
         ADD 16                 COMPUTE NEXT ENTRY INTO RADAR CONTROL
                                  TABLE
         CMA TBLEND             HAVE WE REACHED THE END OF THE TABLE ?
         TRL *+2                NO, CONTINUE
         TSX REM930             YES, START AT TOP OF TABLE
         STR 5                  SAVE ADDRESS OF FIRST SET

ADD 16                 COMPUTE NEXT ENTRY
         CMA TBLEND             END OF TABLE ?
         TRL *+2                NO
         TSX REM930
         STR 6                  SAVE ADDRESS OF SECOND SET

ADD 16                 COMPUTE NEXT ENTRY
         CMA TBLEND             END OF TABLE ?
         TRL *+2                NO
         TSX REM930
         STR 7                  SAVE ADDRESS OF LAST SET
         TRU*SAVRTN             RETURN TO CALLING ROUTINE

REM930   CLA RDBFAD             FETCH ADDRESS OF TOP OR RADAR CONTROL
                                  TABLE
         TRU 0,12               RETURN

END
```

APPENDIX B

Control Operations

| OP Code | R | Y |
|---|---|---|
| 0    4 | 5    8 | 9    17 |

TRU - Transfer Unconditionally (OP CODE 00) The computer will take the next instruction from the location in memory specified by Y and R.
Operating time: 1 microsecond.

TRN - Transfer on Accumulator Negative (OP CODE 01)

The sign bit of the Accumulator is sensed. If it is negative (1), control is transferred to the memory location specified by Y and R. If the Accumulator sign is positive (0), the computer will take the next instruction in sequence.
Operating time: 1 microsecond.

TRZ - Transfer on Accumulator Zero (OP CODE 02)

The contents of the Accumulator are tested for a zero value. The sign bit is not tested. If the contents of the Accumulator are zero, control is transferred to the memory location specified by Y and R. If the contents of the Accumulator are not zero, the computer will take the next sequential instruction.
Operating time: 1 microsecond.

TOF - Transfer on Overflow (OP CODE 03)

If the Overflow Indicator is on, the indicator is turned off and the computer takes the next instruction from the memory location specified by Y and R. If the Overflow Indicator is off, the computer takes the next instruction in sequence.
Operating time: 1 microsecond.

TSX - Transfer and Set Return Address in Index Register 12 (OP CODE 12)

The contents of the program counter plus one are placed in index register 12 of the specified index register bank. The computer will then take its next instruction from the memory location specified by Y and R. The value placed into the index register represents the memory location immediately following the location of this TSX instruction. The transfer portion of the Transfer and Set Index instruction may utilize all of the Indexing options.
Operating time: 2 microseconds.

| OP Code | R | Y |
|---|---|---|
| 0    4 | 5    8 | 9    17 |

CMA - Compare Algebraic (OP CODE 30)

The contents of the Accumulator are algebraically compared with the contents of the memory word at the location specified by Y and R. Two Compare Indicators, High, and Low, are treated as follows: If the Accumulator is lower, the Low Indicator is turned on and the other off. If the Accumulator is higher, the High Indicator is turned on and the other off. If they are equal, both are turned on. For the purposes of this instruction + zero is greater than − zero, $+377777_8$ is the highest number, and $-377777_8$ is the lowest number. Only the execution of another CMA or CML instruction or a PAI will alter these indicators.
Operating time: 2 microseconds.

CML - Compare Logical (OP CODE 31)

The entire contents of the Accumulator, including sign, are logically compared with the contents of the memory word at the location specified by Y and R. Two Compare Indicators, High and Low, are treated as follows: If the Accumulator is lower, the Low Indicator is turned on and the other off. If the Accumulator is higher, the High Indicator is turned on and the other off. If they are equal, both are turned on. For the purposes of this instruction 0 is the lowest number and $777777_8$ is the highest number. Only the execution of another CMA, or PAI instruction will alter these indicators.

Operating time: 2 microseconds.

TRE - Transfer Equal (OP CODE 05)

If both Compare Indicators are on, the computer takes the next instruction from the memory location specified by Y and R. If either Compare Indicator is off, the computer takes the next instruction in sequence. The execution of this instruction will not alter the state of the Compare Indicators.

Operating time: 1 microsecond.

TRH - Transfer High (OP CODE 06)

If only the High Compare Indicator is on, the computer takes the next instruction from the memory location specified by y and R. If the High Compare Indicator is off, the computer takes the next instruction in sequence. The execution of this instruction will not alter the state of the Compare Indicators.

Operating time: 1 microsecond.

TRL - Transfer Low (OP CODE 07)

If only the Low Compare Indicator is on, the computer takes the next instruction from the memory location specified by Y and R. If the Low Compare Indicator is off, the computer takes the next instruction in sequence. The execution of this instruction will not alter the state of the Compare Indicators.

Operating time: 1 microsecond. LCK - Lock

| 14 | N | 4 | N |
|---|---|---|---|
| 0 | 4  5 | 8  9   11  12 | 17 |

In a dual processor system, the value N is placed in the Lock Register of processor A. The number is then compared with the contents of the Lock Register of processor B. If equal, the Lock Register of processor A is reset and the computer will take the next instruction in sequence. If unequal, one instruction is skipped. In any case, the Lock Register and instruction sequence of processor B is unchanged. If both processors execute a LCK instruction with the same value at the same time the processor having executive control (Indicator 7 on) at that time completes execution of the LCK instruction 0.25 microseconds before the other processor. If identical instruction loops are used (a LCK instruction followed by a transfer back to the LCK instruction), the processor having executive control will normally set its Lock Register first. Since a clock update cycle, an interrupt, or a memory conflict may lengthen the instruction loop for the processor having executive control, it is possible for the other processor to set its Lock Register first.

Operating time: 1.5 microseconds for skip or indicator 7 on, otherwise 1.75 microseconds.

ULK - Unlock

| 14 | 0 | 0 | 0 |
|---|---|---|---|
| 0 | 4  5 | 8  9   11  12 | 17 |

The Lock Register of the processor is reset.
Operating time: 1.5 microseconds.

ARITHMETIC OPERATIONS

| O P Code | R | Y |
|---|---|---|
| 0 | 4  5 | 8  9 | 17 |

ADD - Add (OP CODE 22)

The contents of the memory location specified by Y and R are algebraically added to the contents of the Accumulator. The result is placed in the Accumulator. the Over-flow Indicator will be set (turned on) if an overflow occurs. If the result is zero, the sign of the result is the original sign of the Accumulator.

Operating time: 2 microseconds.

SUB - Subtract (OP CODE 23)

The contents of the memory location specified by y and R are algebraically subtracted from the contents of the Accumulator. The result is placed in the Accumulator. The Overflow Indicator will be turned on if an overflow occurs. If the result is zero, the sign of the result is the original sign of the Accumulator.

Operating time: 2 microseconds.

MLY - Multiply (OP CODE 24)

The contents of the memory location specified by Y and R are multiplied by the contents of the Accumulator. The product, which is a double length word, appears in the combined Accumulator and Q Register. The high order bits are in the Accumulator and the low order bits are in the Q Register. The sign of the product is in the sign bits of both the Accumulator and Q Register. Overflow is not possible. The initial value of the Q Register does not affect the result of this instruction.

Operating time: 3.5 microseconds.

DIV - Divide (OP CODE 25)

The double-length dividend in the combined Accumulator and Q Register is divided by the contents of the memory location specified by Y and R. The sign of the dividend is the sign of the Accumulator. The single-length quotient is in the Accumulator with the appropriate sign, and the remainder is the Q Register with the sign of the dividend. The divisor must be greater in magnitude than the higher-order half of the dividend. If it is not, the division does not take place and the Divide Check Indicator is turned on; the Accumulator and Q Register remain unchanged, and the computer takes the next sequential instruction.

Operating time: 6.25 microseconds; 2.25 microseconds if the division does not take place.

DPA - Double Precision Add (OP CODE 04)

The double-length contents of $Y + 1$ and $Y$ are algebraically added to the double-length word in the combined Accumulator and Q Register. $Y + 1$ contains the high-order bits of the double-length operand and $Y$ contains the low-order bits. These two words must have the same sign. The double-length sum is left in the Accumulator and Q Register with the high-order bits in the Accumulator and the low-order bits in the Q Register. The Accumulator and Q Register must have the same sign. The Overflow Indicator will be turned on if an overflow occurs out of the Accumulator. If the result is zero in both registers, the sign of the result is the original sign of the Accumulator.
Operating time: 3.25 or 3.5 microseconds.
SQR - Square Root

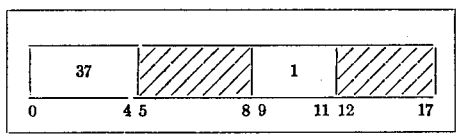

The single-length square root of the double-length argument in the combined Accumulator and Q register is put in the Accumulator. The contents of the Q Register are destroyed. If the sign of the argument is negative (sign of the Accumulator), the square root is not performed and the Divide Check Indicator is turned on; the Accumulator and Q Register remain unchanged, and the computer takes the next sequential instruction. The binary point for this instruction is assumed to be located between $A_0$ and $A_1$ or between any other A even and odd bit.
Operating time: 9 microseconds;
  1 microsecond if the square root is not performed.

WORD TRANSMISSION OPERATIONS

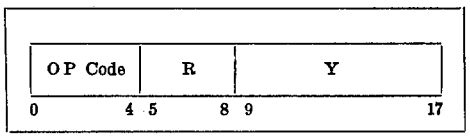

CLA - Clear and Add (OP CODE 20)
The contents of the memory location specified by Y and R replace the contents of the Accumulator.
Operating time: 2 microseconds.
STR - Store Accumulator (OP CODE 26)
The contents of the Accumulator are stored in the memory location specified by Y and R. The contents of the Accumulator remain unchanged.
Operating time: 2 microseconds.
LDQ - Load Q Register (OP CODE 21)
The contents of the memory location specified by Y and R replace the contents of the Q Register.
Operating time: 2 microseconds.
STQ - Store Q Register (OP CODE 27)
The contents of the Q Register are stored in the memory location specified by Y and R. The contents of the Q Register remain unchanged.
Operating time: 2 microseconds.

INDEX REGISTER OPERATIONS

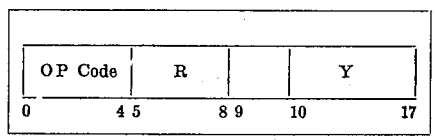

INX - Increment Index (OP CODE 10) (Bit 9 = 1)
The Y field is added to the contents of the index Register specified by $R$. If $R = 0$ or 13, no operation will result. If $R = 14$ or 15, the computer will add the 17 bit $Y^1$ field of the memory location specified by y to Index Register 1 if $R^1$ is a 1. Otherwise no operation will result.

Operating time:
  1 microsecond if R = 0 or 13;
  3 microseconds if R = 1 through 12;
  2 microseconds if $R = 14$ and $R^1 = 0$;
  4 microseconds if $R = 14$ and $R^1 = 1$;
  2.25 microseconds if $R = 15$ and $R^1 = 0$;
  4.25 microseconds if $R = 15$ and $R^1 = 1$.
DCX - Decrement Index (OP CODE 10) (Bit 9 = 0)
The Y field is subtracted from the contents of the index register specified by R. If $R = 0$ or 13, no operation will result. If $R = 14$ or 15, the computer will subtract the 17 bits of the $U^1$ field of the memory location specified by Y from index register 1 if $R^1$ is a one. Otherwise no operation will result.
Operating time:
  1 microsecond if R = 0 or 13;
  3 microseconds if R = 1 through 12;
  2 microseconds if $R = 14$ and $R^1 = 0$;
  4 microseconds if $R = 14$ and $R^1 = 1$;
  2.25 microseconds if $R = 15$ and $R^1 = 0$;
  4.25 microseconds if $R = 15$ and $R^1 = 1$.
TRX - Transfer on Index (OP CODE 13)
If the contents of the Index Register specified by R is zero, the computer takes the next sequential instruction. IF the contents of the Index Register specified by R is not equal to zero, the contents are decremented by one and the computer takes its next instruction from the memory location specified by Y which is always relative. If $R = 14$ or 15, the computer will use the 17-bit indirect address and Index Register 1 if $R^1$ is a 1. If $R = 0$ or 13, no operation will result and the computer takes the next sequential instruction.
Operating time:
  3 microseconds for transfer;
  2 microseconds for no transfer;
  1 microsecond for $R = 0$ or 13;
  2 microseconds for $R = 14$ or 15 and $R^1 = 0$;
  4 microseconds (transfer) or 3 microseconds (no transfer) for $R = 14$ or 15 and $R^1 = 1$.
SXH - Skip on Index High (OP CODE 11)
The contents of the Index Register specified by R are compared to the number in the Y field. If the contents of the Index Register are greater than the value of Y, one instruction is skipped; otherwise, the computer will take the next sequential instruction. If $R = 14$ or 15, the computer will use the 17-bit indirect address and Index Register 1 if $R^1$ is a one. If $R = 0$ or 13, no operation will result and the computer takes the next sequential instruction.
Operation time: 2 microseconds;
  1 microsecond for $R = 0$ or 13;
  2 microseconds for $R = 14$ or 15 and $R^1 = 0$;
  3 microseconds for $R = 14$ or 15 and $R^1 = 1$.

LOGICAL OPERATIONS

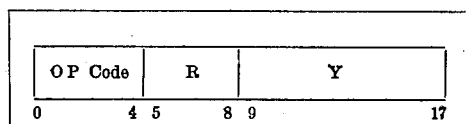

LGA - Logical Add (OP CODE 32)
Bits of the Accumulator corresponding to 1's in the contents of the memory location specified by Y and R are set to 1. All other bits remain unchanged. This is the "Inclusive OR" function.
Operating time: 2 microseconds.

LGM - Logical Multiply (OP CODE 33)

When corresponding bits of the Accumulator and the contents of the memory location specified by Y and R are both 1's those bits in the Accumulator will remain 1. All other bits in the Accumulator will be set to zero. This is the AND function.
Operating time: 2 microseconds.

LGC - Logical Complement (OP CODE 34)

Bits in the Accumulator corresponding to 1's in the contents of the memory location specified by Y and R are inverted. All other bits remain unchanged. This is the Exclusive OR function.
Operating time: 2 microseconds.

CGC - Convert Gray Code (OP CODE 35)

The contents of the memory location specified by y and R are converted from Gray Code to sign and magnitude and the result is placed in the Accumulator.
Operating time: 6 microseconds.

SHIFT OPERATIONS

| 36 | R | | K |
|---|---|---|---|
| 0 | 4 5 | 8 9  11 12 | 17 |

LSA - Left Shift Accumulator (Bits 9-11 = 1)

The contents of the Accumulator are shifted left the number of bits specified by $K$, Modulo $2^6$. The sign bit is unchanged. Zeros are shifted into the least significant bit; bits shifted out of the most significant bit are lost and will cause an overflow if equal to 1. An overflow will turn on the Overflow Indicator.
Operating time: $1.5 + 0.25$ ($n$-4) microseconds where $n$ is the number in $K$.*
*Time is 1.5 microseconds for $n \leq 4$; use formula for $n > 4$.

LSB - Left Shift Both (Accumulator and Q Register) (Bits 9-11 = 3)

The double-length word in the combined Accumulator and Q Register is shifted left the number of bits specified by K, Modulo $2^6$. The sign bit of the Q Register is unchanged and is always copied into the sign bit of the Accumulator. Zeros are shifted into the least-significant bit of the Q Register. Bits shifted out of the most-significant bit (sign not included) of the Accumulator are lost and will cause an overflow if equal to 1. An overflow will turn on the Overflow Indicator.
Operating time: $1.5 + 0.25$ ($n$-4) microseconds.*
*Time is 1.5 microseconds for $n \leq 4$; use formula for $n > 4$.

RSA - Right Shift Accumulator (Bits 9-11 = 0)

The contents of the Accumulator are shifted right the number of bits specified by K, Modulo $2^6$. The sign bit is unchanged. Zeros are shifted into the most-significant bit and bits shifted out of the least-significant bit are lost. Overflow cannot occur.
Operating time: $1.5 + 0.25$ ($n$-4) microseconds.*
*Time is 1.5 microseconds for $n \leq 4$; use formula for $n > 4$.

RSB - Right Shift Both (Accumulator and Q Register) (Bits 9-11=4) The double-length word in the combined Accumulator and Q Register is shifted right the number of bits specified by K, Modulo $2^6$. The sign bit of the Accumulator is unchanged and is copied always into the sign bit of the Q Register. Zeros are shifted into the most-significant bit of the Accumulator. Bits shifted out of the least-significant bit of the Accumulator are shifted into the most-significant bit (sign not included) of the Q Register. Bits shifted out of the least-significant bit of the Q Resister are lost. Overflow cannot occur.
Operating time: $1.5 + 0.25$ ($n$-4) microseconds.*
*Time is 1.5 microseconds for $n \leq 4$; use formula for $n > 4$.

RRA - Right Roate Accumulator (Bits 9-11 = 5)

The entire contents of the Accumulator are shifted circularly to the right the number of bits specified by K, Modulo $2^6$. The sign bit is included in the shift. Bits shifted out of the least-significant bit are shifted into the sign bit. Overflow cannot occur.
Operating time: $1.5 + 0.25$ (n-4) microseconds.*
Time is 1.5 microseconds for $n \leq 4$; use formula for $n > 4$.

| 36 | R | | K |
|---|---|---|---|
| 0 | 4 5 | 8 9  11 12 | 17 |

RRQ - Right Rotate Q Register (Bits 9-11 = 6)

This instruction is similar to Right Rotate Accumulator, except that the Q Register is shifted.
Operating time; $1.5 + 0.25$ ($n$-4) microseconds.*
*Time is 1.5 microseconds for $n \leq 4$; use formula for $n > 4$.

LRB - Left Rotate Both (Accumulator and Q Register) (Bits 9-11=2)

The double-length logical word in the combined Accumulator and Q Register is shifted circularly to the left the number of bits specified by K, Module $2^6$. The sign bits are included in the shift. Bits shifted out of the sign bit of the Accumulator are shifted into the least significant bit of the Q Register. Bits shifted out of the sign bit of the Q Register are shifted into the least significant bit of the Accumulator. Overflow cannot occur.
Operating time: $1.5 + 0.25$ ($n$−4) microseconds*
*Time is 1.5 microseconds for $\leq 4$; use formula for $n > 4$.

RRB - Right Rotate Both (Accumulator and Q Register) Parity Generation (Bits 9-11 = 7)

The double-length logical word in the combined Accumulator and Q Register is shifted circularly to the right the number of bits specified by K, Modulo $2^6$. The sign bits are included in the shift. Bits shifted out of the least-significant bit of the Q Register are shifted into the sign bit of the Accumulator. Bits shifted out of the least-significant bit of the Accumulator are shifted into the sign bit of the Q Register. Overflow cannot occur. During the execution of this instruction the ring sum of the bits shifted out of Q17 into the sign bit of the Accumulator is set into Sense Indicator 2. The effect of this is to generate the partiy of the field of bits shifted. If odd, Sense Indicator 2 is inverted, and if even, Sense Indicator 2 is not inverted. Sense Indicator 2 should be reset by the program since the sense indicator is not automatically reset before execution of the instruction.
Operating time: $1.5 + 0.25$ ($n$−4) microseconds.*
*Time is 1.5 microseconds for $n \leq 4$; use formula for $n > 4$.

NOTE:

Indirect addressing is not allowed for any of the above shift operations. Indexing adds 0.75 microseconds to the specified shift operating times.

OPERATIONS ON ACCUMULATOR AND Q REGISTER

| 37 | /////  | | ///// |
|---|---|---|---|
| 0 | 4 5 | 8 9  11 12 | 17 |

SAP - Set Accumulator Positive (Bits 9–11 = 0)

The sign bit of the Accumulator is set to zero (positive).

Operating time: 1 microsecond.

CSA - Change Sign of Accumulator (Bits 9–11 = 4)

The sign bit of the Accumulator is inverted.

Operating time: 1 microsecond.

XCA - Exchange Accumulator and Q Register (Bits 9–11 = 3)

The contents of the Accumulator and Q Register, including the sign bits, are exchanged.

Operating time: 1 microsecond.

CPA - Two's Complement Accumulator (Bits 9–11 = 5)

If the sign of the Accumulator is negative, the contents of the Accumulator, excluding sign, are replaced with the two's complement of that number. The sign remains unchanged. If the sign of the Accumulator is positive, the Accumulator remains unchanged and the computer takes the next instruction in sequence.

Operating time: 1 microsecond.

OPERATIONS ON INDICATORS AND SWITCHES

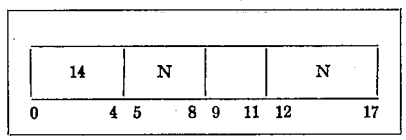

SEI - Set Indicators (Bits 9–11 = 2)

The indicators specified by a 1-bit in the corresponding position in the N fields are set (1). All other indicators remain unchanged. Each of the 10 bits in the N field corresponds to one of the 10 indicators.

Operating time: 1.5 microseconds.

REI - Reset Indicators (Bits 9–11 = 3)

This instruction is similar to Set Indicators, except that the indicators specified by a 1-bit in the corresponding position of the N fields are reset (0).

Operating time: 1.5 microseconds.

SKI - Skip On Indicators (Bits 9–11 = 1)

If all indicators specified by 1 bits in the N fields are on (1), one instruction is skipped. If any of the specified indicators are off (0), the next instruction in sequence is taken. Each of the 10 bits in the N fields corresponds to one of the 10 indicators.

Operating time: 1.5 microseconds.

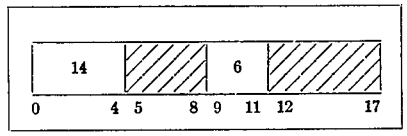

PIA - Place Indicators in Accumulator (Bits 9–11 = 6)

The contents of the Sense Indicators plus the two High-Low Indicators and the
Overflow Indicator are placed in the Accumulator as shown below. The remaining bits of the Accumulator are cleared.

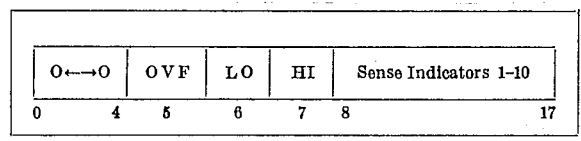

(Note: Both High and Low Indicators on denotes equal.)

Operating time: 1.5 microseconds.

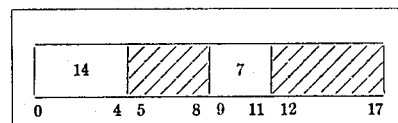

PAI - Place Accumulator in Indicators (Bits 9–11 = 7)

The 13 least significant bits of the Accumulator are used to set or reset the sense indicators plus the two High-Low Indicators and the Overflow Indicator. Indicators 1, 3 and 7 are not changed by the instruction. The position of bits in the Accumulator is shown under the PIA (Place Indicators in Accumulator) instruction.

Operating time: 1.5 microseconds.

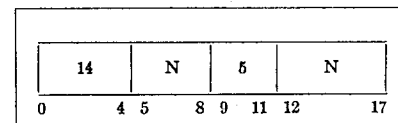

SKW - Skip on Switches (Bits 9–11 = 5)

If all the switches specified by 1 bits in the N fields are on, one instruction is skipped. If any of the specified switches are off, the next instruction in sequence is taken. Each of the 10 bits in the N fields corresponds to one of the 10 switches.

Operating time: 1.5 microseconds.

BUFFERED INPUT/OUTPUT /OUTPUT

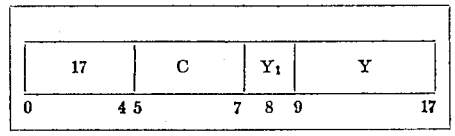

EXF - External Function

If $Y_1 = 0$, the contents of the memory word specified by the absolute value of Y, are sent via the Input/Output Module to the device on the appropriate channel. If $Y_1 = 1$, the contents of the memory word specified by the program counter plus the value of Y are sent. C shall be coded 0 through 7, corresponding to one of the eight channels. Code 0 corresponds to the highest priority channel.

Operating time: 2 microseconds.

CONSOLE INPUT/OUTPUT INSTRUCTIONS

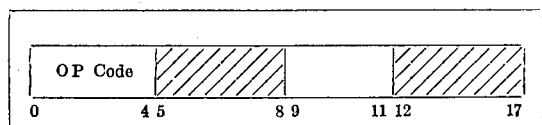

TWA - Input Typewriter Activates (OP CODE 15) (Bits 9–11 = 6)

The Input Typewriter Interlock and the Typewriter Activate Light are turned on; the Console Not Busy Indicator is turned off. This will activate the typewriter to allow inputs from the typewriter keys. No operation will occur if the Console Not Busy Indicator is off previous to this instruction, and the computer will continue with the next instruction in sequence.

Operating time: 1 microsecond.

TWF - Input Typewriter Off (OP CODE 15) (Bits 9–11 = 7)

and symbols that appear in the variable field of operation codes, are identified and placed in the symbol table. A location symbol is identified by assigning it the value of the memory location that it represents or the value to which it is equated. Operation codes, excluding all pseudo operations except variable field data (VFD), are checked for symbols and proper format in the variable field for the purpose of compiling error messages. When a macro (MAC) operation is processed, the macro name is placed in the macro name table and defined by the relative location of that macro's skelton, parameter, and line count when this data becomes available. Symbols that appear in the variable field of a macro operation are parameters. As each line following a macro operation is entered into the macro skeleton table, each symbol is checked to see if it is present in the parameter table. If found there, it is assigned that parameter number. If the symbol is not in the parameter table, it is entered, unchanged, into the skeleton table. When an error is detected, the statement in which the error occurred, and the error flag, are printed after the statement is processed. At the end of Pass I, all undefined symbols are assigned locations beginning with the next memory location above the highest location used by the programmer. These symbols and the addresses they were assigned are printed out.

Second Pass Through the Source Program (Pass II)

The final program assembly occurs during Pass II processing. The assembler reads each statement, (one at a time) interpreting the mnemonic operation coces and symbolic operands and expressions, and converting them into machine language. Data-generating pseudo operations are performed and the data generated is printed out. A literal table is constructed during Pass II which each literal assigned a memory location within the memory block specified by the programmer. As each statement is interpreted and assembled, the program listing, data generated, and comments are printed out and recorded on punched and magnetic tape. At the end of Pass II, a list of all symbols and literals used is printed out and recorded on punched or magnetic tape.

Literal Table

A literal consists of a unique machine language (binary) number used in a program. The literal table is assigned to a block of memory locations specified by the programmer. The literal table is made accessible for index register addressing from any point in memory. This is accomplished by assigning the address of the beginning of the literal table to one of the index registers. This particular index register has the same assignment in all banks and is specified by use of the LTL pseudo operations. The LTL pseudo operation must be performed prior to the first use of a literal in a program. A literal is a unique binary number that is derived when the assembler decodes an operand. The operand may be octal, decimal, a constant, a 6-bit alphanumeric code, or an ASCII code. When the assembler encounters a literal, it obtains the equivalent binary number and surveys the literal table for another occurrence of the same number. If a duplicate exists, the location of the duplicate in the literal table is also assigned to this literal. If this is the first occurrence of this specific literal, it is assigned the next available location in the literal table. No duplications are allowed in the literal table. A literal is accessed during program processing by certain general instruction words. The R-subfield in the variable field of the instruction word specifies the index register that contains the literal table address. The Y-subfield in the variable field of the instruction word specifies which literal in the table to use. The number of bits available to the Y-field limits the total number of literals to 512 ($1000_8$).

Memory Location Assignment

The assembler program provides three software counters: (1) main counter, (2) scratch counter, and (3) relocation counter. Memory locations are assigned by the assembler interpreting the location field and assigning values obtained from one of the three counters to the contents of the location field. If column 1 is blank, the location field is assumed to be blank, and that line is assigned to the next higher available memory location in either scratch pad or main memory, depending upon the portion of memory in which the preceding line(s) were placed. If column 1 contains a number the label is interpreted as a constant that designates the memory location to which the instruction or data will be assigned. The constant starts with column 1 and continues to the first blank column (up to six characters). If the constant is greater than $777_8$, the main counter is set to the value of the constant and following instructions, or data, are assigned sequentially higher main memory locations. If the constant equals $777_8$, or less, the scratch counter is set equal to that value, and following instructions, or data, are assigned sequentially higher scratch pad locations. If column 1 contains an alphabetic character, the location field is interpreted as a symbol, or label, and is placed in the memory location specified for that symbol in the symbol table generated during Pass I.

THE HAP-18M LANGUAGE AND PSEUDO OPERATIONS

The HAP-18M symbolic assembly language permits the use of alpha-numeric symbols to represent memory locations and operation code mnemonics to represent the equivalent numeric operation codes. Further programming flexibility is afforded by the use of pseudo operations.

HAP-18M Symbolic Assembly Language

Characteristics of the HAP-18M language are described in the following paragraphs.

Symbols

HAP-18M symbols consist of six or less alphanumeric characters with the first character being alphabetic. An asterisk (*) may be substituted for a symbol in an arithmetic expression in an instruction variable field. If the asterisk appears as a substitute for a term, that term is assigned the current value of the location counter during assembly. A line that begins with an asterisk is defined as being entirely in the comments field. Symbols may be used to define memory locations.

Constants

All HAP-18M constants are considered decimal integers except for those used in operands of switch instructions, in Boolean expressions, and in certain data generated during pseudo operations. Constants that are not decimal integers are considered octal integers. If an octal integer is used where it could be interpreted as decimal, the octal integer must be followed by the let- The Input Typewriter Interlock and the Typewriter Activate Light are turned off; the Console Not Busy Indicator is turned on. This instruction will inhibit any attempt to input from the typewriter keys.
Operating time: 1 microsecond.
OTW - Output to Typewriter (OP CODE 16) (Bits 9–11 = 3)

The BCD character in the least significant 6 bits of the Q Register is output to the typewriter through the console Buffer Register. The computer continues with the next instruction in sequence immediately after the character in the Q Register is placed in the Console Buffer Register. The Console Not Busy Indicator is turned off and Output Typewriter Interlock is turned on, and remain so until the character has been typed. No operation will occur if the Console Not Busy Indicator is off previous to this instruction, and the computer will continue with the next instruction in sequence
Operating time: 1 microsecond.
IPC - Input from Console (OP CODE 16) (Bits 9–11 = 0)

If the Tape Level Switch on the Processor Control Panel is set to 6, the least significant 6 bits of the Console Buffer Register are placed in the least significant 6 bits of the Q Register. Bit positions O through 11 of the Q Register are not altered. If the Tape Level Switch is set to 7, the least significant 7 bits of the Console Buffer Register are placed in the least significant 7 bits of the Q Register. Bit positions 0 through 10 of the Q Register are not altered. The contents of the Q Register are normally saved and restored by console input interrupt subroutines.
Operating time: 1 microsescond.
CTA - Console Tape Advance (OP CODE 15) (Bits 9–11 = 1)

The clutch of the Paper Tape Reader is energized which initiates forward motion of the Tape Reader is initiated. The tape will advance at the rate of 500 characters per second. The Tape Reader Interlock is turned on and the Console Not Busy Indicator is turned off. No operation will occur if the Console Not Busy Indicator is off previous to this instruction, and the computer will continue with the next instruction in sequence.
Operating time: 1 microsecond.
CTS - Console Tape Stop (OP CODE 15) (Bits 9–11 = 2)

The clutch of the Paper Tape Reader is de-energized and the forward motion of the tape is stopped. The Tape Reader Interlock is turned off and the Console Not Busy Indicator is turned on. To insure that the tape stops in position to read the next input frame, this instruction must be executed within 100 microseconds after the last tape input interrupt.
Operating time: 1 microsecond.
CTR - Console Tape Rewind (OP CODE 15) (Bits 9–11 = 3)

The tape is rewound onto the supply reel until a start-of-reel frame (a punch in the 7th channel with even partiy) is encountered. The tape will stop before the frame preceding the start-of-reel frame. There will be a program interrupt upon completion of the rewind. No operation will occur if the console Not Busy Indicator is off previous to this instruction, and the computer will continue with the next instruction in sequence.
Operating time: 1 microsecond.
PMO - Punch Motor On (OP CODE 15) (Bits 9–11 = 4)

The Tape Punch Motor will be turned on. At least 1 second must elapse before executing an output to the Tape Punch.
Operating time: 1 microsecond.
PMF - Punch Motor Off (OP CODE 15) (Bits 9–11 = 5)

The Tape Punch Motor will be turned off.
Operating time: 1 microsecond.
OPA - Output 6 Bits to Tape Punch (OP CODE 16) (Bits 9–11 = 1)

The least significant 6 bits of the Q Register are output to the Tape Punch through the Console Buffer Register. The computer continues with the next instruction in sequence immediately after the 6 bits in the Q Register are placed in the Console Buffer Register. The Console Not Busy Indicator is turned off and the Tape Output Interlock is turned on and remain so until the frame has been punched. No operation will occur if the Console Not busy Indicator is off previous to this instruction, and the computer will continue with the next instruction in sequence.
Operating time: 1 microsecond.
OPB - Output 7 Bits to Tape Punch (OP CODE 16) (Bits 9–11 = 2)

This instruction is similar to OPA (Output 6 Bits to Tape Punch) except that the least significant 7 bits in the Q Register are output to the Tape Punch through the Console Buffer Register.
Operating time: 1 microsecond.

APPENDIX C

METHOD OF PROCESSING THE HM-4118 ASSEMBLY PROGRAM

The HM-4118 Assembly Program (HAP-18M) is a subsystem of the HM-4118 software system that affords a means of assembling HM-4118 assembly language programs on the computer. It is intended primarily as an aid to the programmer coding in HM-4118 language.

The HAP-18M is the HM-4118 computer program which converts HM-4118 assembly language punched on standard tab cards into HM-4118 machine code. The assembler program recognizes and converts mnemonic codes, symbol labels, and operands into machine language instructions or data words. The assembler also recognizes and operates under the control of a set of pseudo operations. The pseudo operations allow the programmer to control memory allocation, define symbols, enter data words, control listings, define macro operations and provide overall control of the program assembly process. The program produces error listings, side-by-side listings of the symbolic and the machine language code, symbol tables, and relocatable binary tapes for the HM-4118.

The assembler program is loaded in low core memory to assemble another program by executing two passes through the source program. The assembler performs all functions necessary to organize the program by operating on the input data, one line at a time. The new program is assembled and outputted on punched or magnetic tape. The new program is not placed in memory during assembly, thus, it may be assigned memory locations that are also used by the assembler program.
First Pass Through the Source Program (Pass I)

During the first pass, the assembler constructs symbol and macro tables, checks format, and compiles errors. Symbols that appear as labels in the location field, ter *B* (Boolean) to indicate that it is an octal integer.

Memory Nomenclature

Nearly all of the memory locations from $0_8$ through $212_8$ have been assigned to specific functions such as interrupt entrance register, index registers, etc. These locations are referred to as assigned memory.

The assembler program uses memory address 0 through $777_8$ (first 512 decimal locations) for scratch pad memory. When developing an operational program, the locations $213_8$ through $777_8$ should be utilized for storage of data that is used frequently because these locations can be addressed directly from any location in memory and thus accessed in a minimum time.

The memory locations with addresses greater than $777_8$ are referred to as main memory.

Expressions

An arithmetic or Boolean expression is any meaningful, parenthesis-free combination of symbols, constants, and operators appearing in the variable field of an instruction. The facing table shows the allowable operators and their definitions. The value of an expression is obtained by performing each multiplication (*) and division (/) operation as it occurs from left to right. The expression is evaluated a second time, performing the addition (+) and subtraction (−) operations.

When evaluating a / operation in an arithmetic expression, only the quotient is used. In a Boolean expression, $A/B$ is evaluated as $A*(/B)$.

The above expressions will be evaluated as integers using 17 bits and two's complement arithmetic.

Pseudo operations

A list of pseudo operations available to the programmer for additional flexibility is listed on the facing page. A functional list of the pseudo operations is given in Appendix E.

| | OPERATORS AND DEFINITIONS | |
|---|---|---|
| Symbol | Arithmetic Definition | Boolean Definition |
| + | Addition | Inclusive OR |
| χ | Subtract | Exclusive OR |
| * | Multiplication | AND |
| / | Division | Complement |

| PROGRAMMER OPERATIONS PROVIDED BY PSEUDO OPERATIONS |
|---|
| Controlling memory allocation |
| Defining or relating symbols |
| Forming data |
| Defining macro operations |
| Specifying output and control listings |
| Controlling assembly processes. |

PROGRAMMING AND PROCESSING THE COMPUTER INSTRUCTIONS

A statement or line on the program coding sheet that defines a computer instruction is processed by the assembler program to generate a program instruction word in machine language and assign it a memory location.

The computer instructions are programmed and processed by the assembler according to operation and variable field formats defined in the following paragraphs.

General Instructions

General instructions must have entries in the operation field and the variable field. Each of the subfields in the variable field may contain a symbol, constant, or arithmetic expression. This group of instructions uses no operation code augmentors and may use absolute or relative addressing. All instructions that may utilize literals are included in this group.

The characters in the variable field are arranged with the Y-subfield first, separated by a comma from the R-subfield. If an asterisk appears in column 12 of the operation field, the assembler program assigns the correct R value for indirect addressing. If one of the index registers is to be directly specified, the R-subfield must be equal to a value of 1 through 12 ($14_8$). Any expression or symbol may be used in the R-subfield, provided the value represented is less than 13. A value greater than 12 results in an error flag. Indirect addressing cannot be specified by writing 14 ($16_8$) or 15 ($17_8$) in the R-subfield. Indirect addressing can only be specified by an asterisk in column 12. When developing a TRX or SXH instruction, the R-subfield must not be equal to zero; if the R-subfield is equal to zero for these instructions, the assembler program generates an error flag.

Shift Instructions

Shift instructions consist of an operation field, and a variable field with a K-subfield and an R-subfield. The variable field may contain a symbol, constant, or arithmetic expression. The characters in the first subfield of the variable field provide the K-subfield, which specifies the shift count. The second subfield begins in the column immediately following the first comma in the variable field and is the R-subfield. The R-subfield specifies an index register. If the R-subfield is zero, (no characters in the subfield), the K-subfield shift count is not changed. If the R-subfield is 1 through 12 ($14_8$), the contents of the specified index register are added to the K-subfield when the instruction is executed, and the resultant sum is the shift count. The R-subfield may not be set equal to 13 ($15_8$), 14 ($16_8$), or 15 ($17_8$). Notice that the K-subfield may be defined by a label or symbol that decodes into as many as 17 bits. In any case, only the six least significant bits are used. This convention also applies when the contents of an index register are added to the K-subfield.

Indicator and Switch Instructions

These instruction words consist of an operation field and variable field. The instruction is decoded by the assembler from the mnemonic codes in the operation and variable field. The variable feld contains a symbol, constant, or Boolean expression that defines the required 10-bit N-field. For these instructions constants are assumed to be octal. Each of the 10 bits corresponds to one of the indicators or switches. If the variable field characters decode into more than 10 bits, only the 10 least significant bits are used.

Operations on A and Q Registers and Console I/O Instructions

Operations on the accumulator and Q register and the console I/O instructions require an entry only in the operation field. The machine instruction is decoded from the mnemonic code in the operation field. This group of computer instructions includes all of those that never have a variable field.

PROGRAM CODING FORM

PREPARED BY _____  DATE _____

PHONE _____  PROBLEM NO. _____  PAGE _____ OF _____

| LOCATION (LABEL) | OP CODE | | | VARIABLE AND COMMENTS FIELD | SEQ NO. |
|---|---|---|---|---|---|
| | R S A | 4 | | | |
| | R S A | 2 | 5 | | |
| | S E I | 5 2 5 | | | |
| | R E I | 5 2 5 | | | |
| | S A P | | | | |

NOTES

1. LINE 1: SHIFT THE A REGISTER RIGHT 4 PLACES
2. LINE 2: SHIFT THE A REGISTER RIGHT THE NUMBER OF PLACES INDICATED BY THE CONTENTS OF INDEX REGISTER 6, +2
3. LINE 3: SET THOSE INDICATORS WITH A ONE IN THE CORRESPONDING POSITION OF THE BOOLEAN EXPRESSION DEFINED BY $525_8$
4. LINE 4: RESET THOSE INDICATORS WITH A ONE IN THE CORRESPONDING POSITION OF THE BOOLEAN EXPRESSION DEFINED BY $525_8$
5. LINE 5: SET THE A REGISTER SIGN BIT POSITIVE

Examples of Computer Instructions

PROVIDING GREATER FLEXIBILITY IN THE ADDRESSING FUNCTION

The combination of the subfields in the variable field can define the type of addressing or instruct the assembler to assign a type of addressing for the operation.

Since the 18-bit general instruction word requires 5 bits to specify the operation code, only 13 bits are available to indicate operand addresses. This limitation would permit direct addressing in the instruction word itself of only 8,192 addresses. To avoid such a limitation, the computer provides index and indirect addressing options that permit accessing of any memory location from any instruction location. These options divide the addressing indicator bits into two fields. One field (the R-field) indicates the type of addressing to be performed and the other field (the Y-field) provides basic information for the addressing function. The R-field can indicate four basic methods of addressing, Absolute Addressing (Scratch Pad), Absolute Addressing (Indexed), Relative Addressing, and Indirect Addressing.

Absolute-Scratch Pad

This type of addressing is limited to accessing memory locations 0 through $777_8$. These locations provide easily accessible storage for frequently used data. An absolute address in scratch pad memory is designated on the coding form when the R-subfield in the variable field is zero. When this entry is made, the Y-subfield designates the absolute address for that operand.

Absolute Addressing-Indexed

For indexed addressing, the R-field is used in conjunction with sense indicators F5 and F6 to modify the base address indicated in the Y-field. There are 4 groups of 12 addresses in memory that are reserved for index registers. The word position within the group is specified by an R-field in the instruction word equal to 1 through 12 ($14_8$). Sense indicators F5 and F6 identify the group or bank of registers. By combining the R-field and the configuration of F5 and F6, the absolute memory location for the index register is defined for the addressing function. Then the contents of the specified index register are added algebraically to the contents of the Y-subfield to define the actual memory location of the operand.

Relative Addressing

The assembler program develops a relative address for the instruction when the operand word is located within +255 or −256 addresses of the location of the instruction being generated. If the operand is located out of this range (beyond +255 or −256 addresses), an address must be generated by using indirect addressing. If the operand address is within range, the assembler will develop a Y-field to add to or subtract from the contents of the program counter for the relative address of the operand. The programmer must know that the required operand lies within range. If the operand is not within range, an error flag is set.

A relative address can be entered directly on the coding form by placing an asterisk in column 13 followed by a + or − operator and a number. This convention instructs the assembler to develop an address relative to the address of the instruction being performed. In general, when a label is used in the variable field, the assembler will first determine if it can be reached by absolute addressing. If not, relative addressing is checked. If neither type of addressing can reach the indicated location, an error flag is generated.

Indirect Addressing

When the desired operand is beyond the range of absolute or relative addressing, the assembler must be instructed to indirectly address the operand. The assembler cannot generate indirect address words itself. This is achieved by entering an asterisk in column 12 on the coding form and entering a scratch pad address or symbolic address that contains the actual memory address or a further indexed address for the operand.

In the illustrated example of indirect addressing, the following conditions apply: If bit 0 in AAK2 (which must be previously set by the programmer) is a 1, the contents of index register 1 (which must be set previously by the programmer) is algebraically added to the contents of AAK2. This sum defines the actual operand address when bit 0 of the index register 1 is zero. However, a further indexing level is available to the programmer. By previously setting bit 0 of index register 1 and bit 0 of AAK2 to 1, the contents of the summed address are treated as containing another address that contains the actual address for the operand. An example is shown in the table.

EXAMPLE OF INDIRECT ADDRESSING WITH INDEXING OPTIONS
(Instruction is TRU* AAK2)

| Address | Contents | |
|---|---|---|
| AAK2 | $400337_8$ | bit 0 = 1 indexed address |
| add. INDEX 1 | $400007_8$ | bit 0 = 1 indirect address |
| | $346_8$ | |
| $346_8$ | $401000_8$ | bit 0 = 1 indexed address |
| add. INDEX 1 | $400007_8$ | bit 0 = 1 indirect address |
| | $1007_8$ | |
| $1007_8$ | $024212_8$ | bit 0 = 0 effective address |

PROGRAM CODING FORM

PREPARED BY _____ PROBLEM NO. _____
PHONE _____
DATE _____
PAGE _____ OF _____

| LOCATION (LABEL) 1 2 3 4 5 6 7 8 | OP CODE 9 10 11 12 | 13 14 15 | 16 17 18 19 20 21 22 23 24 25 26 27 28 29 30 31 32 33 34 35 36 37 38 39 40 41 42 43 44 45 46 47 48 49 50 51 52 53 54 55 56 57 58 59 60 61 62 63 64 65 66 67 68 69 70 71 72 VARIABLE AND COMMENTS FIELD | SSO NO. 80 |
|---|---|---|---|---|
| 1 | C L A D | 1 0 0 | 1 2 | |
| 2 | A D D | 1 1 0 | | |
| 3 | I N X | | 7  4 | |
| 4 | M L Y | A A O | 5 | |
| 5 | T R U | – + 5 | | |
| 6 | C L A * | A A K | 2 | |
| 7 | | | | |

1 2 3 4 5 6 7 8   9 10 11 12   13 14 15   16 17 18 19 20 21 22 23 24 25 26 27 28 29 30 31 32 33 34 35 36 37 38 39 40 41 42 43 44 45 46 47 48 49 50 51 52 53 54 55 56 57 58 59 60 61 62 63 64 65 66 67 68 69 70 71 72   80

NOTES:
1. LINE 1: ABSOLUTE ADDRESSING. CLEAR THE A REGISTER AND ADD THE CONTENTS OF ADDRESS 100.
2. LINE 2: INDEXED ADDRESSING. TAKE THE CONTENTS OF INDEX REGISTER 12 AND ADD 10. THE SUM IS THE ADDRESS OF THE NUMBER THAT WILL BE ADDED TO THE A REGISTER CONTENTS.
3. LINE 3: INDEXED ADDRESSING. INCREMENT INDEX REGISTER 4 BY 7.
4. LINE 4: RELATIVE ADDRESSING. CONDITIONS: 1. INSTRUCTION IS LOCATED IN 10000.
   2. AAO5 IS LOCATED IN 10255.
   RESULTS: IN THE FINAL COMPUTER WORD, THE Y FIELD WILL CONTAIN *255 (377₈) AND THE R FIELD WILL CONTAIN 13 (15₈).
5. LINE 5: RELATIVE ADDRESSING. CONDITIONS: 1. PRESENT INSTRUCTIONS ADDRESS IS 10003.
   2. TRANSFER IS REQUIRED TO ADDRESS 10010.
   THE OPERATOR MUST KNOW THAT THE NEXT REQUIRED ADDRESS IS LOCATED IN ADDRESS 10010.
   RESULTS: IN THE FINAL COMPUTER WORD, THE Y FIELD WILL CONTAIN 5 AND THE R FIELD WILL CONTAIN 13 (15₈).
6. LINE 6: INDIRECT ADDRESSING. CLEAR AND ADD THE CONTENTS OF THE MEMORY LOCATION SPECIFIED BY THE CONTENTS OF THE ADDRESS DESIGNATED BY SYMBOL AAK2.

Examples of Addressing. Four basic methods of addressing are indicated by the R-field.

SUMMARY OF PROGRAM CONTROL REQUIREMENTS

The program control requirements are fulfilled by the operator furnishing information in answer to typed data messages each time a program coded in symbolic languge is to be assembled.

The HM-4118 Assembly Program (assembler) is one of a group of component programs (utility programs) comprising the Utility Library Tape. Therefore, when a program coded in symbolic language is to be assembled, the operator must select the assembler from among these utility programs. Selection involves the operator providing information in answer to data requests which are controlled by the monitor program, another of the utility programs.

The monitor program performs as an executive program for the utility programs and controls overall operation during compilation or modification of programs. The monitor program provides interface with the operator through the console channel keyboard. Operator input requests are analyzed by the monitor program and action is initiated for processing. If the program required to process the request is not in memory, the monitor program loads it from the Utility Library Tape and then transfers control to the proper portion of the newly loaded program for execution of the requested action. Upon completion of processing, control is returned to the monitor program in readiness for subsequent requests.

The monitor program notifies the operator that it is ready for input by typing the message ENTER REQUEST. The operator then enters a request code which, if he is requesting the assembler, will be ASSEM, followed by a space.

Transfer of control to the assembler is indicated to the operator by the message "HM-4118 ASSEMBLY PROGRAM" being typed. (See facing table.) At this point, there are still several parameters which must be furnished by the operator prior to execution of the assembly process. These parameters, which are entered one by one in response to typed messages, involve the program name, process mode, input mode, list mode, output mode, and COMID tape name. These messages are described as follows: Program Name
the program name (six or more alphanumeric characters) is placed in a two-word storage area for later usage. Process Mode
this entry specifies whether the assembly is to be a normal or a system macro assembly. Input Mode
the input mode indicates type of symbolic input (i.e. punched or magnetic tape, or punched cards). List Mode
the list mode indicates whether or not a listing is desired. Output Mode
the output mode specifies the type of output desired. COMID Tape Name
the COMID tape name is comprised of six or less alphanumeric characters and is used to identify the COMID tape being written or read. After the operator has entered a parameter at the keyboard, the termination of the parameter is indicated by entering a space. An erroneous entry can be cancelled by entering a slash (/). A zero or no parameter can be entered by a space. For a COMID assembly, a zero is entered in the output mode parameter. After entering all parameters, printout will be as shown in the following table, together with sample operator entries.

| SAMPLE ASSEMBLY ENTRY PARAMETER PRINTOUT | |
|---|---|
| Printout | Operator Entry |
| HM-4118 ASSEMBLY PROGRAM | .... |
| ENTER PROGRAM NAME | SKA010 |
| ENTER PROCESS MODE, 0 FOR SYSTEM MACRO, 1 FOR NORMAL ASSEMBLY | 1 |
| ENTER INPUT MODE, 1 FOR MT, 2 FOR PT, 3 FOR CR INPUT | 1 |
| ENTER LIST MODE, 0 FOR NO LIST, 1 FOR LIST | 1 |
| ENTER OUTPUT MODE, 0 FOR NONE, 1 FOR MT, 2 FOR PT | 1 |
| ENTER COMID NAME | OPS200 |
| ENTER COMID I/O MODE, 1 FOR MT, 2 FOR PT | 1 |

DESCRIPTION OF INPUT FORMATS

A symbolic instruction, or line, consists of four major divisions: location field, operation field, variable field, and comments field.

The location field may contain a symbol by which other instructions can refer to this location. The operation field contains the mnemonic operation code. The variable field normally contains the operand of the instruction. The comments field exists for the convenience of the programmer and does not affect the assembly process.

Location Field the contents of the location field, also called the label field, may be a symbol, constant, or blank. The function of the location field is to specify the memory location of the instruction on this line. Memory locations 0 through $212_8$ have preassigned specific functions such as index registers, interrupt entrance register, etc. and are not available to the programmer for any other purpose. The assembler uses addresses 0 through $777_8$ for scratch pad memory. When developing an operational program, the locations $213_8$ through $777_8$ should be used for storage of data that is frequently used because these locations can be addressed directly from any location in memory and thus accessed in a minimum time.

Location Field Symbols

When a symbol appears in the location field, that symbol's (or label's) unique function is to define a specific memory location. Symbols are normally assigned a value derived from the main counter, and are addresses greater than $777_8$. If a symbol is to be assigned a memory location in scratch pad memory, it is assigned a value derived from the scratch counter and is denoted by adding a "comma S" (,S) at the end of the symbol. The instruction data generated by the remainder of the line on which the symbol appears is placed in the memory location specified by the symbol. Unless the symbol is defined otherwise by the use of an EQU or other pseudo operation, the address assigned for the symbol is the next sequential address in main memory or in scratch pad memory.

Location Field Constants

A constant in the location field indicates the storage location for the instruction or data generated by that line. Constants are assumed to be decimal numbers unless the number has a suffix B, in which case it is read as octal. If the constant is less than 512 ($1000_8$), the scratch counter is set its' value, if it is greater than scratch pad memory location numbers, the main counter is set.

Blank Location Fields

If the location field is blank, the instruction, or data generated on that line, is assigned the next higher available location in either scratch pad or main memory, depending upon whether the preceding line was assigned to scratch pad or main memory.

Operation Field

The operation field will contain an operation code mnemonic, a pseudo operation code, or a macro operation code. If the operation code is followed by an asterisk (*), that instruction is to use an indirect address.

Variable Field

The variable field may be blank or contain one or more subfields which are separated by commas. The number of subfields within the variable field is dependent upon the operation code. The formats used by the various classes of instructions are given in Table 1. If the programmer specifies the R (index) field for an instruction, the assembler will interpret the Y-field as absolute or relative depending on the value of R. Table 2 shows the fields for the various values of R. If no R subfield is present, the assembler will generate a 0 or 13 for R, depending on the location of the Y subfield (in scratch pad or main memory). If an asterisk (*) is placed after the operation code and no R field is present, indirect addressing is assumed and the assembler will generate a 14 or 15, depending on the value of the Y subfield.

The value assigned to the Y subfield, for general instructions specifying absolute addressing, is formed by using the least significant nine bits of the final result of the arithmetic expression appearing in the Y-subfield. The value assigned to the Y-subfield, for general instructions specifying relative addressing, is formed by subtracting the current value of the specified location counter from the final value of the arithmetic expression appearing in the Y-subfield. If the result is greater than +255 or less than −256, an error flag is set. Otherwise, if the result is positive, the least significant eight bits are placed in the Y field of the instruction. If the result is negative, the least significant 8 bits of the 2's complement of the number are placed in the Y field of the instruction.

The value given to K for shift Instructions is the least significant 6 bits of the final result of the arithmetic expression appearing in the K subfield. The value given to C is the I/O channel number. The format of the variable field of the various pseudo-operations are described in the sections which discuss the pseudo-operations.

Comments Field

The programmer may write notes or any information desired into the comments field. The assembler does not process this field but retains the comments for later printout as a side-by-side listing after Pass II. Additionally, when the first column in the location field contains the operator *, the entire line is printed out as a comment and does not appear in the final assembled program. If the line is blank after the *, an asterisk will be printed in the first column and a space will result for that line in the final printout.

TABLE 1

FORMAT FOR VARIABLE FIELD INSTRUCTIONS

| Class of Instruction | Format |
|---|---|
| General Instructions | Y, R |
| Shift Instructions | K, R |
| Indicators and Switch Instructions | N (Octal) |
| Buffered I/O | Y, C |
| Operations on A and Q | Blank |
| Console I/O Instructions | Blank |

TABLE 2

RELATIONSHIP OF Y-FIELD AND INDEX FIELD (R)

| R | Y-Field |
|---|---|
| 0 | Absolute-Scratch Pad |
| 1–12 ($14_8$) | Asolute-Indexed |
| 13 ($15_8$) | Relative |
| 14 ($16_8$) | Indirect/Absolute |
| 15 ($17_8$) | Indirect/Relative |

Figure A. Punched Card/Coding Sheet Format. The Variable Field extends from column 13 through the first blank column. Comments filed may use full 72 columns if entire line is a comment (i.e. * in column 1)

PROGRAM CODING FORM

PREPARED BY _____  DATE _____

PHONE _____  PROBLEM NO _____  PAGE _____ OF _____

| LOCATION (LABEL) 1-5 | OF CODE 10 | VARIABLE AND COMMENTS FIELD 15-70 | SEQ NO. 72-80 |
|---|---|---|---|
| 1 A A K 2 4 0 | | | |
| 2 A A K 2 4 0 . S | | | |
| 3 7 7 7 | | | |
| 4 7 7 7 B | | | |
| 5 | T R U | | |
| 6 | T R | | |
| 7 . D E N O T E D | | | |
| 8 | | | |
| 9 | | | |

KEY:
- LINE 1: ASSIGN THE VALUE OF THIS LINE TO MAIN MEMORY ($1000_8$)
- LINE 2: ASSIGN THE VALUE OF THIS LINE TO SCRATCH PAD MEMORY (0 TO $1000_8$)
- LINE 3: ASSIGN THIS LINE TO MEMORY LOCATION $777_{10}$
- LINE 4: ASSIGN THIS LINE TO MEMORY LOCATION $777_8$
- LINE 5: TRANSFER UNCONDITIONALLY TO THE ADDRESS SPECIFIED IN THE VARIABLE FIELD
- LINE 6: TRANSFER UNCONDITIONALLY TO AN INDIRECT ADDRESS SPECIFIED BY THE WORD LOCATED IN THE ADDRESS SPECIFIED BY THE VARIABLE FIELD
- LINE 7: PRINT AN ASTERISK AND PRINT THIS LINE AS A COMMENT DURING FINAL PRINTOUT
- LINE 8: PRINT AN ASTERISK AND LEAVE REST OF LINE BLANK ON FINAL PRINTOUT

Figure B. Examples of Input Formats. The first four examples (lines 1–4) are location field formats, the next two (lines 5–6), operation fields, and the last two (lines 7–8), comments fields.

FORMATTING SUBFIELDS WITHIN VARIABLE FIELDS

When subfields are permitted within variable fields, the subfields must be formatted according to certain rules.

The variable field is left justified and is assigned columns 13 through the first blank column on the program coding form. The number of subfields permitted within the variable field is dependent upon the operation code. Examples of subfields within the variable field are shown on the facing page. When expressions (subfields) are permitted within the variable field, they must be formatted by the programmer according to set rules. If the assembler detects a variable field which violates one or more of these rules, then the statement line containing the error(s) is printed out. The following rules are applicable when formatting expressions within the variable field.

1. Each subfield may contain from 1 to 25 elements, consisting of symbols and/or constants separated by arithmetic or Boolean operators. Each subfield is terminated by a comma and the variable field is terminated by a blank. Each item, including operators, is an element. In the first illustrated example, the variable field has only one subfield, which is ended by the blank in column 19. In the second example, the variable field has two subfields separated by a comma. The variable field is ended by the blank in column 22.
2. For instructions or pseudo operations, SEI, REI, SKI, SKW, and BOL, the variable field is interpreted as a Boolean expression and constants are assumed to be octal. The third illustrated example illustrates a variable field for an SEI instruction.
3. Each symbol must be defined. For symbols used in the BOL, EQU, SSC, SMC, SRC, TBL, ITM, and BSS pseudo operations, the symbol must be defined prior to use.
4. Expressions may not contain parentheses, but will use the +, −, *, and / operators. The expression is evaluated from left to right in two passes. The first pass evaluates the * and / operators, and the second pass evaluates the + and − operators.
5. If the + operator is not preceded by a symbol or constant, it is ignored.
6. If the − operator is not preceded by a symbol or constant in Boolean expressions, an error flag is set.
7. In arithmetic expressions, if the / operator is not preceded by a symbol or constant, an error flag is set. In arithmetic division, only the quotient is retained.
8. In arithmetic operations when the Y-subfield is in 2's complement form, only the low order 8 bits (to −256) are retained.
9. In Boolean operations, only the low order 17 bits are retained.
10. The operand of certain instructions may be a literal. (Literal initialization is described in a previous paragraph.) Literals may be used in the operand field of ADD, CLA, CMA, CML, DIV, LDQ, LGA, LGC, LGM, MLY and SUB. There are five types of literals:
    a. Octal (O)
    b. Decimal (D)
    c. Value (V)
    d. 6-bit alphanumeric characters (H)
    e. ASCII code (A)

Column 13 of the variable field must contain an equal (=) sign (this flags the assembler program that a literal is assigned). Column 14 will contain the type designator, and column 15 will be the first character of the literal. Coding of decimal (D) literals is the same as for the DEC pseudo operation. Six-bit alphanumeric (H) literals allow three or less characters that are left-justified with trailing blanks if less than three characters are used. ASCII (A) literals allow a maximum of two characters with the first character in bits 1 through 8, and the second in bits 10 through 17. Examples of literals are illustrated in lines 4 through 8 of the following table.

PROGRAM CODING FORM

PREPARED BY _____  DATE _____

PHONE _____  PROBLEM NO. _____  PAGE _____ OF _____

| LOCATION (LABEL) | OP CODE | VARIABLE AND COMMENTS FIELD | | | | | | | | | | | | | SEQ NO. |
|---|---|---|---|---|---|---|---|---|---|---|---|---|---|---|---|
| 1 | CLA | A|A|K|2|4|0 | | | | | | | | | |
| 2 | CLA | A|A|K|2|4|0|.|1|2 | | | | | | |
| 3 | SEI | I|7|7|7 | | | | | | | | | | |
| 4 | CLA | =|O|7|7|7|7|7|7 | | | | | | | |
| 5 | ADD | =|D|1|2|5|.|3|1|E|-|2|8|-|1 |
| 6 | SUB | =|V|L|A|B|E|L|+|3 | | | | | | |
| 7 | CML | =|H|T|R|1 | | | | | | | | | |
| 8 | LDQ | =|A|T|1 | | | | | | | | | | |
| 9 | | | | | | | | | | | | | | | |

Examples of Variable Field Formats

SUMMARY OF PSEUDO OPERATIONS

The pseudo operations provided by the HM-4118 assembly program relieve the programmer of the task of coding subroutines for certain operations not included in the HM-4118 machine instruction repertoire.

The pseudo operations provided by the HM-4118 assembly program enable the programmer to specify, by an entry on the program coding form, certain operations not contained in the HM-4118 machine instruction repertoire. Since such operations occur in many programs, this feature relieves the programmer of the task of coding a subroutine when he specifies an operation defined by one of the pseudo operations. A pseudo operation may be used whenever desired in the program, except when a macro operation is being defined. In a macro operation, the GAD, NOP, HLT, or FIN pseudo operation are the only pseudo operations allowed within the macro definition. A pseudo operation is indicated by placing the three-character mnemonic corresponding to the desired operation in the operation field. There are certain restrictions placed on entries in the location field and the variable field; these restrictions are noted when the specific pseudo operations are discussed. The pseudo operations included in the assembler may be used by the programmer to control memory allocation, form data, and to control the output assembly.

Controlling Memory Location

A group of pseudo operations is provided to allow the programmer to control memory allocation. By using these pseudo operations, the programmer can specify the values to be loaded into the assembler main, scratch, or relocation counters. The programmer may also reserve a block of sequential memory address beginning with a specified location. A pseudo operation which allows the programmer to specify the starting address of a literal table is also included within this group.

Entering Data

A second group of pseudo operations is provided which allows the programmer to enter data in a variety of formats. The programmer may enter data in units smaller than a complete computer word by using the variable field data (VFD) pseudo operation. Pseudo operations are provided which allow the programmer to enter decimal data in either a single precision or a double precision format. This group of pseudo operations also includes operations which allow the programmer to enter octal and binary data.

Controlling Output Assembly

The programmer may control the output assembly by using one or more of the pseudo operations included within this group. The normal output assembly consists of printing out a side-by-side listing of the assembled program and data generated, and placing the program on punched or magnetic tape. This output assembly may be varied as desired by the programmer by use of the pseudo operations included within this group.

FUNCTIONAL LIST OF PSEUDO-OPERATIONS

| Pseudo-Operation | Function |
|---|---|
| Control Memory Location | |
| BSS | Block Starting with Symbol |
| LTL | Literal Initialization |
| SMC | Set Main Counter |
| SRC | Set Relocation Counter |
| SSC | Set Scratch Counter |
| BOL | Boolean Equate |
| EQU | Equate |
| Process Variable Field Data | |
| VFD | Variable Field Definition |
| Entering Decimal Data | |
| DEC | Decimal Data, Single Precision |
| DCD | Decimal Data, Double Precision |
| Entering Octal and Binary Coded Data | |
| OCT | Octal Integers |
| BCI | Binary Coded Information |
| BCP | Binary Code for Printer |
| Generating Addresses | |
| GAD | Generate Address |
| Control Output Assembly | |
| EJI | Eject to top of Page |
| SLT | Suppress Listing |
| LST | Resume Listing |
| SDL | Suppress Detail |
| END | End of Assembly |
| WST | Write Symbol/COMID Table |
| RST | Read Symbol/COMID Table |
| CKS | Generate Checksum |
| REL | Relocatable Output |
| ABS | Absolute Output |
| FUL | Full Card |
| NOP | No Operation |
| HLT | Halt |
| Operations on Tables | |
| TBL | Table Definition |
| ITM | Item Definition |
| XTR | Extract an Item |
| RPL | Replace an Item |
| POS | Position Item in Accumulator |
| Macro Generation | |
| MAC | Macro Definition |

PSEUDO OPERATIONS TO CONTROL MEMORY LOCATION

This group of pseudo operations allows the programmer to specify initial memory addresses for both data to be entered into main memory or scratch pad memory and relocatable data.

Certain pseudo operations affect location assignments by operations that set main, scratch, or relocation counter values equal to values contained in the variable field. These pseudo operation codes appear in the operation field and are described individually in the following paragraphs.

SMC (Set Main Counter)

The SMC pseudo operation sets the assembler main counter to the value specified by the variable field. The variable field may contain a symbol, constant, or arithmetic expression that is equal to a value greater than $777_8$ ($512_{10}$). Any smymbol used in the variable field must have been previously defined. The location field may be blank or contain a symbol or label that, if present, is assigned to identify the memory location specified by the variable field. If the SMC pseudo operation is not used prior to the first main memory assignment, the assembler will begin assigning memory locations at $1000_8$. The subsequent data and/or instruction words are assigned sequentially higher locations until one of the set counter instructions appear. The SMC pseudo operation should not be used between a REL and an A B S pseudo operation. If the location field contains a symbol, it is assigned the value of the variable field. Constants are not allowed in the location field.

SSC (Set Scratch Counter)

The SSC pseudo operation sets the assembler scratch counter to the value specified by the variable field. The variable field may contain a symbol, constant, or arithmetic expression that is equal to a value less than $1000_8$. Any symbol in the variable field must have been previously defined. The location field may be blank or contain a symbol or label that, if present, is assigned to identify the memory location specified by the variable field. Symbols assigned to scratch pad locations by the SSC pseudo operation do not require the "comma S" (,S) suffix. If the SSC pseudo operation is not used prior to the first scratch pad memory assignment, the assembler will begin assigning memory locations at $213_8$. The subsequent instructions or data words are assigned sequentially higher locations until one of the set counter instructions occur.

SRC (Set Relocation Counter)

The SRC pseudo operation sets the assembler relocatable main memory counter, or relocation counter, to the value specified by the variable field. The variable field may contain a symbol, constant, or arithmetic expression. Any symbol used in the variable field must have been previously defined. The location field may be blank or contain a symbol or label that, if present, is assigned to identify the memory location specified by the variable field. If the SRC pseudo operation is not used prior to the first main memory assignment, the assembler begins assigning memory locations at 000. The subsequent instructions or data words are assigned sequentially higher locations until one of the set counter instructions occur. The assignment to 000 and higher locations is not the final assignment as these would conflict with assigned memory. This pseudo operation allows the programmer to assemble a program sequence that is later relocated (in a unit) to scratch pad or main memory. Actual relocation occurs during object program loading.

BSS (Block Starting with Symbol)

The BSS pseudo operation allows the programmer to reserve a sequential block of memory locations equal to the value of the variable field. The variable field may contain a symbol, constant, or arithmetic expression. Any symbol used in the variable field must have been previously defined. The block of memory locations being reserved begins with the location at which the BSS pseudo operation occurs.

LTL (Literal Initialization)

The LTL pseudo operation specifies to the assembler the beginning address of the literal table and the literal table base address index register. The variable field of this pseudo operation contains two subfields. The first subfield defines the starting address of the literal table. The second subfield denotes the index register to use. This pseudo operation must be performed before the first use of an instruction that uses a literal.

EQU (EQUate)

The EQU pseudo operation assigns the value of the contents of the variable field to the symbol in the location field. The value equated with the symbol by this operation is placed in the symbol table. The variable field may contain a symbol, constant or arithmetic expression. Any symbol used in the variable field must have been previously defined.

BOL (BOoLean Equate)

The BOL pseudo operation is identical to the EQU pseudo operation; however, constants or arithmetic expressions appearing in the variable field are assumed to be octal.

PROGRAM CODING FORM

PREPARED BY _____ DATE _____

PHONE _____ PROBLEM NO. _____ PAGE _____ OF _____

| LOCATION (LABEL) 1 - 5 | OP CODE 10 | 15 | VARIABLE AND COMMENTS FIELD 20  25  30  35  40  45  50  55  60  65  70  72 | SEQ NO. 80 |
|---|---|---|---|---|
| 1 | SMC | 3777 | | |
| 2  AAK30 | SMC | 4376 | | |
| 3 | BSS | 15 | | |
| 4  AAV | EQU | 77 | | |
| 5 | | | | |

NOTES

1. LINE 1:  SET THE MAIN COUNTER TO 3777
2. LINE 2:  SET THE MAIN COUNTER TO 4376 AND IDENTIFY THAT ADDRESS AS AAK30
3. LINE 3:  DO NOT ASSIGN THE FOLLOWING 15 ADDRESSES
4. LINE 4:  PLACE AAY IN THE SYMBOL TABLE AND IDENTIFY AS 77

Examples of Typical Memory Location Central Pseudo Operations

PSEUDO OPERATION FOR PROCESSING VARIABLE FIELD DATA

This pseudo operation allows the programmer to specify data to be entered into the program in field lengths less than a complete computer word.

The assembler provides this pseudo operation to allow the programer to specify the format and the field length of data to be entered into the program. The programmer may specify octal, decimal, or hollerith (alphanumeric) information as the data to be entered. The programmer may define more than one field each time the pseudo operation is specified so long as the combined length of all fields included does not exceed 18 bits (one computer word).

VFD (Variable Field Definition

The VFD pseudo operation allows the programmer to enter data in units smaller than a complete computer word (18 bits). The variable field (on the program coding form) contains one or more subfields that are separated by commas and is terminated by a blank. There is one subfield in the variable field for each field of data in the machine word. The format of each subfield is given on the facing page.

Each subfield will specify the type of information to be entered, the number of bits to be used by the subfield and the data to be entered. The first character of each subfield specifies the format. This character will be alphabetic (D, B, of H) to specify decimal, octal, or hollerith data, respectively. The alphabetic character will be followed by decimal number specifying the number of bits in the subfield of the machine word. The bit count is followed by a slash (/) and then the data to be entered.

Data will be right justified in its subfield. If the amount of data-generated is greater than the number of bits specified, the leading bits are lost and an error printout results. If combined data length of the subfields is less than 18 bits, the data is right justified in the machine word. If the data requires the use of more than 18 bits, the machine word is assigned a value of zero and an error flag printout results.

Examples of the computer data word generated for sample variable fields, using the VFD pseudo operation, are given below.

FORMAT OF VFD

*Fn/X* where:

$F$ = format code; and if:

$F = B$ = octal $F = D$ = decimal $F = H$ = alphanumeric $n$ = decimal integer specifying the number of bits allotted to this subfield / = end of bit count $X$ = symbol, constant or arithmetic expression if $F = B$ or $D$ if $F = H$, it is an alphanumeric symbol if $F = B$, all constants are octal and all expressions are arithmetic

EXAMPLES OF VFD

| Variable Field | Data Word |
|---|---|
| B1/1,B14/31600,B3/5 | 716005 |
| B1/1,B8/377,B1/0,B8/357 | 777357 |
| D9/364,D6/02,D3/5 | 364025 |
| H12/TO,B6/21 | 635621 |

PSEUDO OPERATIONS FOR ENTERING DECIMAL DATA

By using these pseudo operations the programmer can specify decimal data to be entered directly into the program.

This group of pseudo operations allows the programmer to enter decimal data directly into the program without converting to a format suitable for storage in binary form. The conversion is provided as one of the functions of these pseudo operations. The types of data which may be entered by the programmer include:

Decimal integers

Fixed point numbers (single and double precision)

Floating point numbers

The data words generated are addressed in the same manner as instruction words. Succeeding data words, designated by the presence of more than one subfield, are assigned the next sequentially higher memory locations.

DEC (DECimal Data, Single Precision)

The DEC pseudo operation allows the programmer to enter single precision decimal data into the program. The variable field contains one or more decimal numbers, read from left to right, separated by commas and is terminated by a blank. The decimal numbers are converted to octal equivalents for storage in binary form. The decimal numbers, when converted, are stored in consecutive, increasing memory locations. Each decimal number, if more than one appears, forms a subfield. Two commas in succession are assumed to be the integer zero. Each subfield is decoded using the following coded format:

$$S_N I_N \cdot F_N E S_E V_E B S_B V_B$$

Each component of the subfield is defined in Table 1. Rules for forming the decimal numbers are given on the facing page. Examples of data words generated by the DEC pseudo operation for various subfield values are given in Table 2.

DCD (DeCimal Data, Double Precision)

The DCD pseudo operation allows the programmer to enter decimal, double-precision, or floating-point data into the program. The basic subfield format is the same as for DEC pseudo operation, except certain rules that supplement DEC rules. These are given on the following page. Examples of data words generated by the DCD pseudo operation for various variable field values are given in Table 3.

TABLE 1. DEFINITION OF DEC SUBFIELD COMPONENTS $S_N$ = sign of number (+ or −)

$I_N$ = integer portion of number

. = decimal point $F_N$ = fractional portion of number $E$ = beginning of exponent portion indicating multiplication by powers of 10

$S_E$ = sign of exponent
$V_E$ = value of exponent
$B$ = denotes beginning of binary scale factor indicating number of bits allowed for integer portion of number
$S_B$ = sign of scale factor
$V_B$ = value of scale factor

RULES FOR FORMING DECIMAL SUBFIELDS

1. If $S_N$ or $S_E$ is not specified, it is assumed to be positive.
2. If $I_N$ is not specified, there must be a decimal point.
3. If $F_N$ is not specified, the decimal point may be omitted.
4. If a decimal point is present, $B$ and $V_B$ must be specified or the fractional portion of the number is lost.
5. If $B$ is specified, it must be restricted to a value which will allow the most significant bits to be retained.
6. If $B$ is not specified, it is assumed to be 17.
7. The value represented by $I_N$, $F_N$, $E$, $S_E$, and $V_E$ may not exceed $2^{17} - 1$.
8. The fractional portion of a number is truncated according to the number of bits provided by the scale factor.

TABLE 2

EXAMPLE OF DEC DATA WORDS GENERATED

| Variable Field | Data Words |
|---|---|
| 131071,−131071 | 377777 |
|  | 777777 |
| .512E+3, −512000E−3 | 001000 |
|  | 401000 |
| 512B17, 512B11 | 001000 |
|  | 100000 |
| ,,1234.567E+1B16 | 000000 |
|  | 060163 |

SUPPLEMENTARY RULES FOR DCD SUBFIELDS

1. Floating-point numbers are denoted by a decimal point, but no scale factor ($BS_BV_B$).
2. If $B$ is specified, it must be restricted to a value that allows the most significant bits to be retained.
3. If a decimal point and $B$ are both omitted, the scale factor is assumed to be 34.
4. Double-precision non-floating-point data is assigned two successive memory locations with the least significant bits placed in the first location.
5. Floating point data is assigned three successive memory locations. The first two locations will contain the mantissa with the least significant bits in the first location. The third location will contain the exponent.

TABLE 3

EXAMPLES OF DCD DATA WORDS

| Variable Field | Data Words |
|---|---|
| 17179869183,−17179869183 | 377777 |
|  | 377777 |
|  | 777777 |
|  | 777777 |
| 512B34,512B17,512B11 | 001000 |
|  | 000000 |
|  | 000000 |
|  | 001000 |
|  | 000000 |
|  | 100000 |
| .512E+3,−512000.E−3 | 000000 |
|  | 200000 |

TABLE 3-Continued

EXAMPLES OF DCD DATA WORDS

| Variable Field | Data Words |
|---|---|
|  | 000012 |
|  | 400000 |
|  | 600000 |
|  | 000012 |
| ,,1234.567E+3B25 | 000000 |
|  | 000000 |
|  | 000000 |
|  | 000000 |
|  | 207000 |
|  | 011326 |
| .00512,5.12,512000. | 130431 |
|  | 247613 |
|  | 400007 |
|  | 024364 |
|  | 243656 |
|  | 000003 |
|  | 000000 |
|  | 372000 |
|  | 000023 |
| 1234.567E−512,−1234.567E+512 | 026131 |
|  | 255753 |
|  | 403232 |
|  | 622152 |
|  | 610714 |
|  | 003260 |

PSEUDO OPERATIONS FOR ENTERING OCTAL AND BINARY CODED DATA

The programmer may enter octal and binary coded data directly into the program by use of these pseudo operations.

This group of pseudo operations allows the programmer to enter octal data and binary coded data in either ASCII or a 6-bit alphanumeric (hollerith) format directly into the program. Without the availability of these pseudo operations the programmer would be faced with the task of converting the input data to a format suitable for storage in binary form. The data conversion is performed by these pseudo operations prior to storage. The types of data which may be entered by the programmer include:

Octal integers
Alphanumeric codes

The data words generated are addressed in the same manner as instructions. Succeeding data words, subject to the restrictions noted in the discussions of the individual pseudo operations, are assigned to the next sequentially higher memory locations.

OCT (OCTal Integers)

The OCT pseudo operation allows the programmer to enter octal data into the program. The variable field consists of one or more octal constants, read from left to right. Successive octal constants are separated by commas, and terminated by the first blank. Successive subfields are assigned to successive higher memory locations. Each octal constant is right justified when converted to a binary number with leading zeroes. If more than six digits are specified for a number, the leading bits are lost and an error is indicated.

BCI (Binary Coded Information)

The BCI pseudo operation allows the programmer to enter ASCII format binary coded data into the program. The variable field contains characters that are converted into ASCII code. Data words, consisting of two of the ASCII 7-bit codes, plus one odd parity bit character per code, are assigned bits 1 through 8 and 10 through 17 of a memory location. An example is given in Table 1. Characters are decoded, two at a time, and assigned to successively higher memory locations starting with the location of the BCI pseudo operation. If the number of variable field characters is not a multiple of two, trailing zeros are supplied for the last character. The variable field character conversion is terminated by an equal (=) sign. If no equal sign appears, all characters on that line (through column 72) are converted and an error flag is output.

BCP (Binary Code for Printer)

The BCP pseudo operation allows the programmer to enter (in octal format) binary coded data into the program. An example is given in Table 1. The variable field contains characters that are converted into a 6-bit octal code. Data words consisting of three of the octal-coded characters are assigned to successively higher memory locations starting with the location of the BCP pseudo operation. If the characters do not occur in multiples of 3, trailing zeros are supplied. The variable field character conversion is terminated by an equal (=) sign. If no equal sign appears, all characters in that line, (through column 72), are converted and an error flag is output. Appendix E lists the codes used for this pseudo operation.

PROGRAM CODING

PREPARED BY _____  DATE _____

PHONE _____  PROBLEM NO. _____  PAGE _____ OF _____

| LOCATION (LABEL) 1   5 | OP CODE 10 | VARIABLE AND COMMENTS FIELD  15  20  25  30  35  40  45  50  55  60  65  70  72 | SEQ. NO. 80 |
|---|---|---|---|
| 1 | BCI | CR0004=  |  |
| 2 | BCP | TO RETURN TO= |  |
| 3 | | | |
| 4 | | | |

NOTES

1. THIS EXAMPLE OF THE BCI PSEUDO OPERATION GENERATES THE FOLLOWING THREE DATA WORDS:
   103122
   117260
   260064
2. THIS EXAMPLE OF THE BCP PSEUDO OPERATION GENERATES THE FOLLOWING DATA WORDS:
   206356
   206144
   636461
   552063
   560000

PSEUDO OPERATION FOR GENERATING ADDRESSES

This pseudo operation allows the programmer to specify the contents of memory locations to be used subsequently in an indirect addressing mode.

This pseudo operation allows the programmer to specify words in the indirectly addressed word format. This means that the programmer can, by a single entry on the program coding form, specify the contents of memory locations which may be used subsequently in an indirect addressing mode. The pseudo operation is treated as a machine instruction by the assembler and may be used, but is not restricted to, macro operations.

GAD (Generate ADdress)

The GAD pseudo operation is recognized by the assembler and may be used in macro operations. When written on the coding form, this pseudo operation will develop the binary equivalent of the alphanumeric term or the address of the label in the variable field and place the results in the address designated in the location field or in the next available memory address if no location field is specified. The variable field is written in two subfields separated by a comma. The first subfield may be a symbol, constant, or arithmetic expression. The second subfield may be a 1 or blank. If the second subfield is blank, the address of the label in the first variable field, or the binary equivalent of the alphanumeric term or arithmetic expression is placed in the specified location. If the second subfield is a 1, the contents of index register 1 are added to the binary equivalent to obtain an indexed address when the instruction using the generated address is executed.

PROGRAM CODING FORM

PREPARED BY _____  DATE _____

PHONE _____  PROBLEM NO. _____  PAGE ____ OF ____

| LOCATION (LABEL) | OP CODE | VARIABLE AND COMMENTS FIELD | SEQ NO. |
|---|---|---|---|
| 1   5 | 10 | 15   20   25   30   35   40   45   50   55   60   65   70   72 | 80 |
| 1 | GAD | AA4 | |
| 2 1001 | GAD | A+B/2 | |
| 3 4A4 | GAD | AA4.1 | |
| 4 | | | |

NOTES

1. LINE 1: PLACE THE ADDRESS OF LABEL AA4 IN THE NEXT AVAILABLE MEMORY ADDRESS
2. LINE 2: PLACE THE BINARY RESULTS OF THE ARITHMETIC OPERATION IN MEMORY ADDRESS 1001
3. LINE 3: PLACE THE ADDRESS DESIGNATED BY AA4 IN ADDRESS AA4 WITH BIT 0 TRUE TO INDICATE AN INDEXED INDIRECT ADDRESS

Examples of Typical GAD Pseudo Operations

PSEUDO OPERATIONS TO CONTROL OUTPUT ASSEMBLY

This group of pseudo operations allows the programmer to control the output assembly as desired.

Output assembly consists of printing out a side-by-side listing of the assembled program and the data generated, and placing the program on punched or magnetic tape. The normal printout operation consists of a heading and page number at the top of aach page followed by a blank line that, in turn, is followed by as many as 51 data lines. If a program operation (usually a pseudo or macro operation) generates more than one word, each word is printed on a separate line. The operation columns, for the additional lines, are blank. The output assembly may be varied as desired by the programmer by use of the pseudo operations described in the following paragraphs. Pseudo operations in this group (except CKS, WST, RST, and END) do not appear in the Pass II listing.

EJT (EJecT to Top of Page)

The EJT pseudo operation directs the next line decoded to be printed at the top of the next page, following the heading. If an EJT appears concurrently with an automatic eject (the assembler makes a line count and performs an automatic eject at 51 lines), or an EJT appears with a zero line count, it is ignored.

SLT (Suppress LisTing)

The SLT pseudo operation inhibits a Pass II side-by-side listing until an LST pseudo operation is encountered.

LST (Resume LiSTing)

The LST pseudo operation cancels previously used SLT and SDL pseudo operations and directs normal side-by-side listing to resume.

SDL (Suppress Detail)

The SDL pseudo operation inhibits the printout of additional lines produced by data-generating and macro operations. The first word generated by a coded line and the symbolic statement are printed.

SPC (SPaCe)

The SPC pseudo operation directs the assembler printout to space the side-by-side listing by the number of lines specified in the variable field. The space count in the variable field may be specified by a symbol, constant, arithmetic expression, or a blank. If the variable field is blank, one space is assumed.

END (END of Assembly)

The END pseudo operation indicates to the assembler that the end of the program being assembled has been reached. This pseudo operation contains a variable field in which the start address of the program is entered as a symbol, constant, arithmetic expression, or blank. If the program is being assembled and output on punched tape, the last data word punched is equal to the value of the variable field, and then a stop code is punched. If a magnetic tape output is used, the value of the variable field is the address at which execution of the program is initiated after the program is loaded. If the variable field is blank, address 000 is generated. A symbol in the location field is assigned the value of the location counter under rules specified in the Section on Formats.

WST (Write Symbol/COMID Table) LABEL

The WST pseudo operation directs the assembly to dump the present contents of the symbol/COMID table onto magnetic or punched tape during Pass I. The WST pseudo operation is allowed anywhere in the program. LABEL must be a six-character symbol and identifies the tape.

RST (Read Symbol/COMID Table) LABEL

The RST pseudo operation directs the assembler to read the symbol data from magnetic tape and place it into the symbol/COMID table of the assembler. The RST pseudo operation must appear before the first use or definition of a unique program symbol. A checksum of the magnetic tape data transfer is made, and an error message is printed out if an error occurs.

CKS (Generate ChecKSum)

The CKS pseudo operation directs the assembler to generate a data word that is the logical complement of the data and instruction words generated since the last CKS pseudo operation, or since the first word, which ever occurred last. The execution of this pseudo operation performs an exclusive-or function on the contents of the computer words involved. The octal value of the checksum is printed in the Pass II listing.

REL (RELocatable Output)

The REL pseudo operation directs the assembler to output following lines in a relocatable mode. The REL mode is terminated by an ABS pseudo operation.

ABS (ABSolute Output)

The ABS pseudo operation directs the assembler to print out in the absolute, or normal, mode. Absolute mode is assumed unless a REL or FUL pseudo operation has occurred, and is terminated by the use of either REL or FUL.

FUL (FUL1 Card)

The FUL pseudo operation directs the assembler to printout during Pass II the following lines without editing or making any address assignment. The first 72 columns of the card are available to the programmer with the restriction that symbols may not be used in the location field. The FUL mode of operation is maintained until terminated by a REL or ABS pseudo operation.

NOP (No OPeration)

The NOP instruction is a pseudo operation that is treated as a computer instruction and may be used in macro operations. The NOP pseudo operation consists of only the mnemonic code (NOP) in the operation field. This instruction generates a transfer to the present location plus one.

HLT (HaLT)

The HLT instruction is a pseudo operation on which the assembler operates as a computer instruction and may be used in macro operations. The HLT instruction consists of only the mnemonic in operation field. This instruction generates a transfer to the present location that results in a program halt at this point.

PSEUDO OPERATIONS TO DEFINE AND MANIPULATE TABLES

There are five pseudo operations which allow the programmer to define and manipulate tables and items.

Five pseudo operations enable the programmer to define tables, define items within the tables, and to manipulate these items; Table Definition (TBL), Item Definition (ITM), Extract on Item (XTR), Replace an Item (RPL), and Position Item in Accumulator (POS).

TBL (TaBLe Definition)

The TBL pseudo operation is written with a symbol in the location field, TBL in the operation field, and four parameter subfields in the variable field. The symbol used in the location field becomes the label, or table name, and is assigned the current value of the main or relocation counter. The counter is incremented from the starting location by the number of words used in the table. The four parameters that appear in the variable field may be a symbol, constant, or arithmetic expression with the restriction that any symbol used must have been defined previously. The four parameter subfields are designated C, T, E, and W. The C (class) subfield appears first and indicates a serial table if equal to 1, or a parallel table if equal to 2. The T (type) subfield appears second and indicates a null type if equal to 0, a rigid type if equal to 1, a variable type if equal to 2, and a cyclic type if equal to 3. The E (entries) subfield appears third and indicates the number of entries within the table, which may range from 1 through 512. The W (words) subfield appears last and indicates the number of words per entry, which may range from 1 through 512.

ITM (ITeM Definition)

The ITM pseudo operation enables the programmer to define the items within a table. This pseudo operation defines from 1 to 18 bits of a word contained in an entry within a table. The ITM pseudo operation is written with a symbol in the location field that becomes the item label or name, ITM in the operation field, and six parameters in the variable field. Each parameter may be a symbol, constant, or arithmetic expression with the restriction that any symbol used must have been defined previously. The parameters are designated, T, L, A, F, S, and B, respectively, for explanatory purposes, and are defined in the table on the facing page.

XTR(EXTRact an Item)

The XTR pseudo operation generates instructions that will obtain an item, position the binary point of the item, and transfer the item into the accumulator. This pseudo operation is written with XTR in the operation field and three parameters designated ITEM NM, XR, and $BP_{acc}$ in the variable field. ITEM NM is defined as the item name or label as it appears in the location field of this item (must have been defined previously), XR as the Index register that has been set, prior to the XTR, equal to the address of the first word of the entry in which this item appears, and the $BP_{acc}$ as the Binary point of the item as it is desired in the accumulator.

RPL (RePLace an Item)

The RPL pseudo operation generates instructions that place an item in the accumulator back into the correct table. The assembler generated instructions determine the placing of the binary point and select the proper data by masking as necessary if this item is a partial word. This pseudo operation is written with RPL in the operation field and three parameters designated ITEM NM, SR, and $BP_{acc}$ in the variable field. For this pseudo operation, ITEM NM is defined as an item name or label as it appears in the location field of this item (must have been defined previously), XR as an index register that has been set, prior to this RPL, equal to the address of the first word of the entry in which this item appears, and $BP_{acc}$ as the Binary point of this item as it appears in the accumulator prior to this RPL. The instructions generated by the assembler to implement the RPL pseudo operation destroy the contents of the Q register. The programmer must save the contents of the Q register before use of the RPL pseudo operation if Q register data is to be retained.

POS (POSition Item in Accumulator)

The POS pseudo operation generates the instructions necessary to shift an item in the accumulator from one binary point position to another. This pseudo operation is written with POS in the operation field and two parameters designated FROM, TO in the variable field. These parameters define the beginning binary point position (FROM) and the final binary point position (TO) according to certain rules; If alphanumeric symbol is used, the value of the symbol is used as the binary point. If a signed number is used, the value of the number is used as the binary point. If a previously defined item is used, the binary point position of this item is used as the binary point in the accumulator. For certain combinations of parameters the XTR, RPL, and POS pseudo operations may cause the overflow indicator (FV) to set. Care must be exercised in using FV for logical control when these operations are used.

DESCRIPTION OF ITEM DEFINITION PARAMETERS

| Parameter | Value | Description |
| --- | --- | --- |
| T (type) | 0 | Null |
|  | 1 | Boolean |
|  | 2 | Octal |
|  | 3 | Integer |
|  | 7 | Decimal |
|  | 11 | Hollerith |
|  | 12 | ASCII 1 character |
|  | 13 | ASCII 2 character |
|  | 14 | IBM Selectric typewriter, 6-bit code |
|  | 15 | Alphanumeric, 6-bit code |
| L (location) | 0 – 511 | Defines location of this word with respect to first word of the entry. May range from 0 (if first word) to 511 (if last word is maximum loaded entry) |
| A | 0 – 17 | Defines bit location of first significant bit of this field. |
| F (field size) | 1 – 18 | Defines number of bits within this item. Includes sign bit |
| S (sign) | 0 | Unsigned |
|  | 1 | Signed |
|  | 2 | Detached |
|  | 3 | Two's complement |
| B (binary point) | −31 to +31 | Defines binary point of this item with respect to left end of word. |

DEFINITION OF MACRO OPERATIONS

Macro operations are special operations which the programmer may want to use in his program but are not contained in the HM-4118 instruction repertoire.

Macro operations provide the programmer with the capability to perform a specific sequence of operations with a single instruction entry on the program coding form. A macro operation may be used throughout the program by placing the specific macro mnemonic in the operation field, and the parameters to be operated on in the variable field. A macro operation is written by placing a three-character alphanumeric label in the location field. The label must have an alphabetic character in position 1, and normally consists of three letters selected by the programmer.

MAC (MACro Definition)

The operation field contains the letters MAC to specify a macro operation. The variable field contains from 0 to 31 parameters that are used in the macro definition. All parameter designators must be symbols only; constants or expressions are not allowed. Each symbol used as a parameter must be used only one time on the line on which it appears, however, normal program symbols and previously used parameter symbols may be used. The lines following the first line of the macro operation consist of one of the computer instructions or a GAD, NOP, HLT, or FIN pseudo operation, which are the only pseudo operations allowed within macro operations. These instructions are written in the operation field with the designated operation being performed on the parameters and program symbols that appear in the variable field of the same line. The parameters must appear on the first line of the MAC pseudo operation and may further define the operation by using operators (+, −, *, or /) between parameters and program symbols.

The MAC pseudo operation is terminated by using the finish (FIN) pseudo operation. During Pass I of the assembly, each macro operation is entered into a macro name table with the location of that macro's skeleton, parameter count, and skeleton line count. A parameter table is constructed by the assembler when the first line of the macro pseudo operation is decoded. As the assembler decodes each line of the macro operation, the line is placed in position in that macro's skeleton table with each symbol checked to verify that it is present in the parameter table. If a symbol appears in the parameter table, it is assigned a parameter number. If a symbol is not present in the parameter table, it is entered into the skeleton table unchanged. Once a macro operation is defined, it may be used by writing the macro's assigned label in the operation field and the values to be operated on in the variable field. When the assembler encounters a macro operation, it inserts the instructions contained in that macro's definition into the program. When the program is printed out during Pass II of the assembly process, macro operations appear with the label of the macro in the operation field and the parameters in the variable field. The lines following correspond with the macro's skeleton and contain the data acquired; however, the operation codes performed within the macro are not printed out.

Macro operations that have been defined are used according to the following rules:
1. The location field may be blank, a constant, or a symbol. Memory location assignment of a macro operation is performed in the same manner as for other program instructions.
2. The operation field contains the name of the macro operation.
3. The variable field contains a symbol, constant, or arithmetic expression in each parameter subfield. These values are substituted for the parameters they replace in the macro operation.
4. An asterisk (*) in the variable field is interpreted as having a value equal to the location of the first instruction generated.
5. Variable field evaluation is normally arithmetic. If an instruction that normally has an octal variable field is used, octal interpretation of a parameter may be directed by placing the letter B immediately following the last character in the parameter.
6. The number of subfields that appear in the variable field is equal to the number of parameters specified for that particular macro operation.

RULES FOR MACRO PROGRAMMING

1. The location field of a macro operation contains the name of the macro being defined.
2. Parameters are defined by symbols only.
3. Parameters must be unique within the line on which they appear.
4. Parameters must be separated by commas.
5. The variable field specifying parameters used by a macro operation is terminated by the first blank column.
6. A symbol used in the macro skeleton which does not appear in the parameter table is interpreted as a normal program symbol.
7. GAD, HLT, NOP, and FIN are the only pseudo operations allowed within macro operations.
8. The location field of each line of a macro skeleton must be blank.
9. Macro definitions are terminated by use of a FIN pseudo operation. (Notice that the FIN pseudo operation is a program flag and is used only to end the macro definition.)
10. A maximum of 50 lines, all following the MAC line, may be used for one macro definition.

EXAMPLES OF TYPICAL MACRO OPERATIONS

These examples are presented to illustrate typical definitions of macro operations.

These examples are provided as illustrations to the programmer of the format to be followed when he is defining a macro operation. The examples, although they could be used in an actual program, are presented as typical macro definitions. The range of macro operations which the programmer may define is limited primarily by the exigencies of a specific program. The first example defines a macro operation which may be used to move a variable number of items from any area of memory to a specific working area. The second example defines a macro operation which is equivalent to a left-shift-Q-register instruction (does not exist as an HM-4118 machine instruction).

Line 1 of FIG. A on the facing page describes a macro operation which may be used to move a variable number of items from any area of memory to a specific working area. This macro operation will use the following three symbols: LOCCNT, the location of the number of items to be moved; INDEX, the index register to be used; AREA, the starting location of the area to be moved. The symbol WORK is used in the macro definition but is not listed as a special symbol. Therefore, it will be treated as a general program symbol and must be defined elsewhere in the program.

The programmer may use the MVW macro operation at any point in the program following the definition. If the number of items is in location MOVE, the starting location of the items to be moved is TABLE +3, and index register 2 is available, the programmer could write the code shown in line 13 of FIG. A. Line 19 is an example of the symbolic representation of the code which is generated. Only the macro instruction line will appear in the side-by-side listing. However, all generated machine instructions will be printed. If a symbol appears in the location field of the macro operation, it is assigned to the first instruction generated by the macro definition.

FIG. B describes an instruction group that is equivalent to a left-shift-Q-register instruction. (This instruction is not available in the computer hardware.) The format for use of the macro is defined the same as for hardware shift instructions. Once the macro definition has been made in the program, the programmer may use the macro whenever a left-shift of the Q-register is desired. The figure shows first, the definition of the macro operation following with a subsequent use of the macro in the program.

What is claimed is:

1. In an airborne radar system including a plurality of fixed beam steered antenna structures mounted in an aircraft, each directed at different sectors within a 360° azimuth volume, control means carried by said aircraft for energizing said antenna structures, said control means comprising:

digital logic means for producing digital signals constituting a radar control command comprised of various information fields respectively specifying (1) an azimuth position within said azimuth volume and (2) either a track or search beam mode, said digital logic means producing successive radar control commands each specifying said search beam mode and successive azimuth positions within said azimuth volume, and said digital logic means further producing radar control commands each specifying said track beam mode and an azimuth position within said azimuth volume;

said digital logic means further including priority means for determining the priorities of the radar control commands to be next produced by said search command means and said track command means;

means for enabling either said search command means or said track command means dependent on the relative value of said priorities to issue an active radar control command; and transmitter means responsive to said active radar control command for supplying signal energy characteristic of the specified mode to the antenna structure corresponding to the specified azimuth sector.

2. The system of claim 1 including:

receiver means connected to said antenna structures for accepting signal energy reflected from targets;

signal processing means responsive to said accepted signal energy for determining the existence and characteristics of said targets; and wherein said digital logic means includes means responsive to said determined target characteristics for computing a track update rate $\Delta T$ with respect to each target.

3. The system of claim 2 wherein said means for computing said track update rate $\Delta T$ includes means for computing the result of the equation:

$$\Delta T = 1.1 \ (R\theta/m)^{1/2}$$

where $R$ defines the target range, $\theta$ defines the azimuth angle of the target, and $m$ defines the tangential acceleration of the target.

4. The system of claim 2 including memory means for storing said track update rates computed for each of said targets; and wherein said priority means includes means for determining the track priority PT for each of said targets where $$PT = TC - TLU/\Delta T$$

where $TC$ represents the current real time, $TLU$ represents the time of last update of the target data and $\Delta T$ represents the target track update rate.

5. The system of claim 4 wherein said priority means includes means for determining the search priority PS where $$PS = TC - TLS/\Delta TS$$

where $TC$ represents the current real time, $TLS$ represents the time of issuance of the last search radar control command and $\Delta TS$ represents the intended time between issuance of successive search radar control commands.

6. The system of claim 5 including means for determining the value of said term $\Delta TS$ where $$\Delta TS = K \cdot N + \Delta TSN$$

where $K$ is a constant, $N$ equals the number of track update rates stored in said memory means and $\Delta TSN$ is a constant representing a nominal search rate.

7. The system of claim 6 wherein said priority means further includes:

means for determining whether the largest of said track priorities PT is greater or less than 1;

and being responsive to said largest track priority being less than 1 for enabling said search command means to issue a search radar control command;

means responsive to said largest track priority exceeding 1 for comparing the relative manitudes of said search priority and said largest track priority for enabling said search command means if said search priority is larger and said track command means if said largest track priority is larger.

8. The system of claim 2 wherein said priority means includes means for determining the search priority PS where $$PS = TC - TLS/\Delta TS$$

where $TC$ represents the current real time, $TLS$ represents the time of issuance of the last research radar control command and $\Delta TS$ represents the intended time between issuance of successive search radar control commands.

9. The system of claim 2 wherein said digital logic means further includes verify command means for producing a radar control command specifying a verify beam mode and an azimuth position within said azimuth volume; and means responsive to the determination of a target existing subsequent to signal energy characteristic of said search mode being supplied to said antenna structure for enabling said verify command means.

10. The system of claim 1 wherein said digital logic means comprises a stored program digital computer.

11. A method of controlling an airborne radar system including a plurality of fixed beam steered antenna structures mounted in an aircraft, each directed at different sectors within a 360° surveillance volume; said method comprising the steps of:

firing successive search beams, each having a particular search mode format from said antenna structure at successively different azimuth angles within said surveillance volume;

monitoring the signal energy reflected to said antenna structures to determine the characteristics of reflecting targets;

storing information items, each describing the characteristics of a particular reflecting target in a certain class of reflecting targets;

determining the rate at which each of said stored information items should be updated;

periodically firing a track beam, having a particular track mode format, from said antenna structures corresponding to each of said stored information items; and determining the priority between each of said track beams to be fired and the next successive search beam to be fired.

12. The method of claim 11 wherein said step of monitoring to determine the characteristics of reflecting targets includes the steps of tentatively determining the location of a target and firing a verify beam, having a particular verify mode format, from said antenna structures toward said tentatively located target.

* * * * *